United States Patent [15] 3,651,495

Sauvan [45] Mar. 21, 1972

[54] ACTIVE MEMORY

[72] Inventor: Jacques Louis Sauvan, Paris, France

[73] Assignee: Societe Anonyme dite: Societe Nationale D'Etude et de Construction de Moteurs D'Aviation, S.N.E.C. M.A., Paris, France

[22] Filed: Sept. 15, 1969

[21] Appl. No.: 858,027

[30] Foreign Application Priority Data

Sept. 19, 1968 France ....................................166.845

[52] U.S. Cl. ..........................................340/173 R, 340/172.5
[51] Int. Cl. ............................................................G11c 11/00
[58] Field of Search ........................................340/173, 172.5

[56] References Cited

UNITED STATES PATENTS 3,292,159 12/1966 Koerner.................................340/173

*Primary Examiner*—Terrell W. Fears
*Attorney*—Flynn and Frishauf

[57] ABSTRACT

An active memory for use in data processing apparatus for storing information data relating to a system defined by several parameters, each capable of taking a finite number of values, called situations. Each of these situations may be changed in value by a finite number of variations, called actions. For each parameter, a recording center is provided consisting of a matrix having two dimensions, one of which is allocated to the situations (i.e., the values of the parameters) and the other to the actions (that is, the change in value of the parameters). The parameters together are joined by at least one center of Association of Situations or a Center of Association of Actions. These centers are formed of matrices having storage elements the inputs of which correspond to the situations or to the actions, respectively, to be joined. Upon interrogation of the memory, an output will be provided indicating the shortest path (if a path exists) between an initial and a final situation—that is, the memory will supply the shortest transformation making such a connection possible.

8 Claims, 37 Drawing Figures

Figure 1:
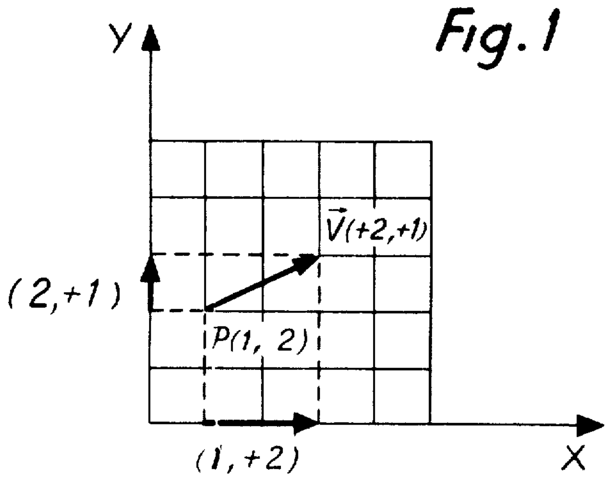

JACQUES L. SAUVAN,
Inventor
by Flynn & Frishauf
Attys

ACTIVE MEMORY

This invention relates to data processing apparatus, and it is an object of the invention to provide, for use in such apparatus, an active memory which is capable of storing information relating to complex transformations and of being used by a data extracting device supplying on interrogation an indication of the successive operations necessary for the carrying out of other complex transformations from information which has been stored in the machine. This memory can be used in apparatus described in my copending application Ser. No. 860,849, which is a further development of the apparatus of U.S. Pat. No. 3,558,868.

Before giving details of the above ideas, and in order to make use of more visual language, it may be said that an active memory is capable, drawing on previous experiences which it has assimilated, of working out a process of association of two states which it knows, but which would not necessarily have been brought together in a previous experience.

Thus, for instance, if the solution of a problem is regarded as being the relationship which exists between a set of data and a result to be obtained, the machine is capable, provided its knowledge is sufficient, of associating the data and the result, even if it has not been taught directly to do it.

Such events as an experience, the accomplishment of a phenomenon and the solving of a problem, can be considered as complex transformation which may be defined as the transition from an initial complex situation to a final complex situation through a certain process. In general, this process which permits the inter-connection of the two complex situations, initial and final, is analyzed as a chain of complex actions causing there to be described, one after the other, a number of intermediate situations constituting stages of the transformation.

An example of a complex transformation is given by the evolution of a chemical process of which each state (complex situation) is characterized by the set of the values of a certain number of parameters (different products and concentrations, conditions of temperature, of pressure, of pH, speed of flow and so on). The total process which connects the initial state, characterized by the presence of a certain number of raw materials, to the final state, characterized by the products resulting from the process, is a chain of complex actions each representing a reaction, a phase of transport, of filtration, of solidification, and so on.

Another example of a complex transformation is given by the task of modernization of a commercial business, the situations of which are characterized by a very great number of parameters such as turnover, staff, equipment, financial resources, land and buildings, and so on.

A third example of a complex transformation is given by the path of a moving body from one point to another. The situations of this moving body are characterized by its position, its direction, its speed and so on.

In the system which is described below, the definition of the amplitude of a transformation, i.e., of the passage from an initial situation to a final situation in accordance with a determined process, has been selected as the number of steps necessary for connecting these two situations.

A data processing machine has already been proposed which is capable of memorizing complex transformations of the type just defined. Given a system, the basis of a complex transformation to be memorized, the successive states of this system are characterized by the values of a number of parameters called "parameters of situation." The passage from one situation to the next is characterized by the variation of certain parameters, distinct from the first, called "parameters of operation," which variations bring about the modification of the situations.

Thus, for instance, the direction of an airplane constitutes one of the parameters defining the situation of this moving body, whereas the orientation of the guidance of direction, the variation of which brings about the changes in direction, may be considered as a parameter of operation.

Each transformation may be broken down into a series of complex actions composed of a complex starting situation and a complex resulting situation associated by a complex operator. In the known machine, the storage operation of a complex activity then consists in recording, simultaneously for each parameter of situation, the starting value and the resulting value of this parameter, as well as the variation of the parameter of operation, this variation being called the operator, which brings about the modification of this value. This recording is carried out in a recording center (CI) composed of a number of memory elements; each of these elements represents in the memorized state the association of a starting value of the parameter considered, of a resulting value of this parameter and of the associated operator. There are accordingly as many memory elements in the CI as there are possible combinations between the various values of starting and resulting which are possible for the parameter of situation, and the possible operators. In other words, the CI identifies itself with a three-dimensional matrix, one dimension corresponding to the starting values capable of being taken by the parameter of situation, one corresponding to the resulting values and one corresponding to the operators, the memory elements being located at the nodes of this matrix.

In order to permit coordinated extraction of information stored in each recording center CI associated with a parameter, the known machine also has centers of association of situation and centers of association of operators. Given a complex situation of the system, the coincidence or the "association" of the values of the various parameters of situation defining this complex situation may be stored by an element of center of association of situation. If there are $n$ parameters, the center of association of situations should accordingly be identified with a matrix with $n$ series of entries at the nodes of which memory elements are located. In practice, the parameters are associated solely in pairs in the centers of association of situations.

Centers of association of operators store, in the same manner as for the centers of association of situations, the association of variations of parameters of operation corresponding to a given complex operation.

The known machine may have certain disadvantages in the case where, a number of experiences having been stored, the extraction of some of this information is carried out with a view to controlling the system considered. In effect, in order to obtain complete reproduction of each elementary transformation memorized by the controlled system, it would be necessary for all the parameters defining the previous transformation to have been recorded including those which are exterior to the system. In the case of an airplane for instance, the storage of values of direction and of corresponding orientations of guidance in the course of an elementary trajectory is not adequate to permit another piloted airplane to follow the same route using information extracted from the memory. Factors external to the system, such as for instance the influence of the wind, which have not been taken into account in the course of the storage of the previous experience, may bring about a different variation of direction for the same variation of orientation of the guidance. To avoid this disadvantage it would be necessary to store all the external parameters in the memory.

It can accordingly be seen that the manner of storing in the known machine a previous complex activity are not suitable for certain forms of utilization of this memory.

In accordance with the present invention, the disadvantages of the known machine are mitigated by storing only information which is of interest to the parameters of situations. Consequently, information is stored concerning the situation of the system, starting out as before from the values of the parameters characterizing the state of this system. On the other hand, when dealing with the transition from one situation to the following one, there are stored not the variations of the separate parameters of operation but simply the variations of the parameters of situation. Moreover, apparatus is provided which makes it possible to memorize not only total transformation of a system in the case where the transformations are known in the form of complete experiences with the variations of each of the parameters, but also information concerning partial experiences, correlation or constraints between certain parameters, zones forbidden to the evolution of the system, the structure of the memory lending itself by its very conception to the perfecting of an extraction process by which it is possible to extract therefrom coherent information on the total transformations of the system between one state and another.

The present invention consists in an active memory for use in data processing apparatus, which includes structures of matrices having at least two series of inputs and temporary storage elements adapted to be associated with a system of extraction, wherein for storing the informations relating to a system defined by several parameters, each capable of taking a finite number of values, called situations, and of deriving from each of these situations an equally finite number of variations, called actions, there is provided for each parameter a recording center consisting of a matrix having two dimensions, one of which is allocated to the situations and the other to the actions, each storage element of the recording center thus representing, in the stored state, an elementary activity. To join the parameters together, at least one of the two following centers of association is provided: a center of association of situations consisting of a matrix having at least two series of inputs, each input corresponding in its series to a value of a separate parameter, and in which is thus stored the coincidence of values of at least two parameters; and a center of association of actions consisting of a matrix having at least two series of inputs, each input corresponding in its series to a value of variation of a separate parameter, in which is stored the coincidence of values of variation of at least two parameters. Thus, one matrix is related to absolute values, and the other to variations of values.

Preferably, for representing transformations of a system consisting of the transition from an initial complex situation to a final complex situation through a chain of complex intermediate actions, there is provided, for each parameter, a connection center having as many temporary storage elements as there are possible values of the parameters. The recording center has two series of inputs (connected to the connection center), the first series of inputs corresponding to the actual or present situation of the parameter and the second to the immediately preceding situation stored temporarily in the connection. The inputs of a center of association of situations are connected to the corresponding connection centers, and the inputs of a center of association of actions are connected to the outputs of the corresponding recording centers.

The structure of the recording centers enables simplicity of construction of the memory. One of the essential advantages afforded by the arrangement is that the stored information concerns only the state or the changes of state, of the system, independently of the causes which produce the latter and, consequently, eliminates the factors exterior to the system. On extraction, these pieces of information keep their total value even if the conditions external to the system are modified: it suffices in fact to communicate these pieces of information of states to a servo-mechanism which will itself determine, as a function of the external conditions, the operations to be carried out so that the state of the system develops in conformity with these pieces of information.

As a result of the method of storage adopted, a transformation may be conveniently represented in an associated *n*-dimensional space, *n* being the number of parameters necessary for characterizing a complex situation. In such a space, a complex situation will be represented by a point, and a complex action by a vector; a transformation will accordingly be represented by the connection of two representative complex situation points by a chain of vectors representing the chain of complex actions.

In the memory in accordance with the invention, one can carry out the recording of each of the storage centers without taking account of the others or of some other centers. This makes it possible to take into account the numerous problems in which the constraints connecting the parameters are not totally known, but only by partial experiences: for instance, there are cases where correlations are known between certain parameters only; there are cases where only the authorized variations of a parameter around each of its possible values are known. Frequently, this type of constraint will be expressed by the existence of zones forbidden to the evolution of the system, and they will be stored by effecting in the storage centers a so called recording by fields. The active memory which has just been described lends itself in fact particularly well to setting up an extraction system by which it is possible to determine a total transformation permitting in the optimum manner the passing from one complex situation to another, while respecting the data and in particular the stored constraints.

Such an extraction device will be described in detail herewith. It is integrated into the structure of the active memory and comprises in association with each storage element of the recording center, and of the center of centers of association, a logical circuit capable of supplying, when the element is memorized, a positive reply to the interrogations of which it is the object. If one identifies in the active memory an initial complex situation and a final complex situation by identifying corresponding situations for each parameter, then this extraction device is capable of communicating to the exterior of the active memory information relating to the successive stages of a transformation making it possible to connect these two complex situations. This transformation will be composed of successive complex activities, changing in accordance with each parameter into elementary activities stored in the recording centers affected by these parameters. Moreover, the successive values and the variations of these parameters for each complex activity will respect the associations recorded in the machine. For the extraction, the investigation of the transformation takes place under the impulse of a center of co-ordination by emission of signals to the various storage centers, these signals progressing simultaneously for each parameter in the circuits associated with the centers of recording and intersecting in the centers of association for verification with respect to the constraints between the parameters.

To record the data in the active memory, use can be made of the transmission of simultaneous storage signals relative to the various parameters. These signals are sent on lines which intersect at the storage elements and which if they are energized simultaneously, bring about the storage operation of the storage elements at which they intersect, both in the recording center as well as in the centers of association of actions and of situations.

The active memory may also permit the storage of data relating to the transformation, comprising the passage from an initial complex situation to a final complex situation through a chain of intermediate complex situations when one supplies it only with the indication of the successive states of the system, from which it deduces the elementary activities which compose this passage in accordance with each parameter. For this purpose, for each parameter, it comprises a connection center having as many temporary storage elements as there are possible values of the parameter, and the recording center has two series of respective entries OACI and EACI connected to the connecting center, one of the series EACI corresponding to the present situation of the parameter and the other series OACI corresponding to the immediate preceding situation stored in the connecting center. An element of the recording center at which intersect a storage signal OACI and a storage signal EACI thus stores the elementary activity corresponding to these two situations.

It will be seen that the active memory, with its characteristic memory portion and its characteristic extraction system, permits the solution of complex problems such as the determination of strategies, i.e., sequences of successive decisions to be taken in the accomplishment of any task. Each stage of a strategy is accompanied by a fan of possible routes thus requiring a decision; the number of stages increasing and the possibilities of choice at each level multiplying. The total number of possible strategies, of which is not known in advance whether each will be good or bad, thus increases in considerable proportions. At the present moment the problem, which is posed in a most crucial way in numerous activities, is to select a strategy which will at least be good and will if possible be the best.

Traditional calculating and data processing machines approach this problem by examining successively all the possible combinations capable of constituting a solution. This is obtained only at the expense of a considerable increase in the size of the memories of the machines and, as time progresses, machines quickly become of a considerable size, even prohibitive. Moreover, such systems are unsuited for the unforeseen introduction of fresh information during the course of processing and this is particularly so for real time operation.

The active memory described above, by virtue of the principles on which it is based, enables these problems of strategy to be approached more easily than with the traditional systems. The active memory works in a synthetic, experimental, evolutive and parallel manner, in contrast to most traditional systems which work in an analytical, numerical, set and sequential manner.

The active memory is synthetic to the extent that by the storage in a single memory element or in a small number of memory elements, it permits the association of a number of values, which number may be considerable, such as for instance, the co-ordinates of a point in an $n$-dimensional space.

It stores an "experimental behaviour." It possesses in fact memory elements the storage state of which brings about the transition from one value of a parameter to another. Accordingly, it enables the registration to be made of the transition of a particular set of parameter values to at least one other particular set of values of these parameters characteristic of a resultant state of a system.

The memory is active in the sense that the writing of a new behavior may be carried out in the memory itself from the actual state of storage, and in that the interrogation of this memory, or extraction, is carried out also in the interior of this memory, taking into account its actual state of storage, which is capable of being modified in the course of extraction.

The active memory is synoptic, i.e., it works in parallel by simultaneous interrogation in all the possible circuits to take into account stored information.

TERMINOLOGY

It is necessary to distinguish terminologically those expressions used in connection with firstly the system or systems whose data one intends to store and process, secondly the associated geometrical representation, and thirdly the elements of the machine concerned with the representation of these data.

Network: A set of points, called nodes, connected by orientated segments called links.

Trajectory: A path through a network following the links between a node called the starting point and another node called the target point.

Elementary activity: A portion of a trajectory composed of an original node, an end node and the link which connects them.

Predecessor node: Given a node in a trajectory, its predecessor is the origin of the activity of which it constitutes the extremity.

Successor node: Given a trajectory between a starting point and a target point, the successor of the starting point is the extremity of the first activity of the trajectory and constitutes, when the system is found there, a new starting point for the trajectory in the direction of the target point.

Free link: By analogy with the free vector, two links have the same free link if they are carried by two equivalent vectors.

Node element: Element of the machine related to a node of the network.

Link element: Element of the machine related to a link of the network.

Complex situation: A set constituted by taking a node in each of a number of networks.

Transformation: Passage from an initial complex situation, characterized by a set of starting point nodes, to a final complex situation, characterized by a set of target point nodes.

Step: A portion of a transformation comprising the transition from a node to an adjacent node in at least one of the networks.

Intermediate complex situation: The set of the nodes at the end of one step of a transformation.

Complex activity: A portion of a transformation constituted by one step and the two intermediate complex situations which it joins together.

Optimum component trajectory: If the networks are interdependent, there may exist in each network at least one optimum component trajectory defined as that which permits the transformation in a minimum number of steps.

Present complex situation: Intermediate complex situation of the system controlled by the extraction device.

Weighted node: Node on which the trajectory should rest for a number of steps equal to the weight of the node before passing to the following node; weighted link: link which necessitates, in order to be traversed by a trajectory, a number of steps equal to its weight. A link or a node having a weight $p$ is equivalent for a trajectory to a sequence of $p$ links each having a weight equal to 1. The preceding definitions apply equally to the case of networks with weighted nodes of links.

A particularly frequent case in which a definition of the states and of the evolution of one or several systems causes inter-dependent networks to be introduced, is the case where the states of this system are defined by a set of parameters. Each set of values of the parameters constitutes a complex situation; this complex situation is represented by a point in the associated space of a machine.

Each value of a parameter is called a situation, in contrast to the complex situation. Each variation of a parameter is called action, and complex action will be used to denote the simultaneous variation of a set of parameters. It is represented by a vector in the associated space of the machine.

A transformation consists of the transition of an initial complex situation to a final complex situation by a chain of complex actions. It is represented by a geometric transformation in the associated space.

The other preceding definitions of steps, elementary activity, complex activity and Intermediate complex situation remain unchanged. In the machine, instead of speaking of elements related to the nodes and to the free links, reference will be made to elements related to the situations and to the actions.

In the description which follows, the terms centers of association of situations (CAS) and centers of association of actions (CAA) have been reserved for the active memory, whereas the terms centers of association of nodes and and centers of association of free links apply more generally to all the machines operating the same extraction process.

Figure 2:
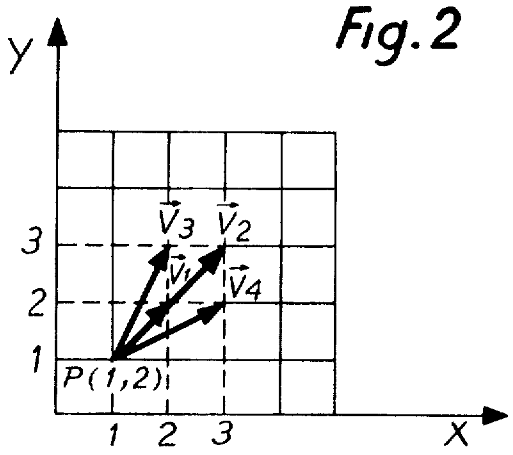
Figure 3:
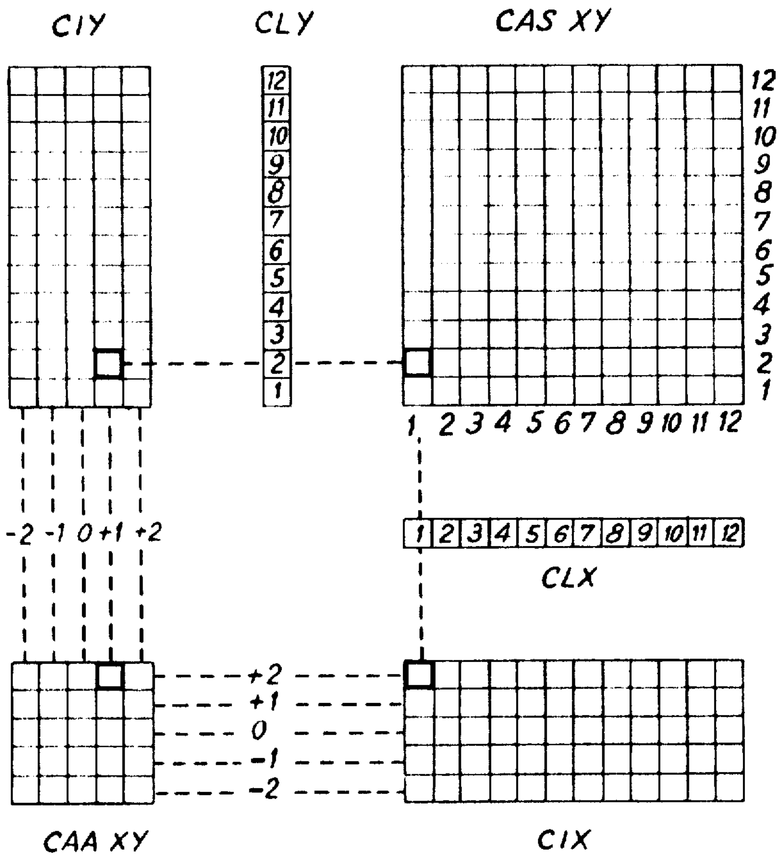
Figure 4:
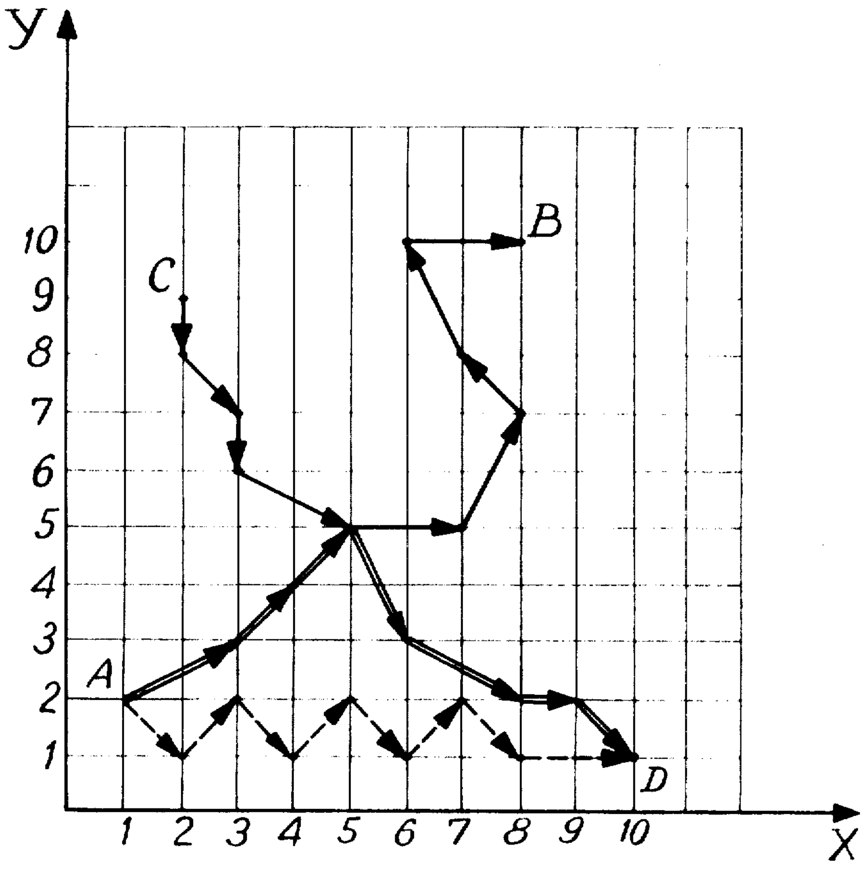
Figure 5:
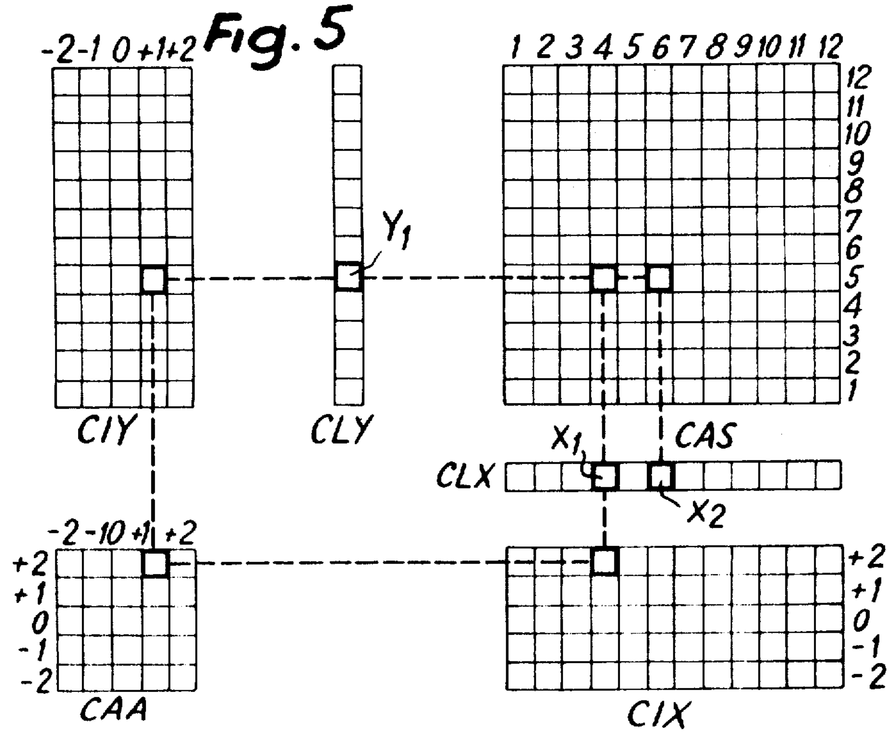
Figure 6:
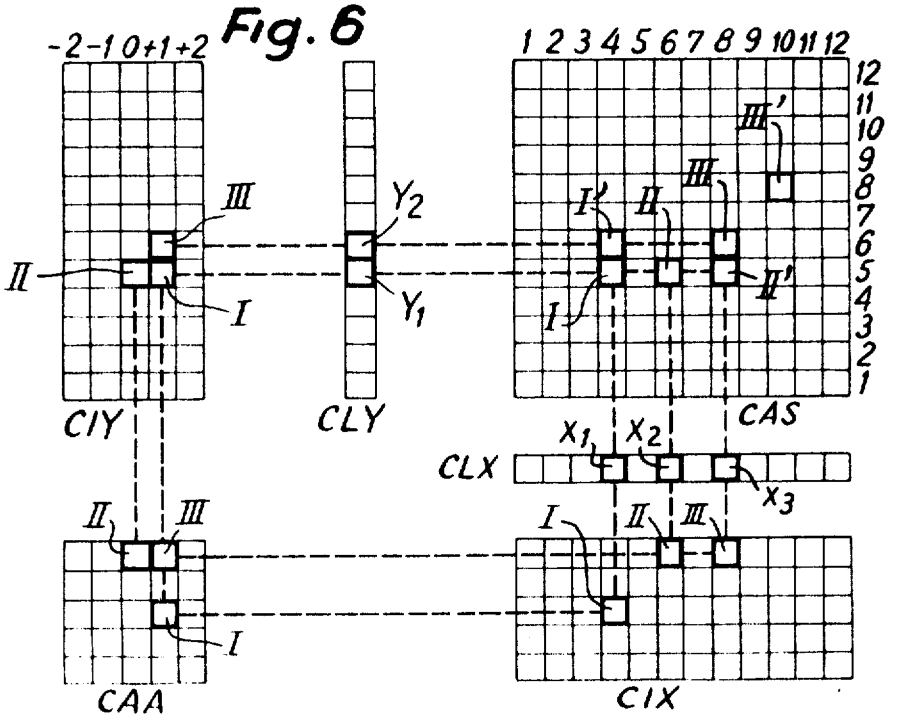
Figure 7:
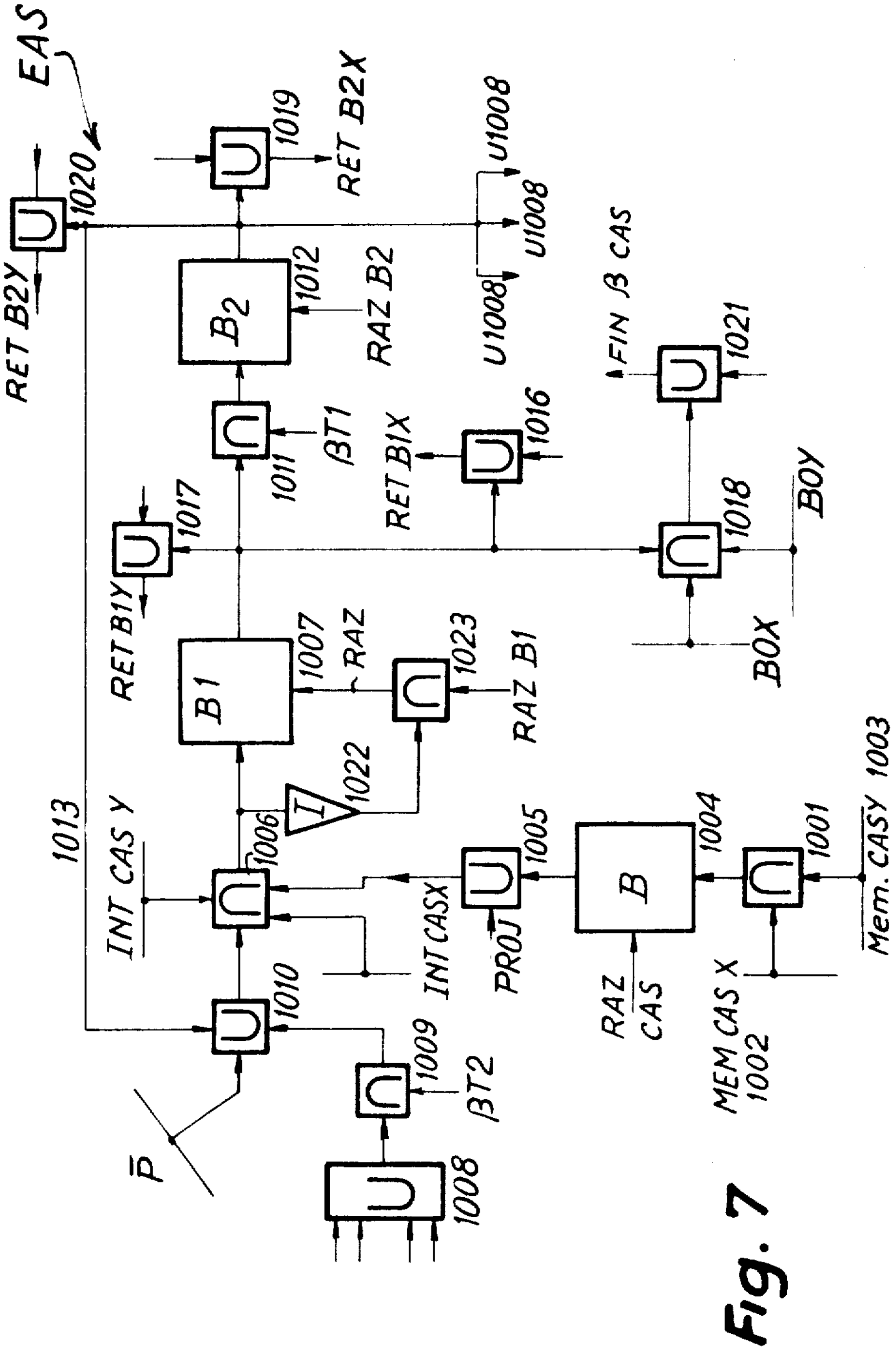
Figure 8:
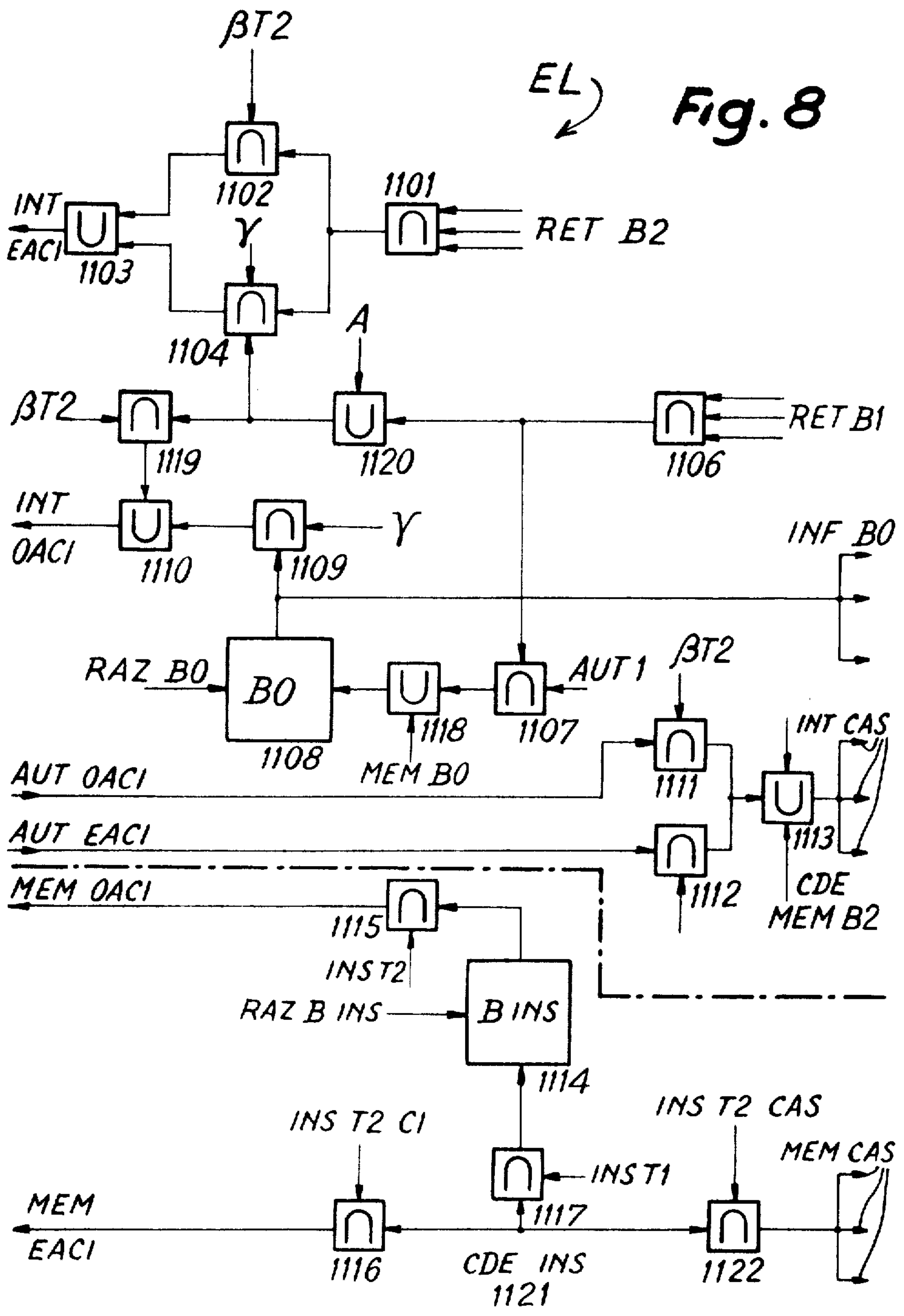
Figure 9:
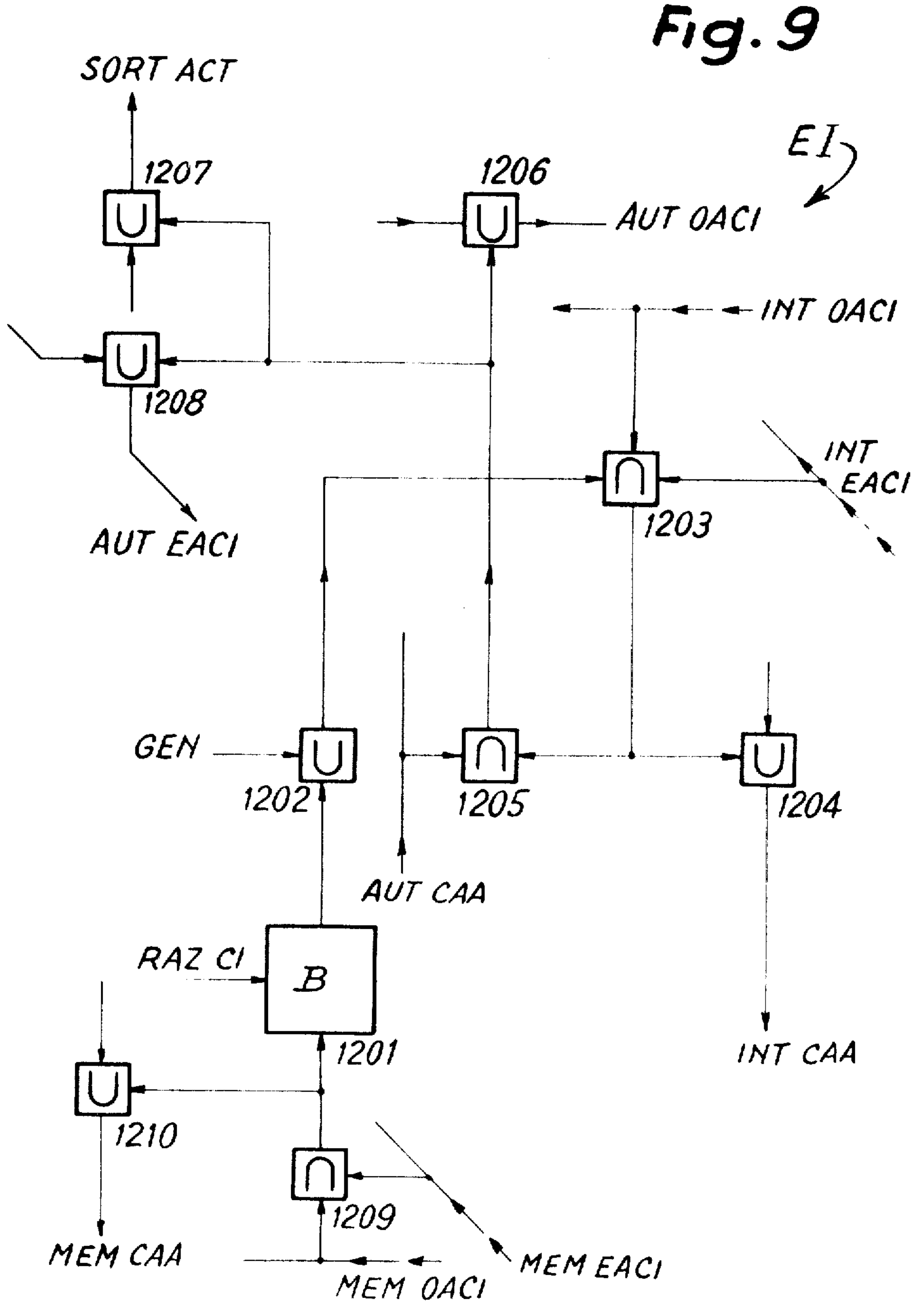
Figure 10:
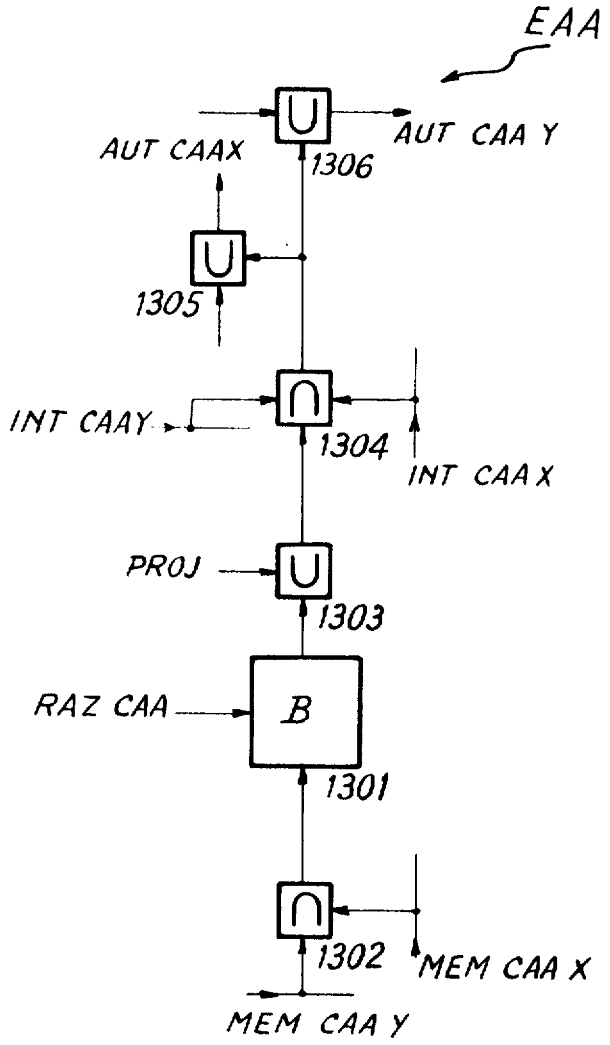

The invention will now be described by way of example with reference to the accompanying drawings in which:

FIG. 1 is a geometrical representation of a complex activity,

FIG. 2 is a geometrical representation of several complex activities having the same origin, FIG. 3 is a diagram of the principal centers of an active memory with two parameters, FIG. 4 is a geometrical representation of various transformations written in an active memory, FIG. 5 represents an active memory in which a complex activity is written in an apparent manner, FIG. 6 illustrates the combinatory power of the active memory, FIG. 7 is a logical diagram of an element of association of situations (EAS), FIG. 8 is a logical diagram of a connecting element (EL), FIG. 9 is a logical diagram of a recording element (EI), FIG. 10 is a logical diagram of an element of association of actions (EAA)

Figure 11:
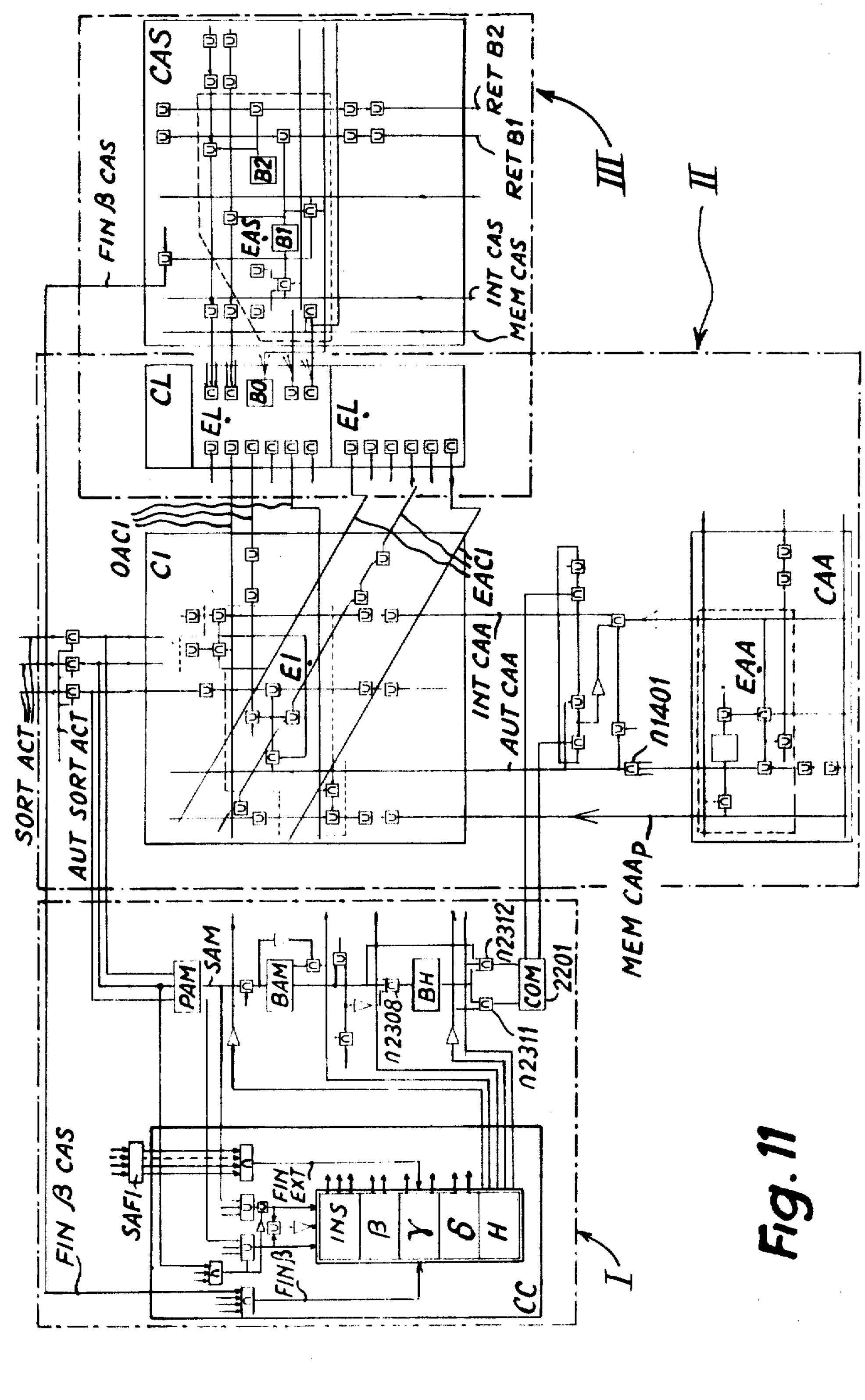
Figure 11A:
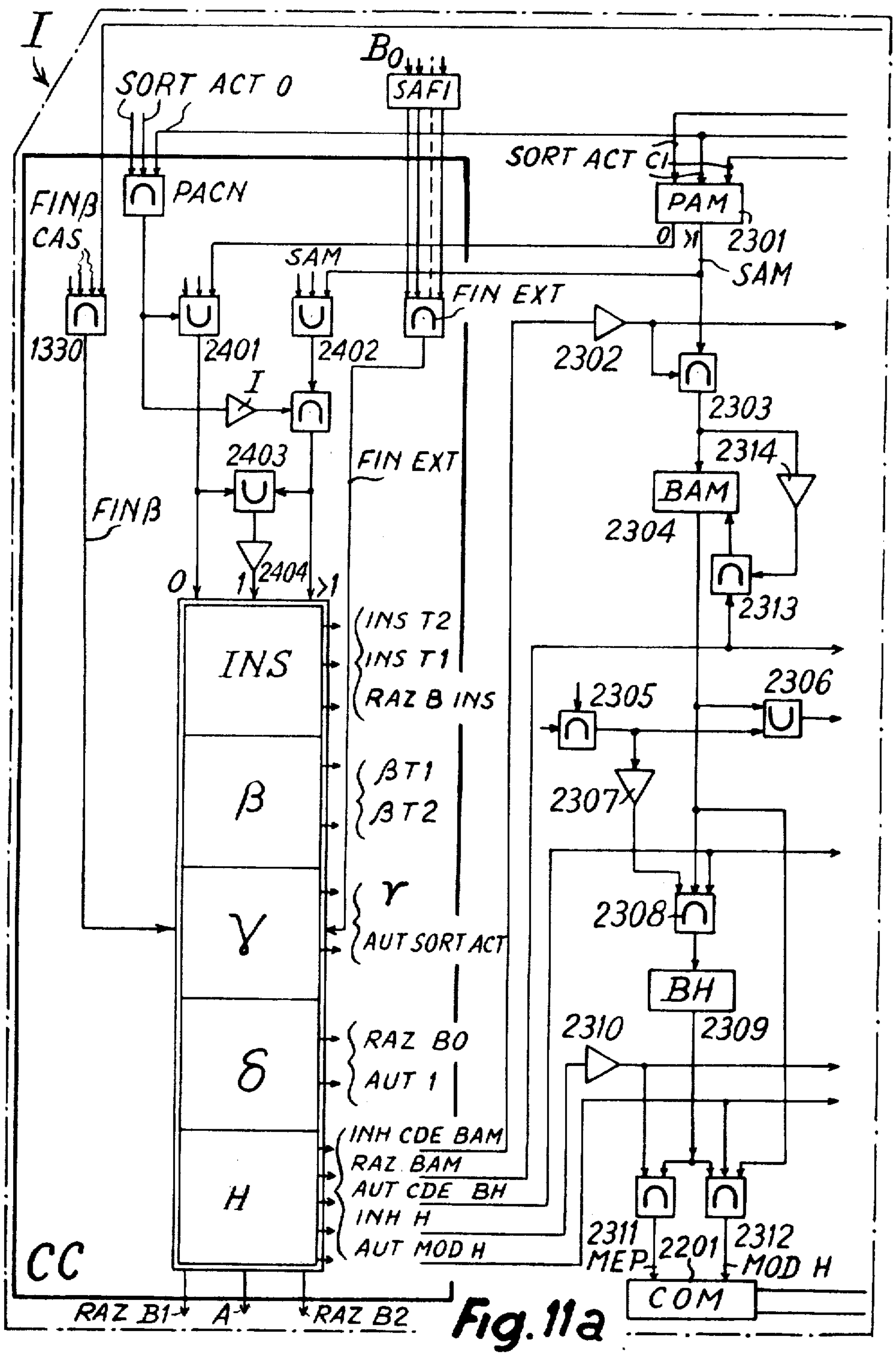
Figure 11B:
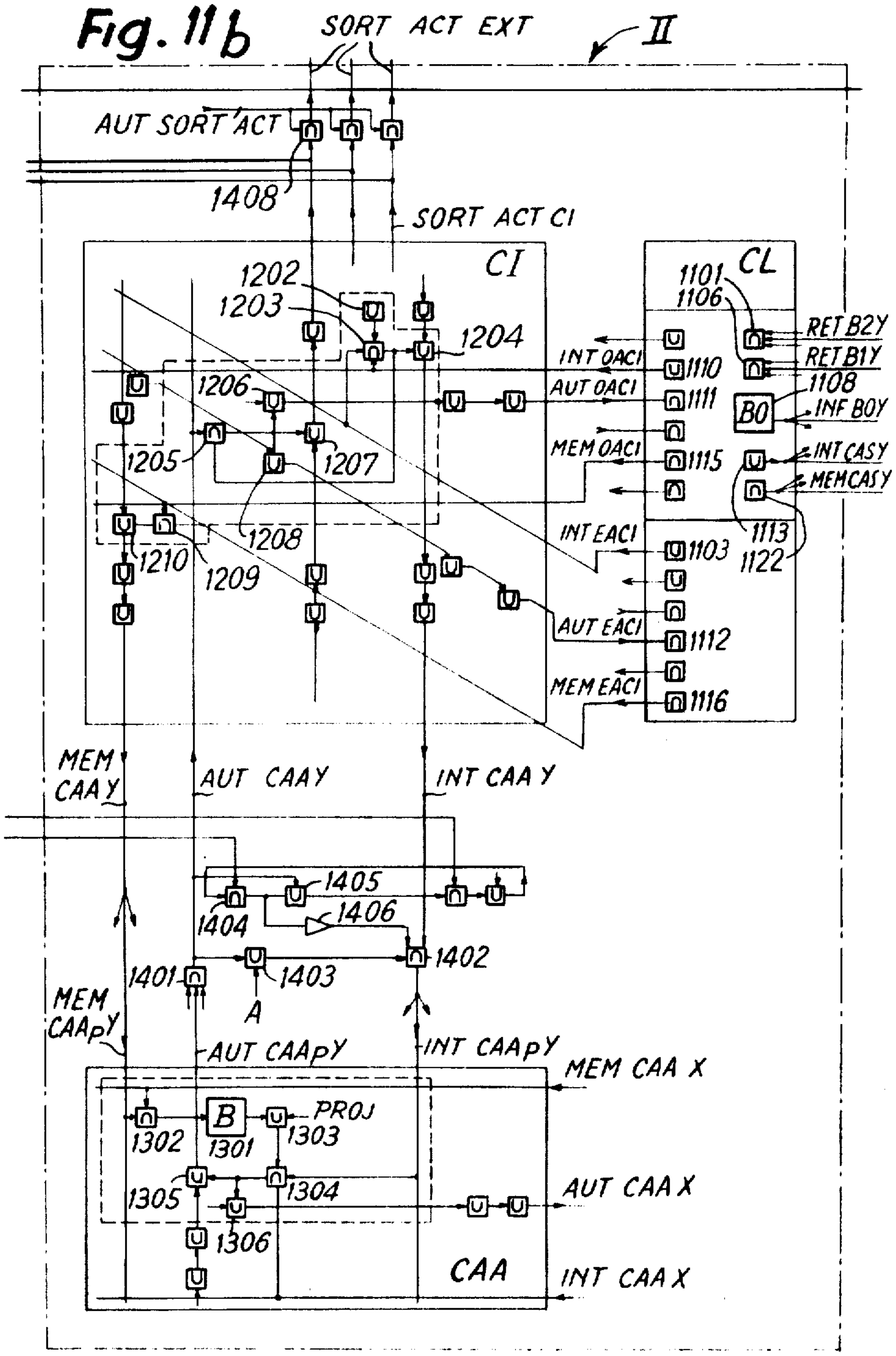
Figure 11C:
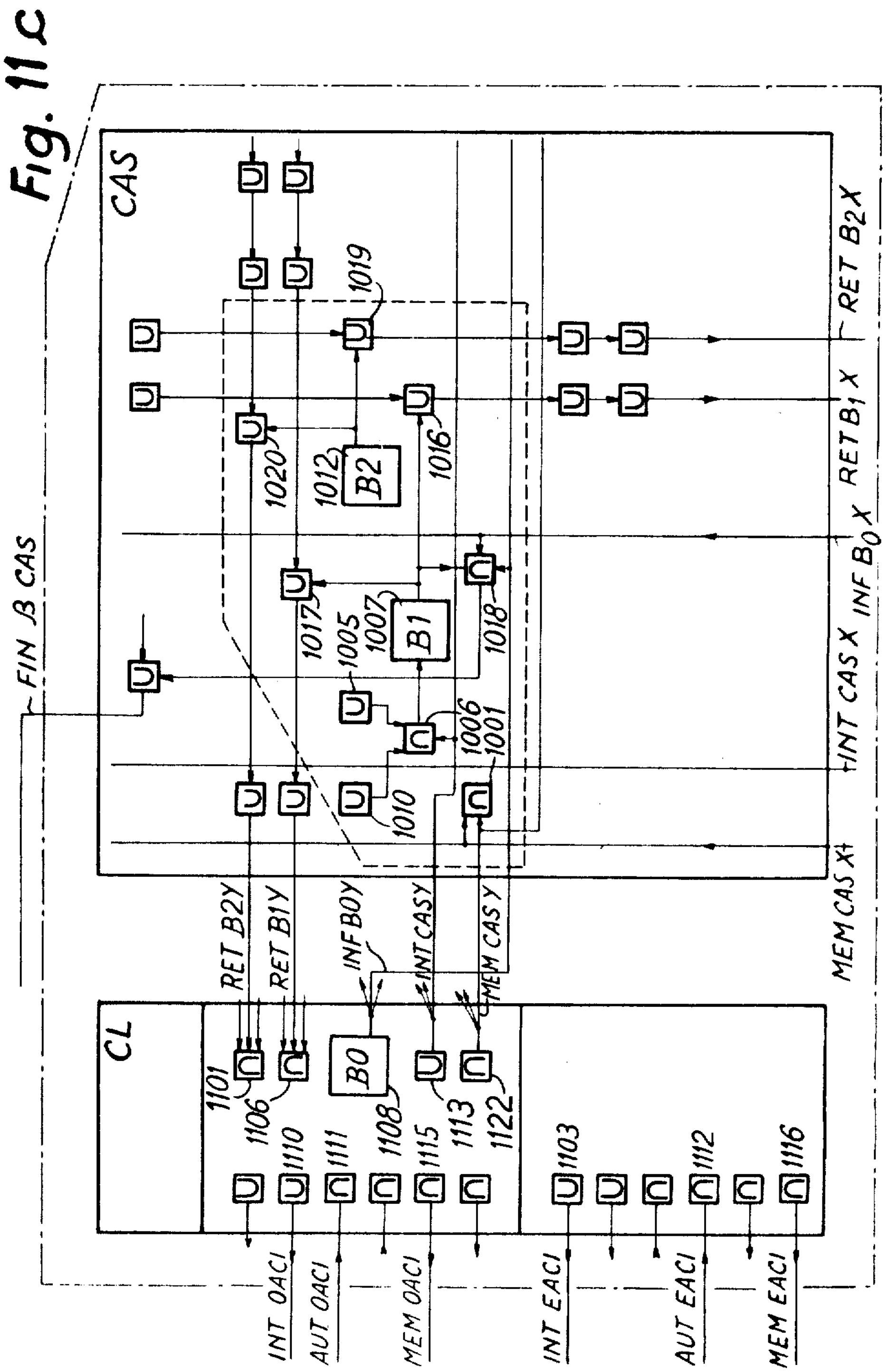
Figure 12:
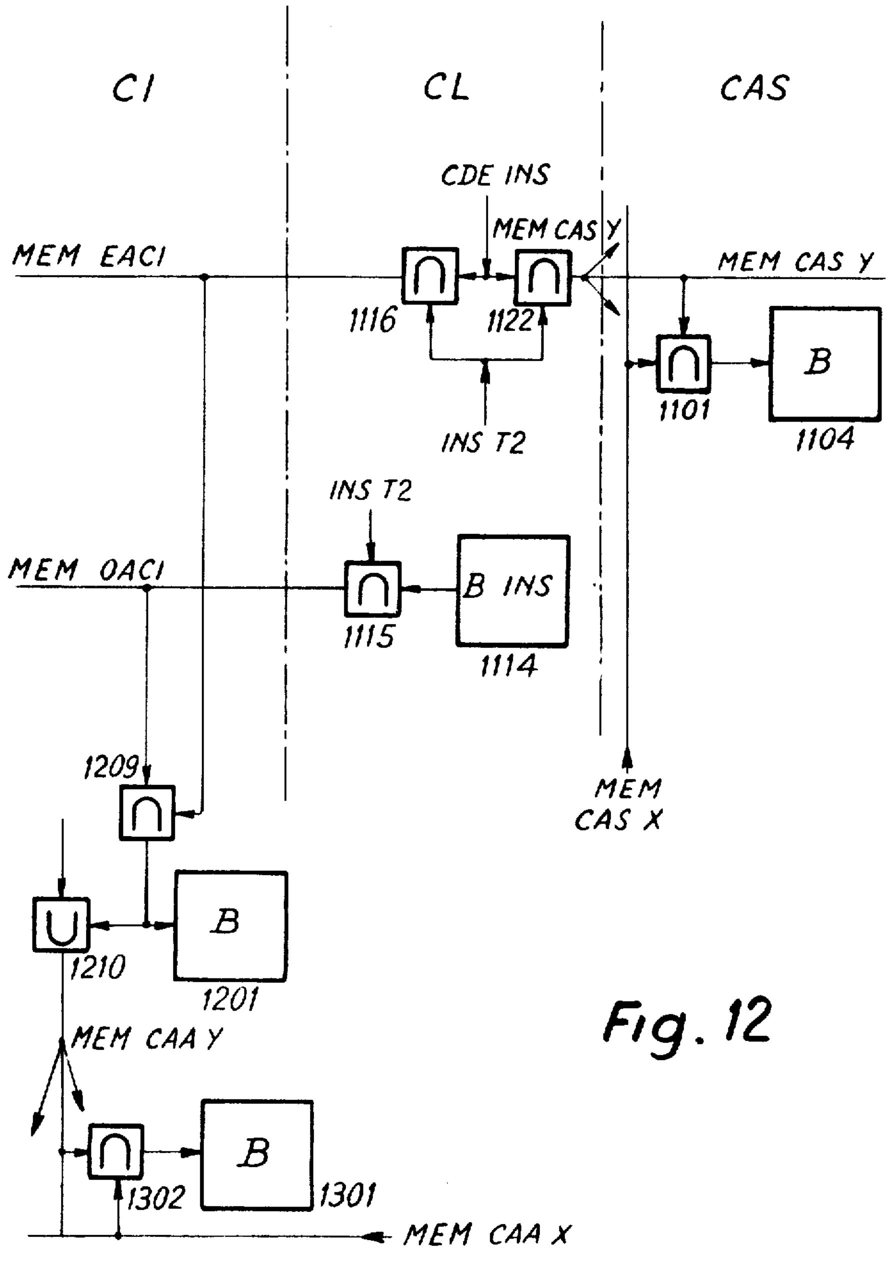
Figure 13:
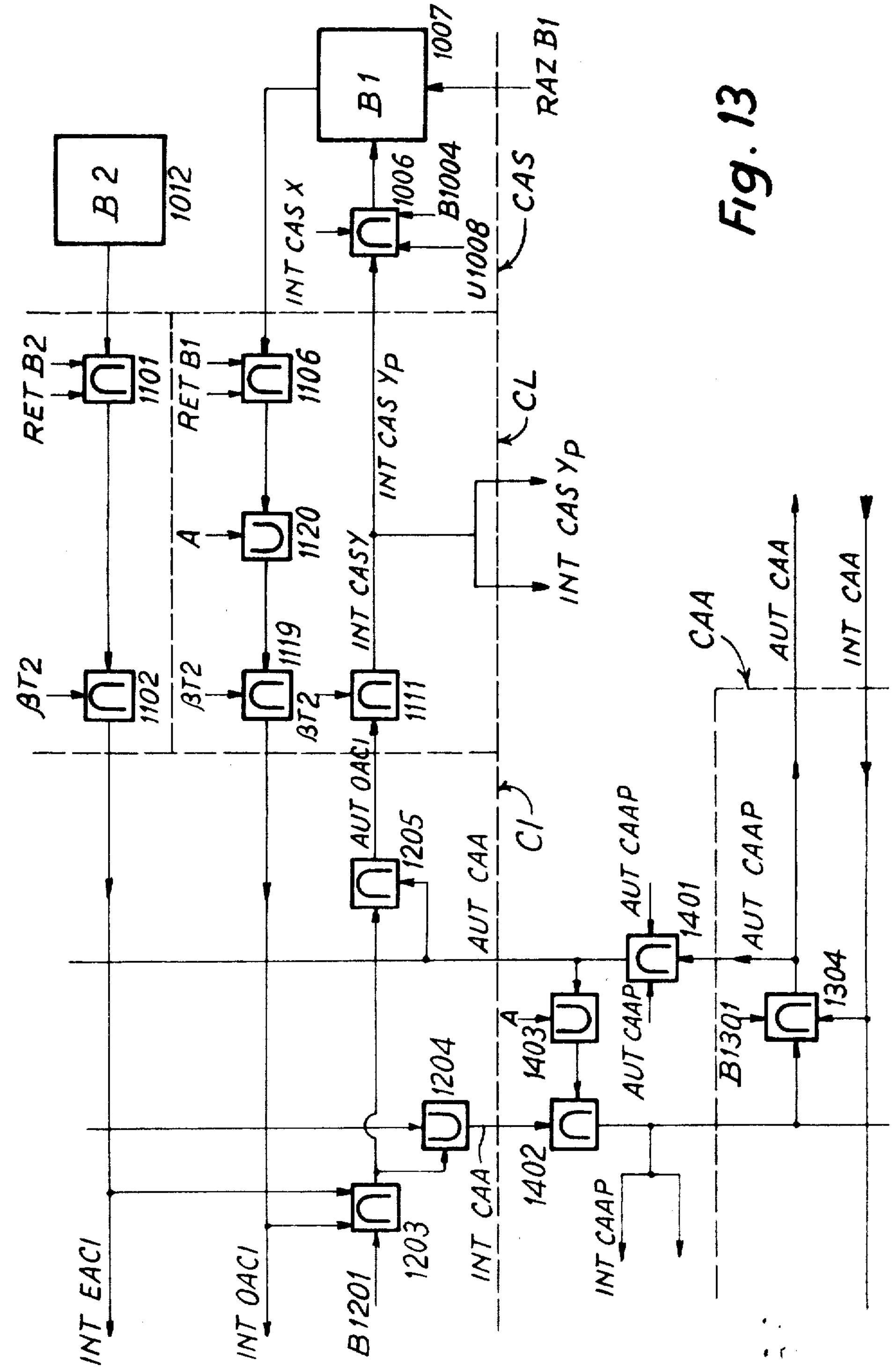
Figure 14:
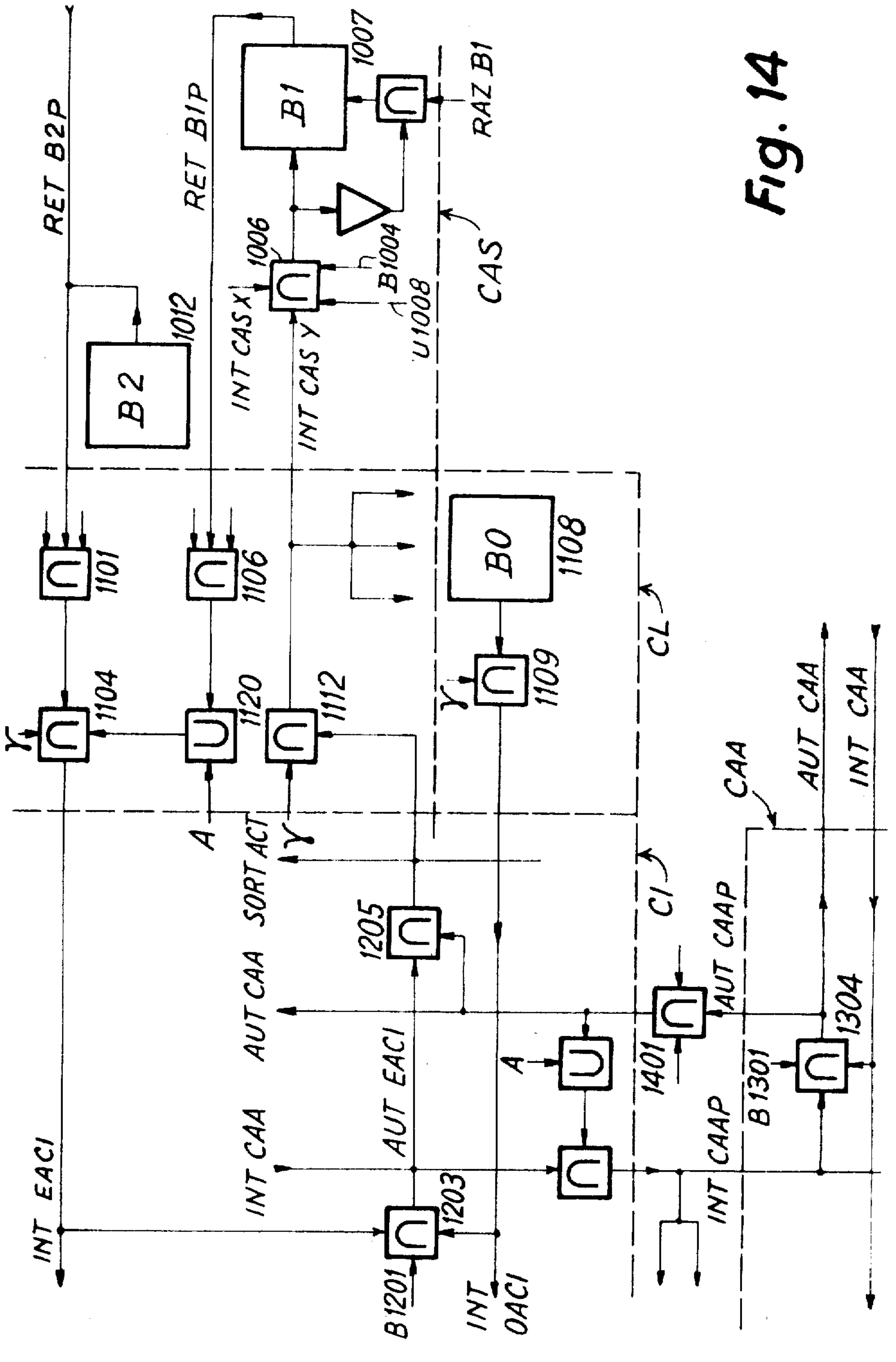
Figure 15:
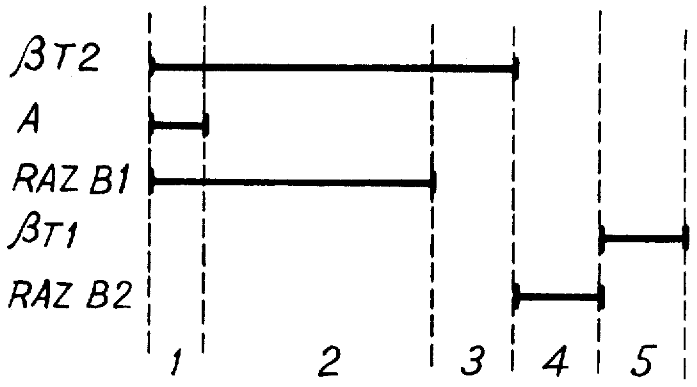
Figure 16:
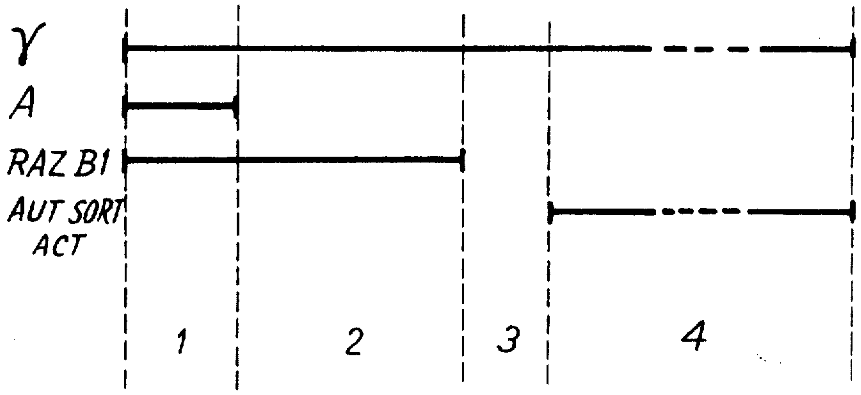
Figure 17:
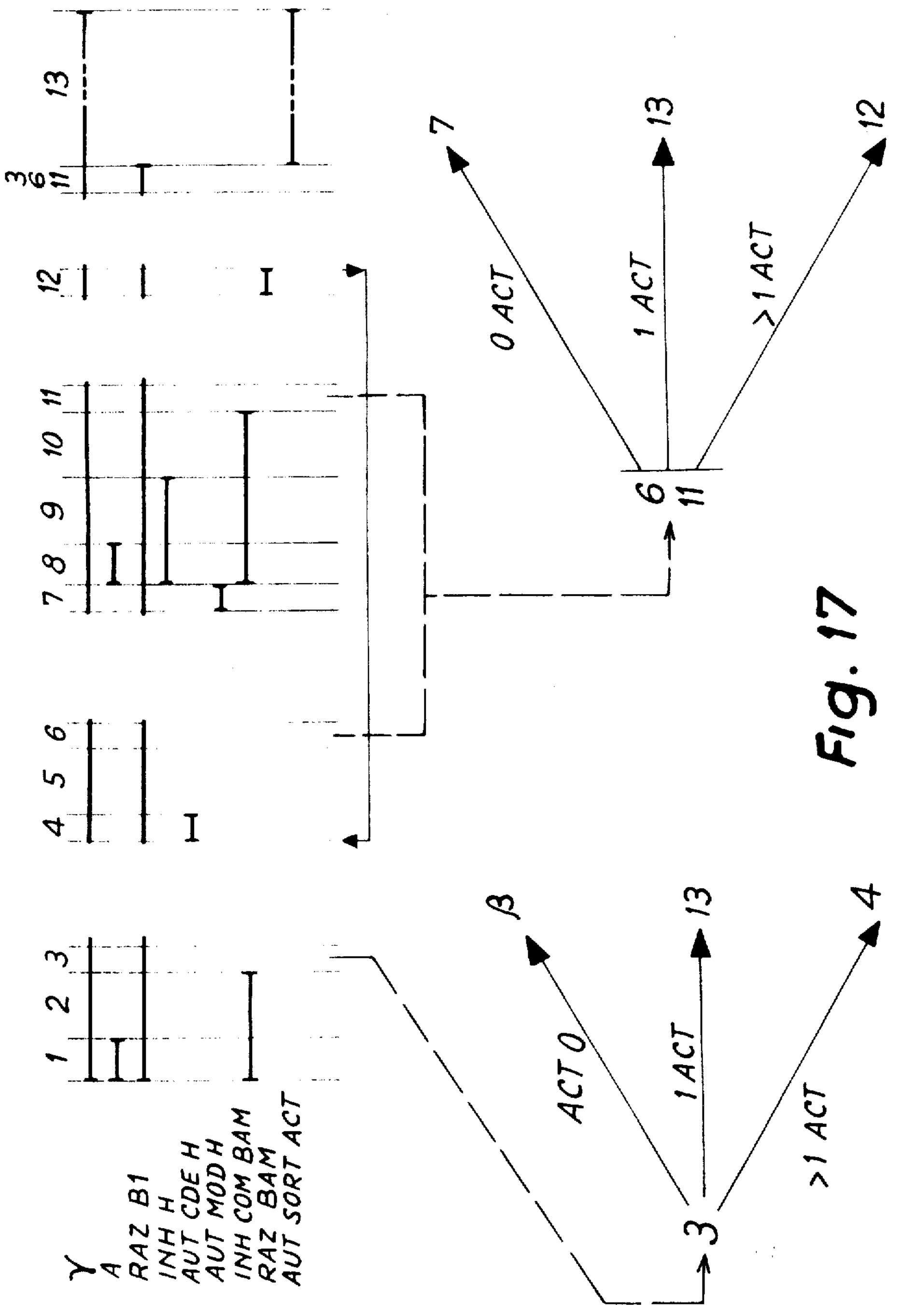
Figure 18:
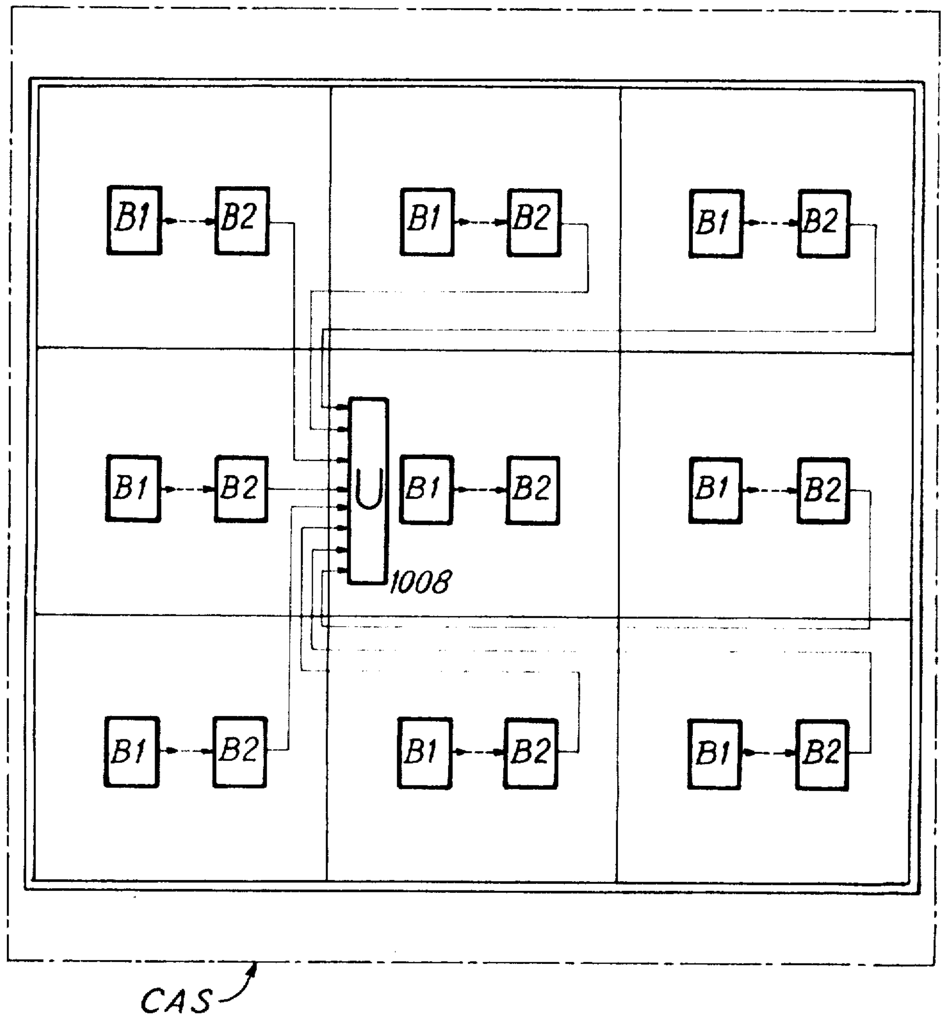
Figure 19:
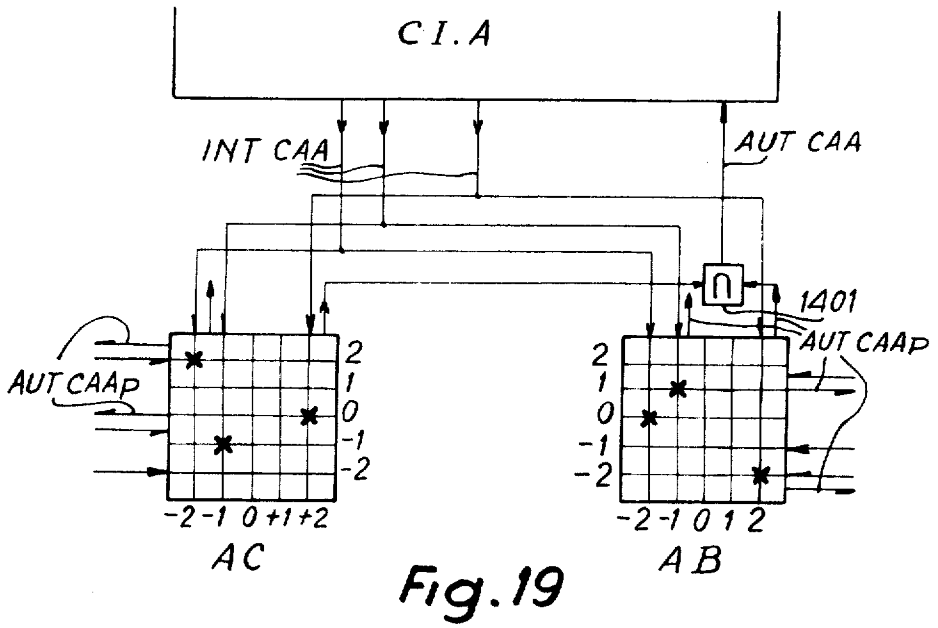
Figure 24:
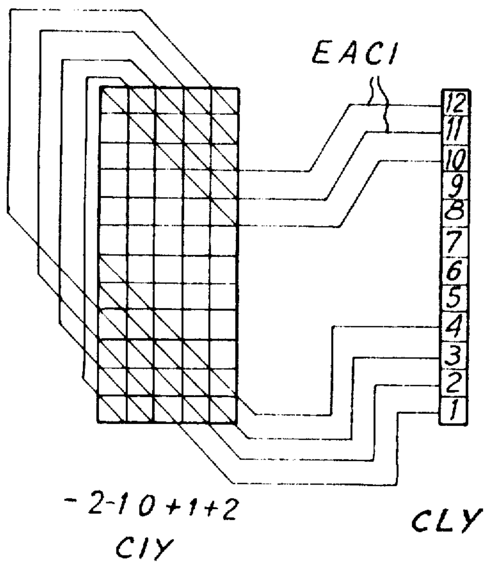
Figure 20:
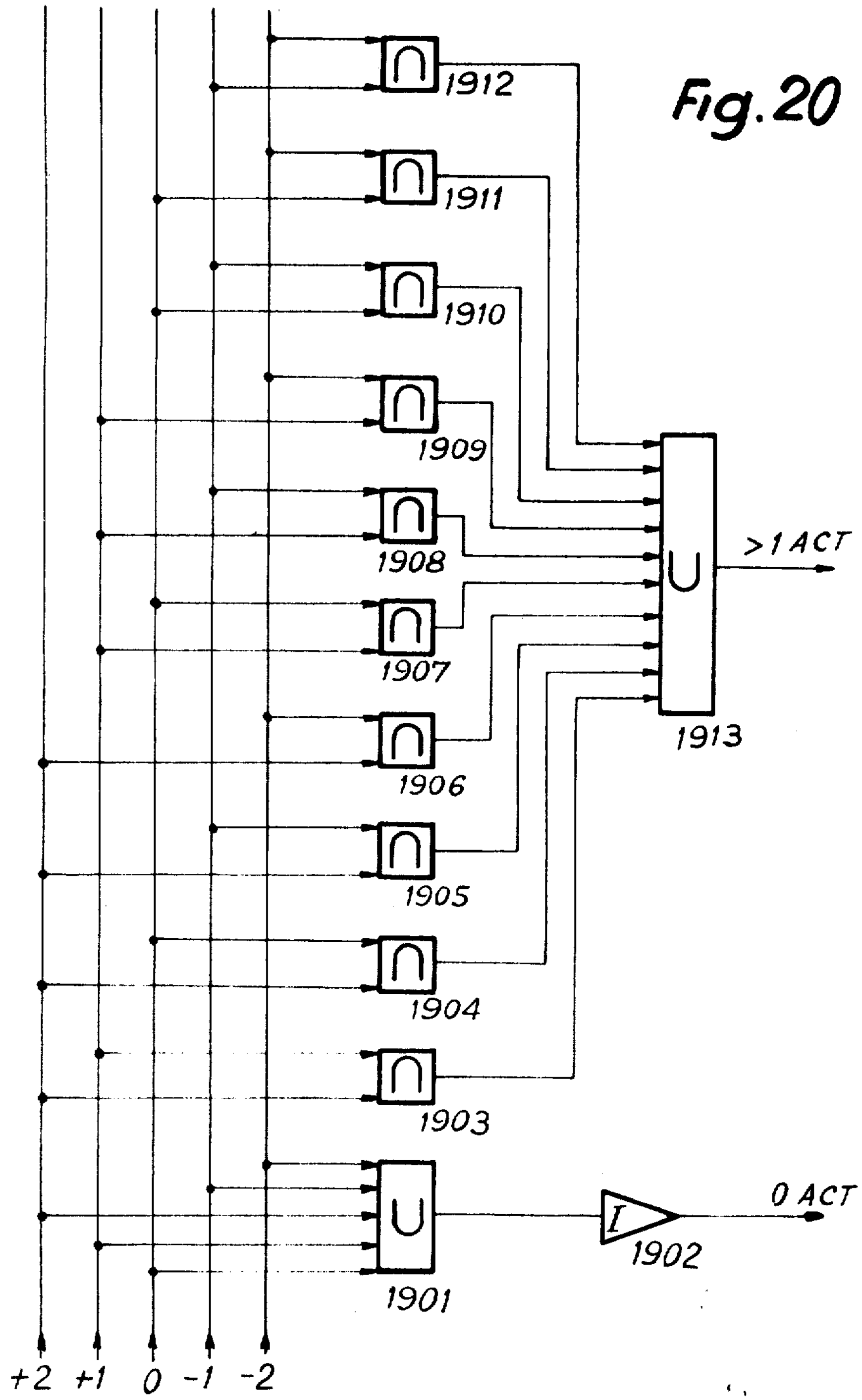
Figure 21:
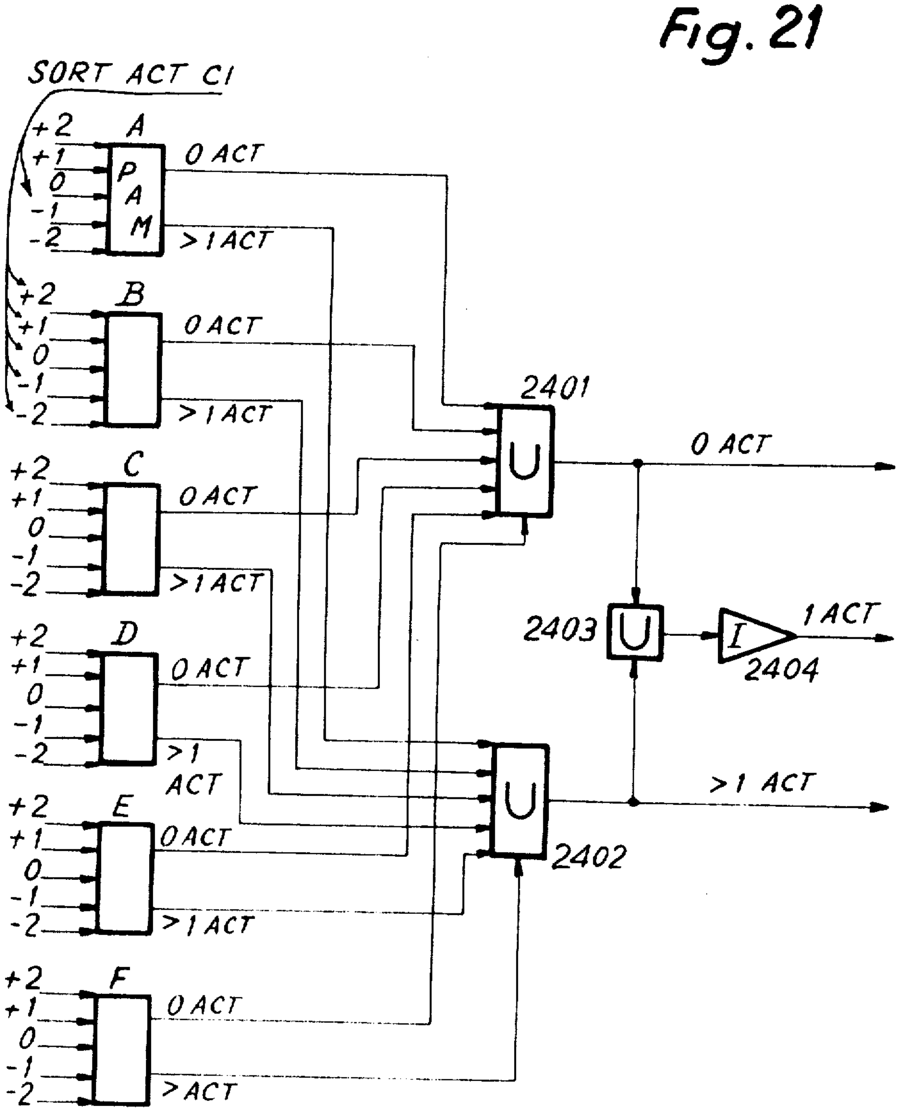
Figure 21A:
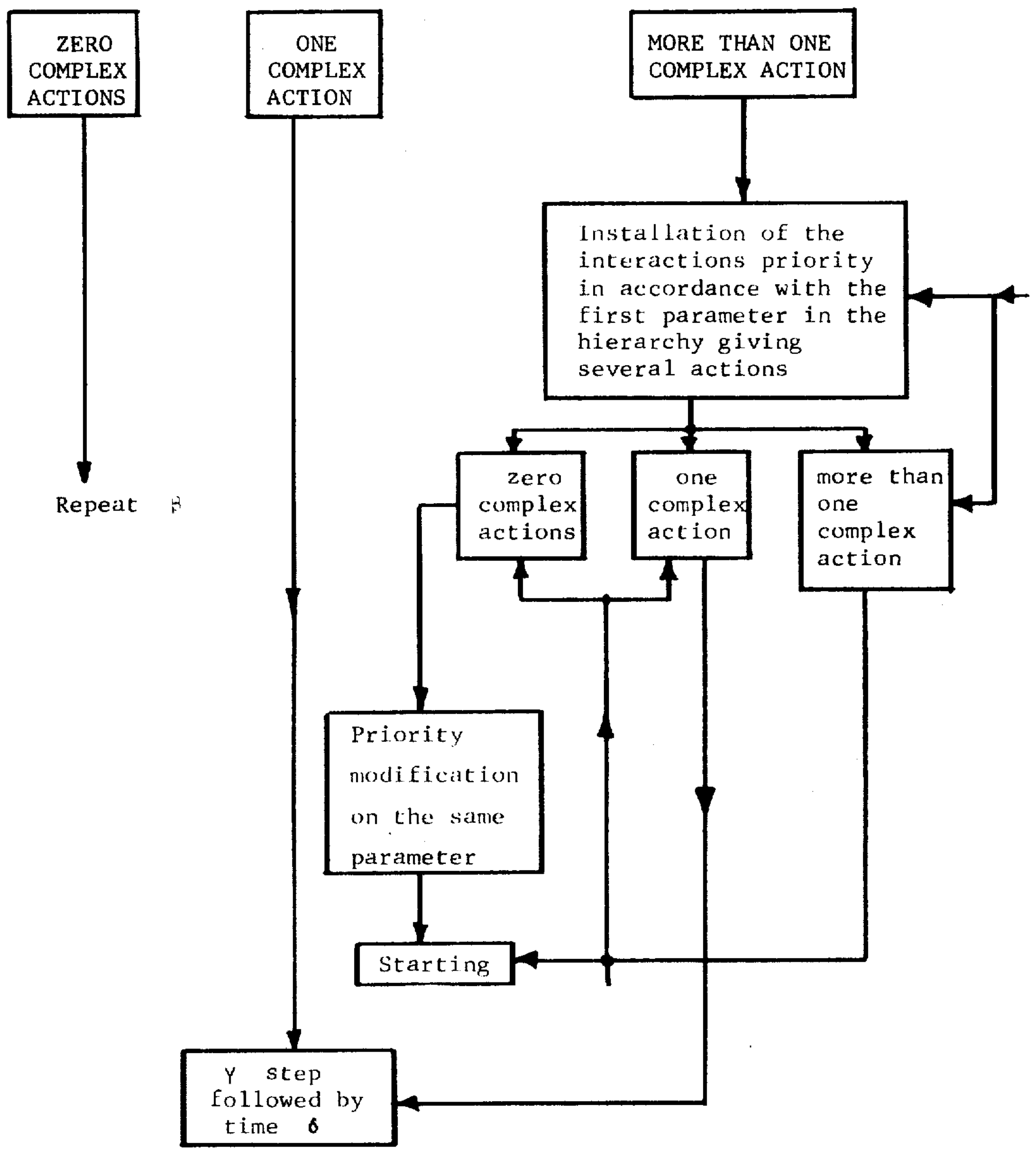
Figure 22:
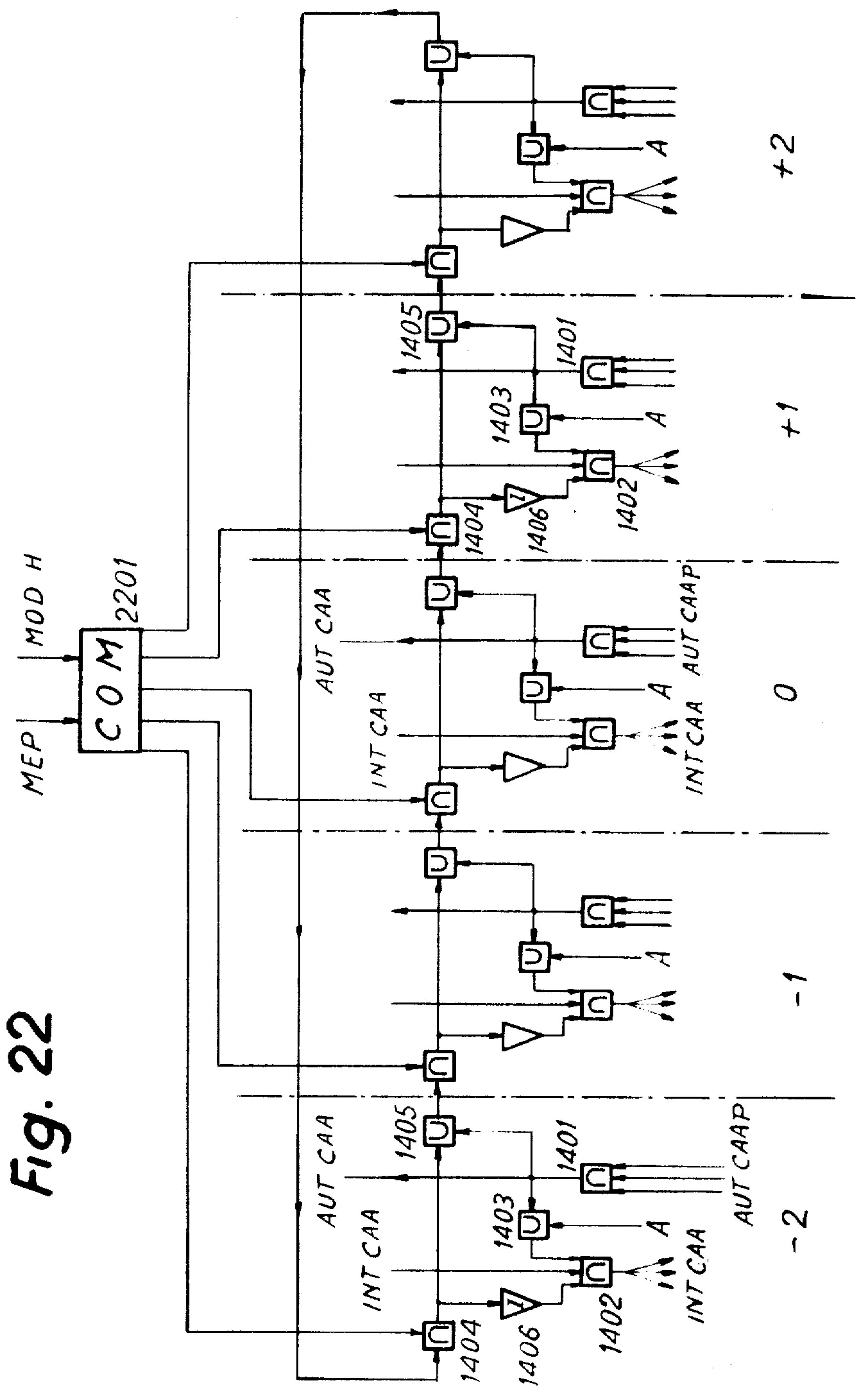
Figure 23:
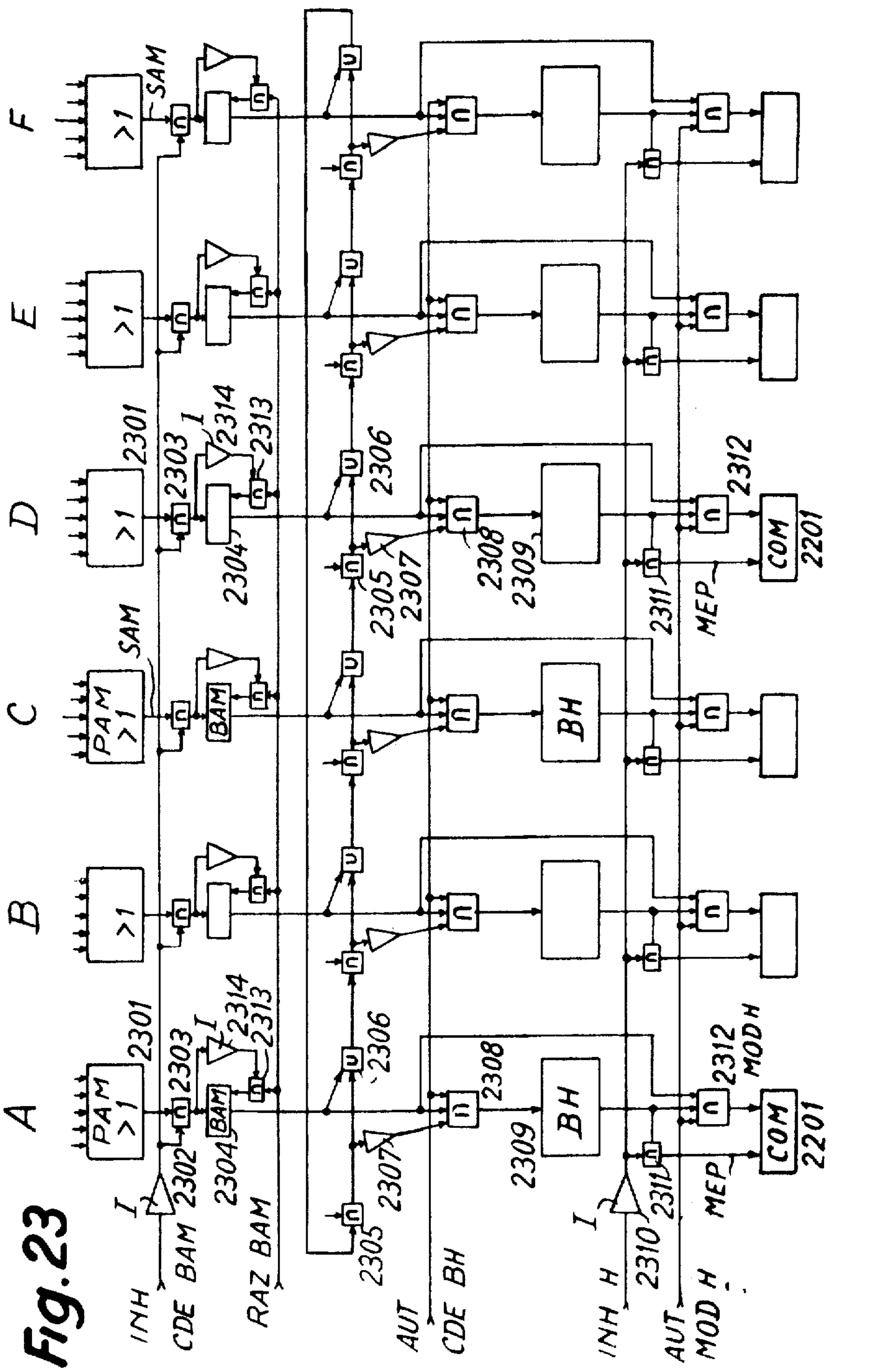
Figure 25:
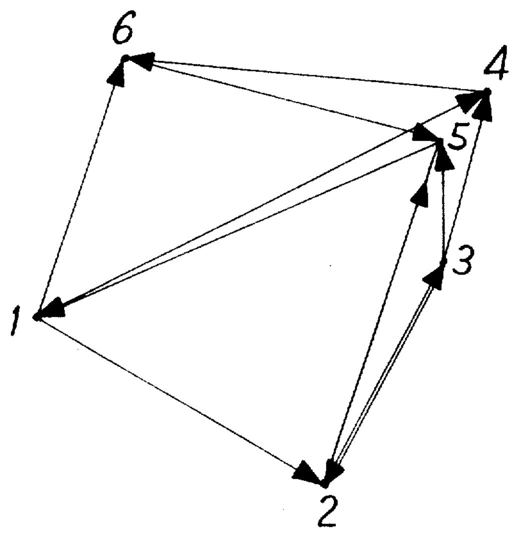
Figure 26:
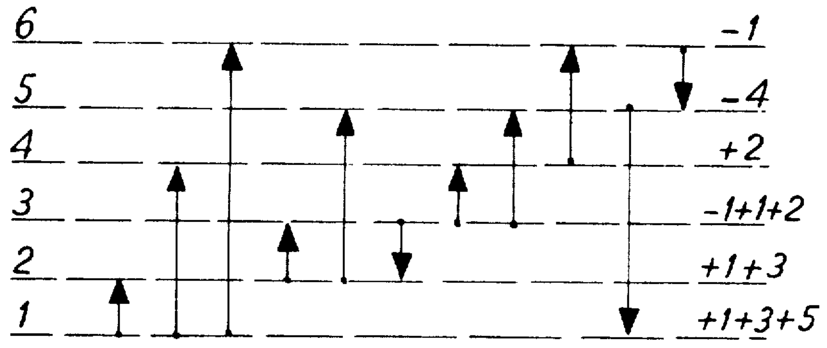
Figure 27:
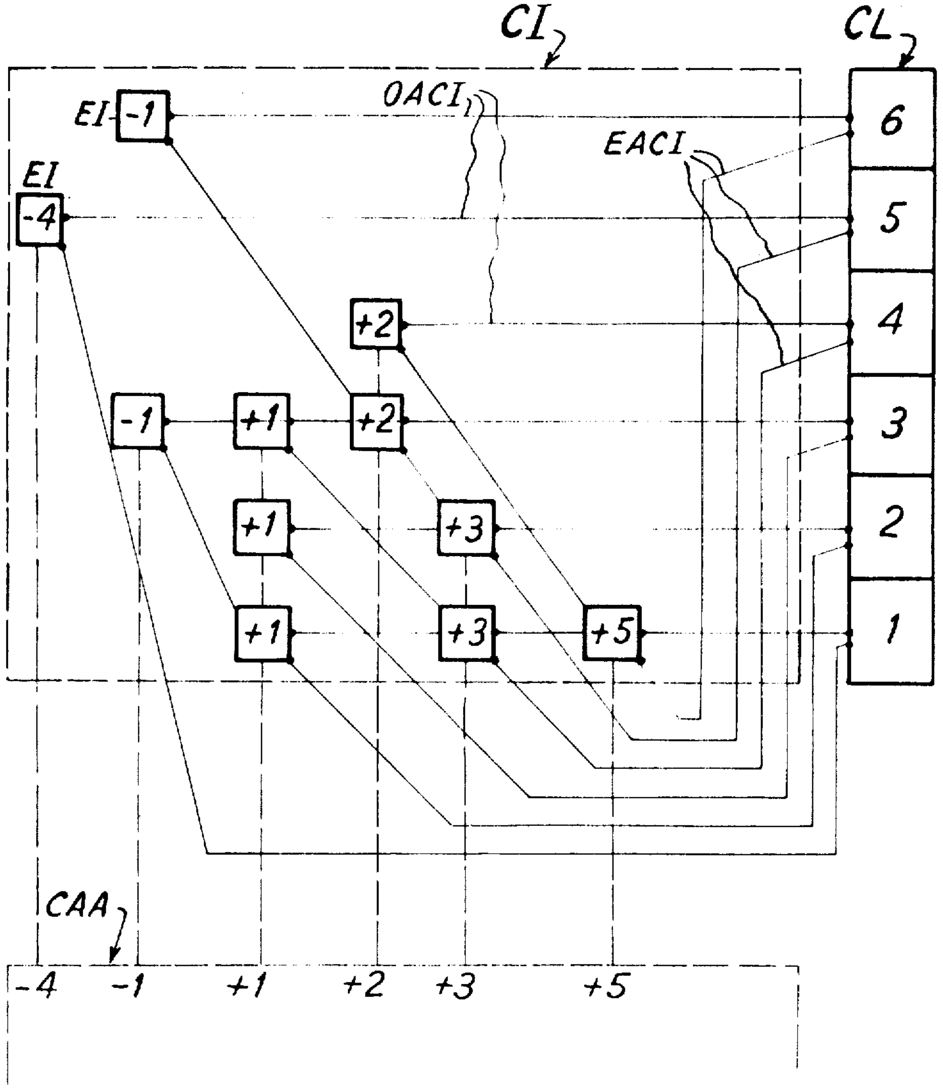
Figure 28:
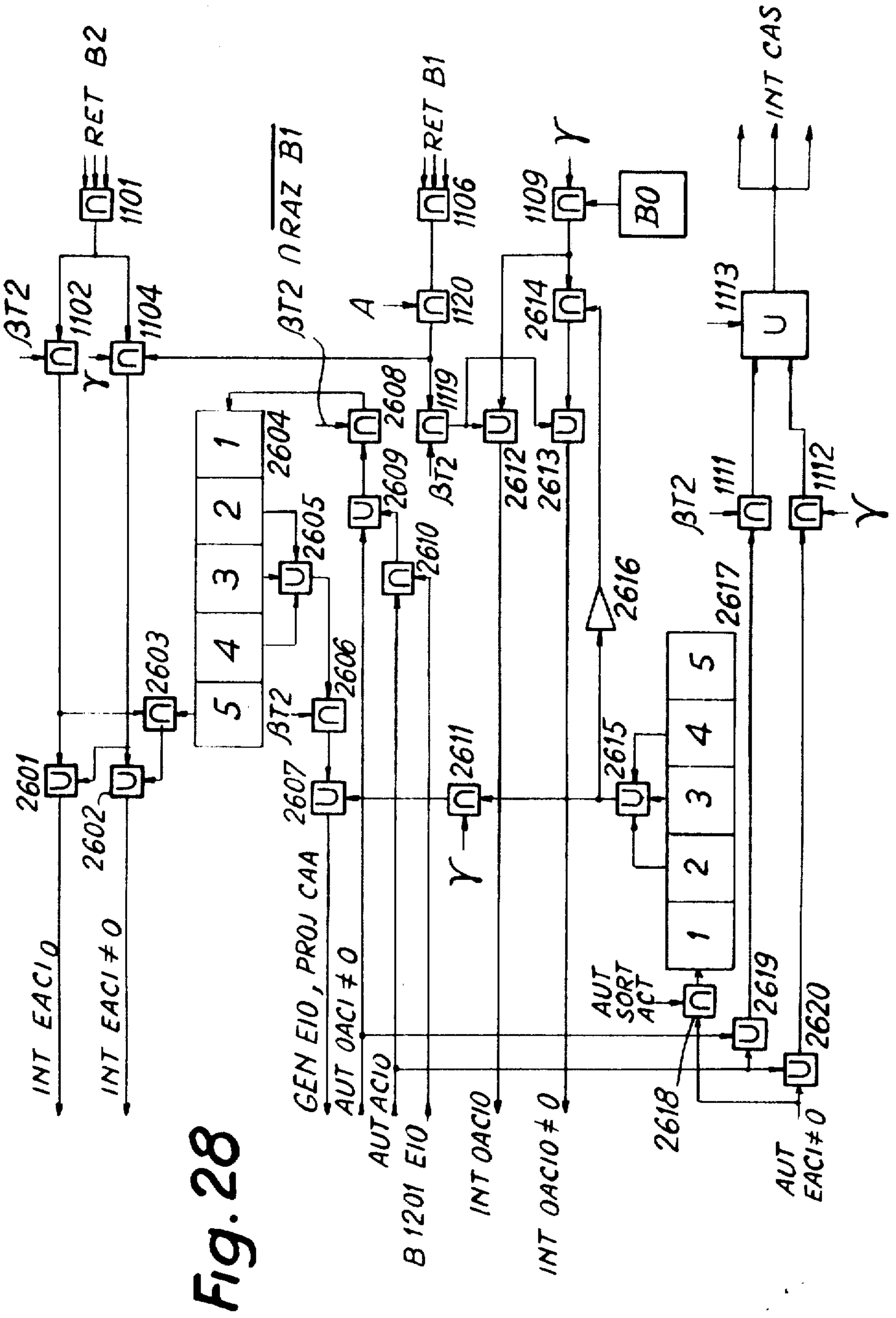
Figure 29:
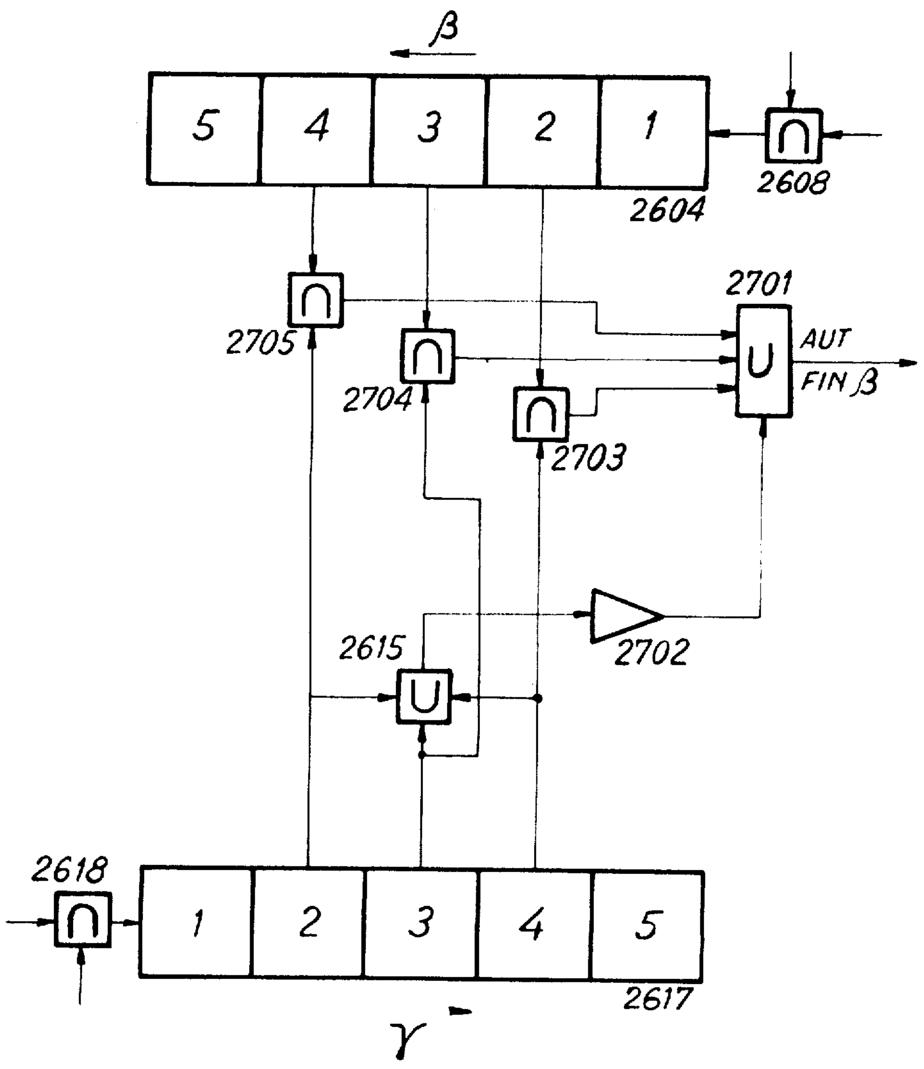
Figure 30:
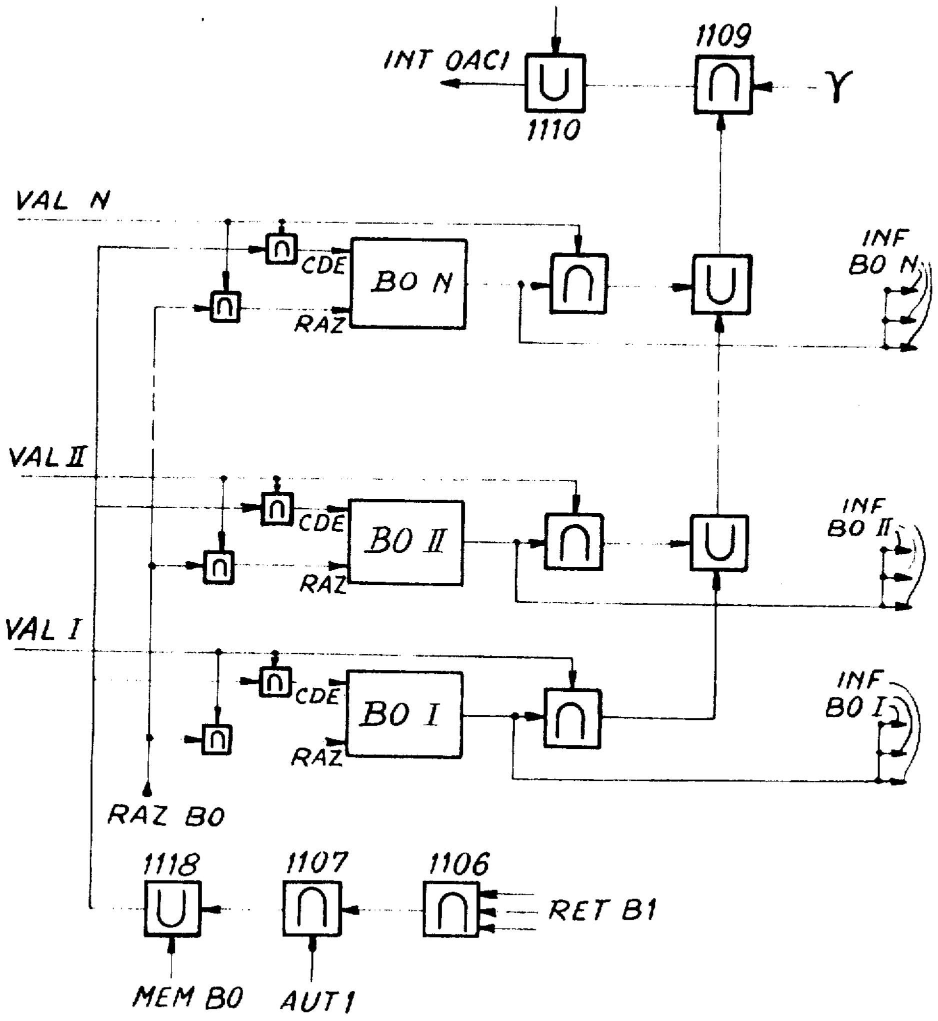
Figure 31:
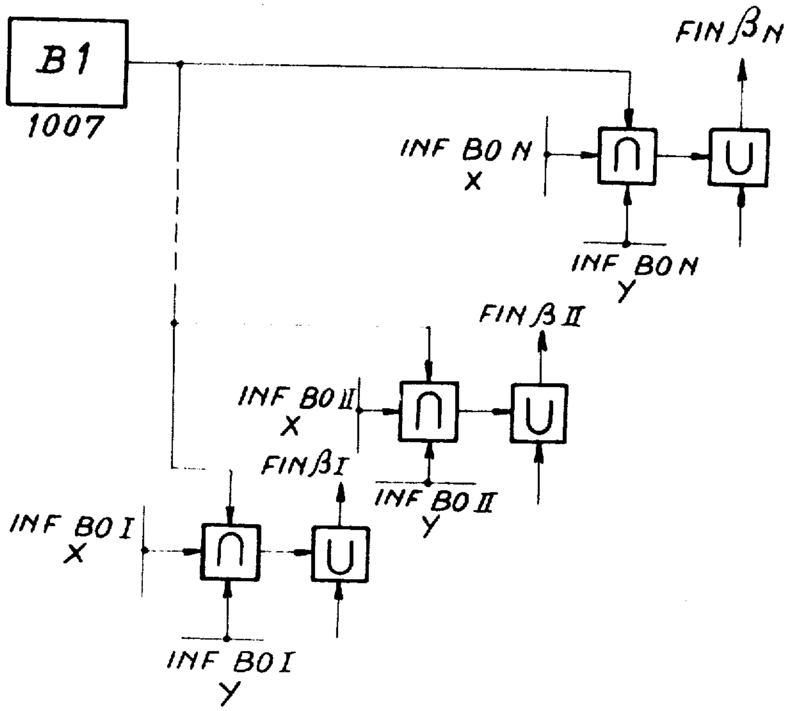
Figure 32:
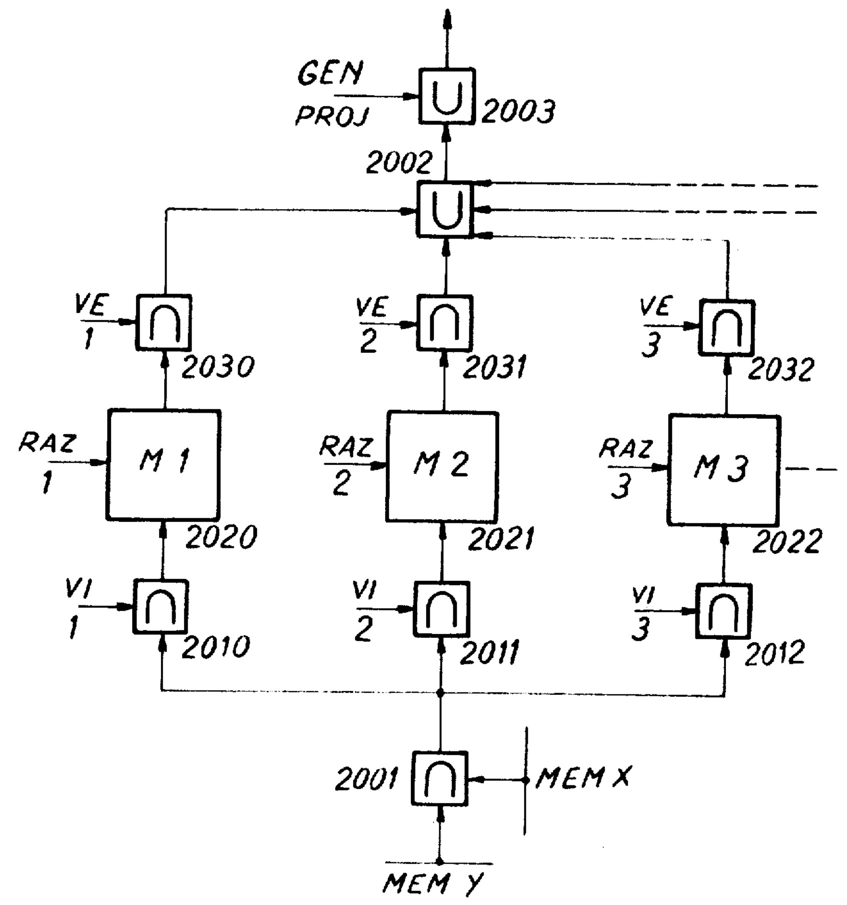
Figure 33:
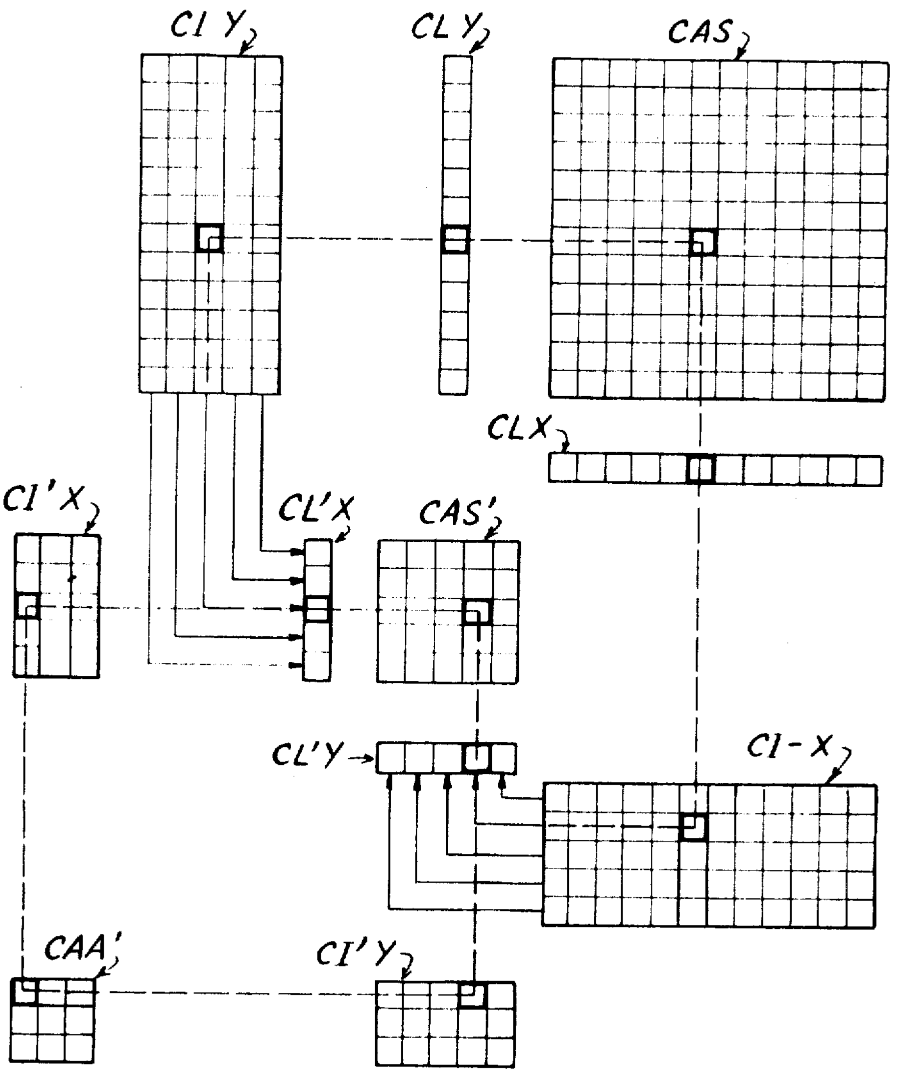

FIG. 11 is a logical diagram of a general inter-connection of the machine showing in particular the connections of the various centers to one another, FIGS. 11*a*, 11*b* and 11*c* show in greater detail parts I, II and III separated by dot-dash lines in FIG. 11, FIG. 12 is a logical diagram of a circuit energized at the time INS $T_2$, FIG. 13 is a logical diagram of a circuit energized at the time $\beta T_2$, FIG. 14 is a logical diagram of a circuit energized at the time $\gamma$, FIG. 15 is a diagram of signals of the time $\beta$, FIG. 16 is a diagram of the signals of the time $\gamma$, without intervention of the hierarchy, FIG. 17 is a diagram of the signals of the time $\gamma$, with intervention of the hierarchy, FIG. 18 shows the connection of a U gate of proximity of an element of CAS, FIG. 19 is an illustration of the necessity of self maintenance, FIG. 20 is a logical diagram of a multiple action gate PAM, FIG. 21 is a diagram of the logical gate supplying to the coordination center the information in accordance with which there is used zero, one or more than one complex action at the time $\gamma$, FIG. 21*a* is a table illustrating the process of choice in case of an ambiguity, FIG. 22 is a logical diagram of the inter-actions priority circuit in each parameter, FIG. 23 is a logical diagram of the inter-parameters hierarchy circuit, FIG. 24 is a diagram of the EACI connections in a recording center providing a relooping for the parameter in question, FIG. 25 is a diagram of a network with six nodes and eleven links, FIG. 26 is a diagrammatic analysis of the network of FIG. 25, FIG. 27 shows a connection center and recording center embodying the analysis of the network of FIG. 25 in a machine for putting an extraction process into operation, FIG. 28 is a logical diagram of a connection element EL allotted to a weighted node or level, FIG. 29 is a logical diagram of a circuit of elaboration of an end authorization $\beta$ where the element EL of FIG. 28 is used, FIG. 30 shows the modification of a connection element EL comprising several memories $B_0$, FIG. 31 shows the modification of an element of CAS in the case where the element EL comprise several memories $B_0$, FIG. 32 shows an element of memorization center having several memories, and FIG. 33 shows active memory connected to a second active memory at the region of a center of association of actions.

BASIC STRUCTURES AND GENERAL LOGIC OF AN ACTIVE MEMORY

Since the transformation of a system defined by several parameters may be represented in a *n*-dimensional space by two points and a chain of vectors joining these two points, what are the pieces of information which must be stored to bring about the inscription i.e., the recording? How can the information be broken down into simple elements which are easy to store? These are the two questions the reply to which enables the basic structure of an Moreover, it memory to be determined.

For practical reasons, the *n*-dimensional space considered is a discrete space, which means that each parameter (also called a "variable") takes only discrete values. Moreover, it is supposed that the number of quantification levels of each of these parameters is finite: in a machine which will be described below by way of example, this number is 12 for each parameter. Each quantification level of a parameter represents a situation in accordance with this possible parameter for the system and for this reason we shall speak sometimes of levels of situations in the active memory.

There will be examined the case of a complex activity composed of a complex situation, a complex action starting from this situation and the resultant complex situation, and the end of said complex action. This complex activity may be represented by a point P, a vector $\vec{V}$ tied to this point, and the end point of this vector, which end point is defined bi-univocally by the knowledge of the first two elements.

In the space considered, the point P is defined by its *n* co-ordinates. As free vector, the vector is defined by its *n* components. The complex action will be defined completely if there is expressed a condition of connection of the vector to the point considered. The memorization or storage of a complex action will be translated in the active memory by the presence of the following three types of information:

1. The association of the co-ordinates of the point;
2. The association of the components of the vector;
3. For each parameter the coincidence of the value of the co-ordinate of the point and of the value of the component of the vector in accordance with this parameter.

Thus, for the transformation shown in FIG. 1 with parameter X and Y, the information to be stored is represented by the conjunction of co-ordinates and of components in brackets as given by the following table:

| | |
|---|---|
| Association of the co-ordinates of P (called information 1) | (1,2) |
| Association of the components of $\vec{V}$ (called information 2) | (+2,+1) |
| Coincidence of the co-ordinate of P and of the component of $\vec{V}$ for each parameter. (called information 3) | :(1,+2) |
| | Y:(2,+1) |

If one stores a single complex activity at the starting point P considered, information 1 and information 3 are sufficient to find this complex action; if one memorizes for instance two transformations (P, $\vec{V}_1$) and (P, $\vec{V}_2$) starting from this same point (see FIG. 2):

| | | 1st transformation | 2nd transformation |
|---|---|---|---|
| Information 1 P | | (1,1) | (1,1) |
| Information 2 $\vec{V}$ | | (+1,+1) | (+2,+2) |
| Information 3 X | | (1,+1) | (1,+2) |
| | Y | (1,+1) | (1,+2) |

It is found that the information 1 and information 3 by themselves do not make it possible to find bi-univocally the transformation (P, $\vec{V}_1$) and (P, $\vec{V}_2$). In fact, the transformations (P, $\vec{V}_3$) and (P, $\vec{V}_4$) would lead to the same information 1 and informations 3 if the components of $\vec{V}_3$ were (+1, +2) and of $\vec{V}_4$ were (+2, +1). On the other hand, the addition of the information 2 enables these transformations to be excluded.

CENTERS OF STORAGE

The types of information 1, 2 and 3 defined above are memorized by means of storage elements (EM) of the binary type, i.e., comprising two states, one indicating that the information which is alloted to it is not stored and the other indicating that the information is stored. To simplify the terminology, it will be stated that these memory elements EM are bistable flip-flops, the ZERO, or base state corresponding to the non-stored state and the flipped or ONE state to the stored state.

The type of information 1, 2 and 3 are sufficiently simple to be able to be shown by the position of a binary storage element, if the structure of the active memory is set up in the manner explained below:

a. Center of Association of Situations (CAS)

To memorize the associations of co-ordinates of points (information 1), there are provided as many storage elements EM as there are points in the space considered. The association of the co-ordinates of a point corresponding to a complex situation is memorized if its storage element EM is flipped. The set of these storage elements constitutes the Center Of Association Of Situations (CAS), the number of quantification levels being capable of being different for each of the different parameters.

In a space of more than two dimensions, the association of the co-ordinates of the points implies a considerable number of storage elements EM. In fact, the representation of a space with $n$-dimensions having $p$-levels of quantification in accordance with each of them, will necessitate $p^n$elements, and the number will quickly become prohibitive as the number of dimensions increases. This difficulty is overcome by projecting this space having $n$-dimensions into sub-spaces with at least two dimensions. In the planes thus formed (for the sub-spaces with two dimensions), one associates in pairs the co-ordinates of the points of the space by storage elements; as a result the association of the co-ordinates of a point of the $n$-dimensional space representing a complex situation is stored, not by the flipping of one storage element, but of several storage elements EM corresponding to the projections of said point in the planes considered. There will thus be several centers of association of situations, each parameter appearing in a number of them.

b. Center of Association of Actions (CAA)

To store the associations of the components of vectors representing complex actions (information 2), one proceeds in the same manner by providing as many storage elements as there are possible free vectors in the space considered. The association of the components of a free vector is stored if the storage element EM corresponding to this free vector is flipped. The set of these memory elements forms the Center Of Association Of Actions (CAA).

When there are more than two dimensions in the space considered, one proceeds in the same manner as for the Centers of Association of Situations (CAS) by creating several Centers of Association of Actions (CAA) associating for instance the components of the vectors in pairs.

In practice, one may be led to limit the number of free vectors capable of being stored, i.e., the number of actions capable of being effected from a complex situation. Thus for instance, one may prescribe that in an active memory taken by way of example the components of the vectors of the space considered cannot exceed twice the unity of measurement of the axis of co-ordinates considered. Accordingly the components of the free vectors on each axis will be limited to the following five values: −2, −1, 0, +1, +2. One can of course permit possibilities of variation which are different in number or in amplitude in accordance with the parameters.

c. Recording Center (CI)

To store the information for 3 for each parameter, i.e., the coincidence of the value of a co-ordinate of a point and of the value of the component of the vector associated with it, there is provided a storage element for each coincidence possible.

In a machine taken by way of example, one will accordingly have for each value of a co-ordinate five memory elements representing respectively the coincidence of this co-ordinate with the components −2, −1, 0, +1, +2 of the vectors capable of having their origin at the point representative of a complex situation in the corresponding space. All the storage elements capable of storing this coincidence for all the values of a parameter form the Recording Center also called CI.

If the number of levels of quantification on an axis is 12, there would be accordingly 5×12=60 storage elements for each Recording Center. Moreover, then there exists one Recording Center for each axis of co-ordinates of the $n$-dimensional space considered, i.e., one Recording Center for each parameter.

FIG. 3 is a diagrammatic representation of the basic structure of an active memory with two parameters X and Y. Each storage center is composed of a matrix structure, each storage element being represented by a square. The recording centers CI, equal in number to the number of parameters, are matrices with two dimensions, one dimension is allotted to the values of the parameter, or situations, and arranged opposite the center of association of situations, CAS; and other dimension is allotted to the values of variation of the parameter, or actions, and is arranged opposite the center of association of actions CAA. The CAA and the CAS represent the connections between parameters. Thus, the storage elements marked in thick lines in FIG. 3 represent a complex action which may be analysed as follows: point P of co-ordinate (1, 2) connected to the vector V (+2, +1); for the parameter X the coincidence of the action +2 and of the situation 1 is stored in the CI for X just as for the parameter Y the coincidence of the action +1 and of the situation or level 2 is stored in the CI for Y.

Moreover, to represent certain forms of recording there exists also a connection center CL for each parameter placed opposite the corresponding CI and comprising as many connection elements EL as there are situations in a accordance with the parameter; each connection element EL is then connected to the members for controlling the recording.

LOGICAL FUNCTIONING OF THE RECORDING AND EXTRACTION

To simplify the explanation of the logical functioning of the machine, it will be supposed that the storage elements are distributed in CAS, CAA and CI so as to be accessible to an operator who is able to control the state of them as desired, and to be informed continuously, visually for instance, of the state of this set of storage elements.

RECORDING

To store a complex action represented in a space with two dimensions by a point and a vector extending from this point, the operator proceeds as follows:

1. flips the storage element of the CAS associating the two co-ordinates of the starting point;
2. flips the storage element of the CAA associating the two components of the free vector equipollent to the vector considered; and
3. flips in each CI the storage element embodying the respective coincidence of the co-ordinate of the point and of the components of the vector in accordance with each parameter to store the information that this vector is connected to the point.

If, instead of a complex activity comprising a single complex action, one wishes to store a transformation comprising a chain of complex actions, the operator will flip successively the memory elements corresponding to the successive complex activities of which it is composed between the initial complex situation and the final complex situation.

The transformation may be supplied to the operator in charge of the storage operation in the form of a description of the successive complex situations, which description indicates directly the points of the CAS which will have to be stored, including the last. The operator will be able to deduce from the variation of the parameters defining the successive situations the components of the vectors which he will have to record in the CI at the level of each situation; he will deduce also from these components the storage element of CAA which he will have to operate at each step.

In practice, these operations will be carried out automatically by the machine from information received from sensors, also called members for posting or controlling members for recording, supplying the successive values of the various parameters directly to connection elements. In an embodiment, the recording center attached to each parameter comprises two series of entries, the first corresponding to the present situation of the parameter and the second to the immediately preceding situation stored temporarily in memory in the connection center; the entries of a CAS allotted to the same parameter are connected to this connection center, the entries of a corresponding CAA being connected to the outputs of the recording center.

EXTRACTION

Extraction is the phase of interrogation of the active memory after information has been communicated to it, for instance in the form of previous experiences as above, or by some other means.

The interrogation consists in asking this memory if there exists a transformation making it possible to connect by means of the stored information, a situation which is identified as an initial situation and a situation which is identified as final situation. If at least one such transformation exists, the active memory is able to supply the shortest transformation, i.e., that which comprises the minimum number of steps.

Example

If the active memory has stored the transformation corresponding to the trajectory AB in a space having two dimensions in FIG. 4, as well as the transformation CD, the active memory interrogated on the possibility of joining D from A will reply that the transformation is possible and will indicate the chain of complex actions corresponding to the trajectory shown in double lines. If one then records the trajectory AD shown in dashes and one interrogates the active memory again, it will again indicate the trajectory in double lines for connecting A to D, this trajectory comprising only 7 steps, whereas the trajectory in dashes comprises 8 steps.

From the technical viewpoint, the active memory comprises, after a recording phase, a certain number of flipped memory elements EM in each of its centers.

For the extraction, one proceeds step by step, or if desired by successive complex activities. To check whether a complex activity starting from a recorded complex situation *a* and terminating in a complex situation *b* accessible in one step only is stored, the associated space comprising two dimensions in this example, it is checked that:

a. the element of CAS corresponding to the representative point *b* is flipped;
b. the element of CAA corresponding to the representative free vector $\vec{ab}$ is flipped; and
c. the two elements of CI corresponding to the tied vector *ab* are flipped;

Thus, if there is to be determined the shortest transformation connecting an initial complex situation A to a final complex situation Z, both being recorded in the memory, the logical process of extraction will proceed in the following manner.

The element EM of CAS corresponding to Z is flipped. A search is carried out for all the recorded points $Y_1...Y_m$ from which Z is accessible in one step by examining all the complex activities terminating in Z, and by retaining only those which have been recorded and which are possible, that is to say:

1. the elements EM of CI corresponding to the tied vectors $\vec{Y_1Z}...\vec{Y_n}$ Z are flipped;
2. the elements EM of CAA corresponding to the free vectors $\vec{Y_1Z}...\vec{Y_nZ}$ are flipped; and
3. the elements EM of CAS corresponding to the retained points $Y_1...Y_n$ are flipped. In certain cases, a supplementary condition is added for each selection, i.e., that the elements EM of CAS considered should be found in the square or rectangle (or cube or hypercube in accordance with the number of dimensions of the CAS considered) containing the element EM corresponding to the points from which Z is potentially accessible in one step by the maximum amplitude actions. This condition, called condition of proximity, is however redundant for the first step of the search.

When this operation is terminated, one faces again the same problem, i.e., to determine all the points X from which at least one of the previously selected points Y is accessible. The points X from the points Y are determined by making use of the same method of checking in the storage centers which has given the Y from Z.

Proceeding thus by repetition, and if the problem includes a solution, a point B will necessarily be met which will be accessible in one step from the original point A. There has then been carried out a retrograde investigation, or phase $\beta$. By tracing the path Z,Y,X ... which has made it possible to reach the point B, there can be identified the path A,B,C...X,Y,Z which represents the shortest path, i.e., comprising the minimum of steps, for passing from the point A to the point Z. The vector $\vec{AB}$ constitutes the first step of this path.

If, for simplicity, it is imagined that the search by repetition which has just been described has been carried out by an operator endowed with a very good memory, he will be able to recall from which points the point B has been reached, and by retracing the steps to determine the minimum AZ path.

In fact, a strict method for determining this path knowing the vector $\vec{AB}$ consists in fixing the point B as a fresh starting point, which operation will be considered as a result of a phase $\gamma$ and in recommencing a further retrograde investigation $\beta$ up to a point C accessible in one step from B. The second vector $\vec{BC}$ of the minimum path sought can thus be determined by a second phase $\gamma$ with the view to fixing C as a fresh starting point.

Proceeding in this way with fresh starting points, the operator will be able to determine the totality of this minimum path step by step.

In the whole of the following explanation, it will be supposed that the process of extraction applied to the active memory permits the carrying out of a system external to the machine, a system whose sequence of successive states constitutes the transformation sought for. This system is guided step-by-step, from the initial situation to the situation designated as the end of its evolution, by means of information issuing from the machine in the course of the extraction. At the end of a step, the intermediate situation of the system, also called for this reason present or actual situation, constitutes the starting situation of a next activity of the transformation extracted.

The successive determination by retrograde exploration of the vectors of the minimum path gradually as the system controlled utilizes them, has the advantage that if fresh information (new possible vectors) appears in the course of the operation the next retrograde exploration will take the fresh information into account for the determination of the path which will guide the system, for instance a moving object, to the target, from the point where this moving object is found at the moment of the appearance of the fresh information.

Note 1

In the course of the search by repetition, it may happen that the operator meets simultaneously two points $G_k$ and $G_q$ which are accessible in one step from the point F representing the present or actual situation. The two vectors $\vec{FG_k}$ and $\vec{FG_q}$ each belong to a transformation having a minimum number of steps between A and Z. There are accordingly two equivalent transformations; if the operator is interested in the determination of a single path it would be necessary for him to chose between the point $G_k$ and the point $G_q$ as the next actual situation for the determination of the next actual situation for the determination of the next vector $\vec{GH}$ of the shortest path.

This choice is in most cases a necessity (when guiding a moving body for instance), and in the case where the operator is not permitted "free will," it will be necessary to supply it with rules for making a choice between the equivalent solutions.

In the absence of an external parameter capable of resolving the alternative, it is necessary to have a parameter in the interior of the memory which supplies automatically a criterion on choice and for instance sets up a hierarchy among the complex activities detected.

Note 2

In all the above, to simplify the explanation it has been supposed that the extraction, that is to say the search for the shortest chain of complex actions between two situations, taking into account past experience, i.e., the storage of a certain number of actions and of situations, has been carried out by an operator examining the flipped or unflipped position of the storage elements of the various centers of the machine.

Such a search becomes practicable by means of a machine, if, instead of carrying out the exploration from the target by an operator checking one after the other the states of the storage elements to determine those which are accessible in one step, this exploration is carried out by sending simultaneously from representative elements of the final complex situation, signals towards the storage elements. These signals will be blocked if the elements do not correspond to points accessible in one step or, if the contrary is true, will be transmitted again from these elements. In a retrograde investigation, the signals would be relayed by degrees until, simultaneously for each parameter, one of them reached the element representative of the initial complex situation for this parameter.

In order to effect by means of signals the logical operations previously explained above using a human operator, it is necessary to provide the active memory with an automatic operation, but this latter does not change the basic structure of this active memory and its general logic of operation.

Thus equipped with automatic operation, the machine is capable of carrying out retrograde investigation operations $\beta$, and successive determination in phase $\gamma$ of each step of the transformation sought for, at considerable speeds which make it a powerful information providing machine capable of solving numerous problems, in particular combination and correlation problems, which are difficult to solve on standard computers.

COMBINING POWER OF THE ACTIVE MEMORY

If an action in accordance with a parameter has been learnt by the active memory from a certain level of this parameter, it is learnt for all the complex situations of the same level in accordance with this parameter.

Example See FIG. 5

In a recording center allotted to the variable Y(CI–Y), the action +1 is stored by recording a complex activity starting from an initial situation $(X_1Y_1)$; it is supposed that a second situation $(X_2Y_1)$ is recorded in the machine by flipping the corresponding element EM in the CAS.

During an extraction phase, i.e., a phase of exploration of the state of the machine to obtain from it stored complex activities, there is nothing to permit the determination to be made of whether the action +1 starting from the level $Y_1$ has been stored in connection with the complex situation $(X_1Y_1)$ or with the complex situation $(X_2Y_1)$. In other words, other things being equal in the other centers, one will be capable of retaining in extraction, as a stored complex activity, a complex activity not effectively recorded and comprising the action +1 in Y from the situation $(X_2Y_1)$.

The complex activity apparently recorded previously may lead to a complex situation effectively recorded; in this case, a complex activity will be maintained, either for carrying out the extraction, or as belonging to the transformation sought for. It may also happen that the complex activity apparently recorded terminates in an non-memorized complex situation (or not fulfilling the condition of proximity) in which case it will be rejected after verification in CAS that the element EM corresponding to this situation has not flipped (or is not to be found in the square or rectangle representing the condition of proximity).

By virtue of the phenomenon which has been set out by way of example for an action +1 in accordance with Y, the machine possesses a true combinatory or associative power.

It is in fact capable, during its extraction functioning, of connecting together two complex situations which have been recorded by a complex action effectively recorded, (in certain cases even by a chain of complex actions effectively recorded), although this action (or this chain of actions) has not been recorded in connection with these two situations, i.e., although the complex activity has not itself as such been recorded.

Example See FIG. 6

It is supposed that in the course of the recording of three separate transformations, the following complex activities have been recorded.

First Complex Activity

Complex situation: $(X_1Y_1)$. Complex action: (O on X, +1 on Y) by flipping the element EM I in the CAS, the CIs and the CAA. The end complex situation resulting is marked by the element EM I flipped in the CAS.

Second Complex Activity

Complex situation: $(X_2Y_1)$. Complex action: (+2 on X, 0 on Y) by flipping of the EM II in the CAS, the CIs and the CAA. The end complex situation resulting from the complex activity is marked by EM II flipped in the CAS.

Third Complex Activity

Complex situation: $(X_3Y_2)$. Complex action: (+2 on X, +1 on Y) by flipping of the EM III in the CAS, the CIs and CAA. The end complex situation resulting from the complex activity is marked by the EM III flipped in the CAS.

The examination of the state of the active memory then shows that the following complex activity is also implicitly recorded:

Complex situation $(X_2Y_1)$. Complex action (+2 on X, +1 on Y) since on the one hand:

the EM II is flipped in the CAS, the EM II is flipped in the CI corresponding to the parameter X or CI X, the EM I is flipped in a CI corresponding to the parameter Y or CI Y, the EM III is flipped in the CAA;

and since on the other hand, the complex end situation $(X_3Y_2)$ of this complex activity is recorded in the CAS by the EM III rocked.

This associative power of the active memory makes of it a very powerful machine for the solution of complex problems which are of a marked combinatory character.

GENERAL ARRANGEMENT OF AN ACTIVE MEMORY

It has been seen that the basic structure of the active memory includes in particular memory elements grouped in centers of different types such as: (see FIGS. 3 and 11)

Centers of Association of Situations or CAS.

Centers of Association of Actions or CAA

Recording Centers or CI.

With these elements alone, the memory is capable of storing a considerable number of transformations called previous experiences; these can be used for reading, from the elementary complex activity forming the previously stored experienced, the minimum number of steps enabling one situation to be connected to another.

This process of extraction, as for the recording process, may be carried out by means of an automatic operation which will be described below.

Finally, the active memory includes peripheral equipment enabling it to communicate with the exterior. From this apparatus mention may be made of:

a. Apparatus concerned with input to the machine, in particular posting members for situations or successive actions of a transformation in Recording, and posting members of an initial situation and of a final situation in Extraction.

b. Apparatus concerned with the output from the machine capable of using as they become available, the indications supplied by the active memory on the successive steps of the transformation sought for which connects an initial complex situation to a final complex situation.

A form of such exploitation may, for instance, consist of a visual display, on screens provided with a mobile index, of intermediate situations constituting for each parameter the determination of a step of the optimum transformation sought for. The display may also be provided on luminous double entry boards, connecting in pairs each parameter, by the posting of intermediate situations.

If the active memory supplies to a system orders corresponding to actions to be carried out in accordance with each parameter for accomplishing the step, these orders may be used directly by control members of the system, for example, for the control of an industrial process or the piloting of a movable object.

If the active memory supplies orders corresponding not to actions but directly to intermediate situations, and the display previously envisaged constitute particular cases of this type, these orders will be transmitted to servo mechanisms which will ensure the carrying out, by means of control members, the actions leading to the new situation. The memory will then wait for the return message indicating that the intermediate transformation has been carried out, in order to record the following one.

AUTOMATIC OPERATION AND THE MEMORY ELEMENTS

The automatic operation carries out a recording process by sending storage signals on lines which intersect at the storage elements, and which, if they are energized simultaneously, bring about the storage operation of the memory elements at which they intersect, both in the recording center and in the centers of association of actions and of situations.

In the extraction process, the function of the automatic operation is to cause research to progress by sending to the various memorized centers signals of simultaneous interrogation in accordance with each parameter, which signals will give rise to authorizations if they intersect at the memorized elements. To each possible situation in accordance with each parameter is allotted a connecting element which enables the progress of the search to be checked; for each parameter, the set of the connecting elements forms a connection center. Memories $B_0B_1B_2$ permit the registration of the various stages of the progress of the signals in the course of the search.

Thus, in the example just described here the automatic operation comprises essentially (See FIG. 11):

i. a Coordination Center CC with a clock;

ii. the elements of CAS (called EAS), which, in addition to their proper memories, include a logical system which ensures the progress of the retrograde search;

iii. connecting elements EL grouped in connection centers CL; and iv. lines capable of carrying the signals.

Before passing to the description of the elements, a list of the signals supplied by the co-ordination center will be given, as well as the name and definition of the various lines (the signals which they carry taking the same name).

a. Signals Supplied by the Coordination Center CC (RAZ B... = Return to 0 of the bistables of the type...)

Recording
INS T 2
INS T 1
RAZ B INS
Time $\beta$ Extraction
$\beta$T2
$\beta$T1
Starting A
RAZ B1
RAZ B2
Time $\gamma$ Normal
$\gamma$
Starting A
RAZ B1
AUT.SORT ACT = authorization of the output of the actions.
Time $\gamma$ with Hierarchy
Same as $\gamma$ normal but also:

INH CDE BAM prohibition of the control of the bistables of multiple action. RAZ BAM return to 0 of the bistables of multiple action AUT CDE BH authorization of the control of the bistables of hierarchy INH H probition of the priority inter-actions AUT MOD H authorization of modification of the priority inter-actions Time $\delta$
RAZ BO
AUT 1
RAZ B 1 b. Nomenelature of the Various Lines as a Function of the Signals Which They Carry.

MEM CAS: carries a storage signal CAS sent by a EL to all the CAS elements of its level which by intersection with a signal carried by an identical orthogonal line brings about the rocking of the storage element of CAS (FIG. 11*c*: the line MEM CAS Y coming from a connection center CL allotted to the parameter Y intersects with the line MEM CAS X coming from a connection center, not shown, allotted to the parameter X; the two lines are connected in the element of CAS defined by a square drawn in dashes on a gate $\cap$ 1001)

MEM CAA: storage CAA. It has the same role as the above for the CAA, but for the signals sent by the CI (FIG. 11*b*) instead of the CL.

MEM OACI: carries a signal of storage of origin of action in the recording center sent by a connecting element EL to all the recording elements EI representing actions issued at its level (FIG. 11*b* and 11*c*).

MEM EACI: carries a signal of storage of end of action in the recording center, sent by an EL to all the recording elements EI representing actions terminating at its level. The intersection of two signals carried by the lines MEM OACI and MEM EACI at a recording element EI flips its memory and brings about the transmission of a signal on the corresponding line MEM CAA (FIGS. 11*b* and 11*c*).

INT OACI: Interrogation of origin of action in the recording center I, the interrogation being sent by an EL towards the ELs representing the action issued at its level (FIGS. 11*b* and 11*c*).

INT EACI: interrogation of end of action in the recording center (FIGS. 11*b* and 11*c*), the interrogation being sent by an EL of the ELs representing the actions terminating at its level.

AUT OACI: authorization sent by an EI to the EL located at the level of the origin of the action which it represents (FIGS. 11*b* and 11*c*).

AUT EACI: authorization sent by an EI to the EL located at level of the end of the action which it represents (FIGS. 11*b* and 11*c*).

INT CAA: interrogation sent from all the recording elements EI allotted to the same action in a CI towards the corresponding elements of CAA (EAA). When the same parameter intervenes in *n* CAA, it divides into *n* lines INT CAAp each directed towards CAA (FIG. 11*b*).

AUT CAAp: authorization sent by an element of CAA towards the EIs corresponding to the same action (FIG. 11*b*)

AUT CAA: line of authorization received by the EIs corresponding to the same action and sent from the point of convergence of the lines AUT CAAp coming from the *n*CAA in which the parameter considered appears (FIG. 11*b*).

INT CAS: interrogation sent from an EL to all the elements of CAS situated at its level (FIG. 11*c*).

Other lines (IET $B_1$, B2 = FIN $\beta$...) will be introduced in the course of the following explanation, as need arises.

In a general manner, the lines may assume functions of storage (MEM), of interrogation (INT) and of authorization (AUT). With regard to the lines connecting the centers of association to the ELs or to the EI, it will be said that they have a function of interrogation (INT) if they carry signals towards a center of association (in the case of lines INT CAA and INT CAS), and a function of authorization (AUT) if they carry signals coming from a center of association (in the case of lines AUT CAA and RET B1 for instance).

FIG. 11 shows the general interconnection between the elements now described. In the interior of these elements there are illustrated only the gates in relation to the lines external to the element, accompanied by their references. Reference may be made therefore to this FIG. 11 to locate each of the elements in relation to the arrangement of the system.

The connections to two other CAS and CAA, not themselves illustrated, have been shown, but this number is not at all essential, nor is to be considered as restricting.

c. Elements of CAS or EAS (FIG. 7).

These comprise essentially three memories which will be called bistables in view of their electronic construction. One of them, B 1004, constitutes the memory element proper of the CAS. It is in the logical state 1 when the situations of the two parameters corresponding to its coordinates have co-existed, but if not it is the logical state 0.

The two other memories, designated respectively B1 (1007) and B2 (1012) form part of the system for ensuring the progression of the retrograde search.

The retrograde search is carried out during a period called time $\beta$. This time period $\beta$ may be divided into a series of alternate elementary periods T1 and T2. At the time $\beta$T2 the intermediate targets attained at this instant are represented by the flipping of the corresponding bistables B2. The carrying out of the search step $\beta$T2 consists in flipping the bistable B1 of the elements of CAS from which at least one element marked by its B2 is accessible in one step.

The time $\beta$T1 is only a period of internal transfer of B1 to B2 in the interior of each element, which transfer prepares the following time $\beta$T2.

FIG. 7 shows the logical diagram of an element of CAS. An element of CAS cannot be the origin of a complex action leading to an element of CAS having its B2 rocked unless this element is located in a square, shown in double lines in FIG. 18, having as its center the element considered, and whose edges will be extreme situations which the actions of maximum amplitude, registerable in each CI, permit to be attained by each parameter. The gate ∩ 1008, called the OR gate of proximity represents this condition: its inputs are connected to the B2 of the accessible elements. It accordingly comprises 8 inputs if the possible actions in the two parameters are +1.0 −1, as has been illustrated in FIG. 18, and 24 inputs if the possible actions are +2, +1, 0, −1, −2 and so on. It verifies during the time $\beta$T2 (by ∩ 1009 and ∩ 1010) an input of the gate ∩ 1006 which controls the flipping of the bistables B1 (1007).

The proximity gate ∪ 1008 accordingly makes it not possible to flip the bistable B1 of an element of association of two situations EAS at a given instant of the search, unless there is flipped at least one bistable B2 of the elements which join situations potentially accessible in one step in accordance with each parameter, from each of the situations joined by the element considered.

Gate ∩ 1001 brings about the flipping of the bistable of memory 1004 when the two lines of memorization MEM CAS X (1002) and MEM CAS Y (1003) are energized, X and Y being two joined parameters in the CAS considered.

The state 1 of the memory verifies through the gate ∪ 1005 one input of a gate ∩ 1006 called an AND gate of association. The second input of the gate ∪ 1005 is supplied by a general line PROJ common to all the elements of the CAS.

A signal 1 applied to this line appears at the outputs of all the gates ∪ 1005 of the element of CAS, thus simulating the flipping of their memory elements. This amounts to authorizing the passage of the transformation to all the points of the CAS, whether memorized or not. It is the function of projection of the CAS.

At the time of T1, the OR gate ∪ 1011 brings about the flipping of the bistable B2 (1012) if the bistable B1 is flipped.

The connection 1013 of return of the state of B2 to the gate ∪ 1010 has the role of authorizing the flipping of the B1 of an element by its own B2. There will be seen below why this return is not subjected to the condition $\beta$T2.

The third input of the gate ∪ 1010, marked P is fed by a line common to all the CAS, the energization of which line has the effect of authorizing the flipping of the B1 without condition of proximity of a B2.

The role of the other lines, which join the element of CAS to the connection elements and to the coordination center CC, will be described at the same time as the general logical circuit.

d. The Connection Elements or EL (FIG. 8).

The connection elements are grouped for each parameter in a connection center, and they are each allotted to a situation in accordance with this parameter. For an active memory capable of taking into account 12 situations per parameter, the connection centers will accordingly comprise 12 elements (SW for instance FIG. 3). In the example of an active memory illustrated by FIG. 8, they have two independent paths, separated diagrammatically by a dot-dash line in this FIGURE, allotted respectively to recording and to extraction.

For recording, they have the purpose of entering into the memory, temporarily by means of a memory B INS 1114, posting instructions of a situation in accordance with this parameter.

For extraction, they must ensure coherence of the progression of signals in the various CAS joining the parameters in pairs. They also restrict this progression to utilizing at each level only the actions recorded in the CIs.

In the active memory taken as an example the portion allotted to extraction includes essentially:

i. gates ∩ 1101 and ∩ 1106, called coherence gates, towards which converge respectively three lines RET B2 and three lines RET B1; each line RET B1 (or RET B2) comes from all the B1 (or from all B2) which are allotted to the same situation as the connection element considered in a CAS in which the parameter appears; in the present example, as the parameter considered appears in three different CAS, there are three lines RET B1 and three lines RET B2;

ii. a self-maintenance ∪ 1120 gate, the role of which will be explained below; and iii. a bistable memory element Bo1108, the storage operation of which indicates that the situation to which it is allotted is the present or actual situation.

Their operation will be described in the course of the explanation of general functioning.

e. Recording Elements or EI (FIG. 9)

The role of the recording elements EI is to store the actions which have been carried out from each of the levels of the parameters.

As well as a memory B1201 operated in recording through the lines MEM EACI and MEM OACI converging on a gate ∩ 1209, the recording element includes a gate ∩ 1209, the recording element includes a gate ∩ 1203, called a gate of elementary activity having three inputs, one connected to the output of the memory B1201 and the other two respectively to the lines INT OACI and INT EACI terminating at the element considered, the output of which is capable of energizing a line INT CAA through a gate ∪ 1204. The element includes also a gate ∩ 1205, called a gate of authorization, having two inputs, one connected to the line AUT CAA corresponding to the preceding line INT CAA, and the other energized by the output of the gate of elementary activity ∩ 1203. The outlet of this gate of authorization ∩ 1205 makes it possible to energize:

the line AUT OACI of the element through a gate ∪ 1206;
the line AUT EACI through a gate ∪ 1208; and
the line SORT ACT through a gate ∪ 1207

The role of this gate of authorization ∩ 1205 is to allow the delivery of an authorization signed by the recording element only if this element, having been interrogated at the elementary activity gate ∩ 1203, has replied positively by interrogating in its turn and if it has received an authorization of the CAA for the action which it represents.

The input of the gate ∪ 1202, marked "TEN" is energized by a line common to the CI, called a line of generalization, the energization of which has the effect of simulating the storage operation of all the elements.

As in the case of EL, its operation will be described during the explanation of the general operation.

f. The Elements of CAA or EAA (FIG. 10)

Each element of CAA represents by its storage operation that the combination of actions following two parameters to which it is attached has existed at least once in the previous experiences.

Each element of CAA includes a memory B1301 capable of being rocked by the lines MEM CAA X and MEM CAA Y connected to the inputs of a gate ∩ 1302. It comprises moreover an association gate ∩ 1304 which supplies authorization signals AUT CAA X and AUT CAA Y if the element receives simultaneously INT CAA X and INT CAA Y and if moreover the bistable B1301 is flipped.

As with the CAS, the CAAs include a common line called a line of projection, the energization of which has the effect of simulating through gates ∪ 1303 the storage operation of all the elements.

If the parameter to which a given recording center is allotted appears in several CAA, the lines of authorization extending from these CAA towards the CI are lines AUT CAAp which converge on a coherence gate ∩ 1401 (See FIG. 11).

DESCRIPTION OF THE GENERAL OPERATION

This description will be given from the start for a machine having more than two parameters, i.e., in which at least one connection center allotted to a parameter is connected to two or more CAS and at least one CI with two or more CAA.

The names of the various lines, as well as the corresponding abbreviations will be introduced in the course of the explanation as need arises.

Recording

The information supplied to the system are the instantaneous values (or situations) of the various parameters at successive instants.

Each of the connection centers has *n* inputs each corresponding to a possible situation. These inputs are connected to connection elements at the corresponding level. They are designated by the words "Control Recording" (CDE INS 1121) in the diagram of the EL (FIG. 8).

On each delivery by the posting members in recording of a set of values of the parameters, the coordination center supplies three successive signals: INS T2, RAZ B INS, then INS T1. At the first time INS T2, all the bistables B INS being in the logical stage O, the CDE INS brings about through gates ∩ 1116 of the EL the transmission of a signal MEM EACI and through gate ∩ 1122 the transmission of a signal MEM CAS. The signal MEM EACI is without effect in the CI, since no line MEM OACI is energized. In the element of CAS (FIG. 7), the intersection of two signals MEM CAS (1002 and 1003) brings about the energization of the gate ∩ 1001 which controls the flipping of the bistable of memory CAS 1004.

At the time INS T1, the gate ∩ 1117 (FIG. 8) flips the recording bistable 1114 of EL. The level of the parameter which has just been energized is accordingly now stored in this bistable. It will constitute the origin of the vector, causing the transition to the next level, which will be energized.

When the posting members supply the following set of the values of the parameters, the signal INS T2 has two effects. It brings about as above, the storage of the point in the CAS by the signal MEM CAS. It verifies the gates ∩ 1115 and 1116 (FIG. 8) of the EL. At the level reached by the preceding CDE INS, the EL has its recording bistable (1114) flipped; the gate ∩ 1115 sends a message MEM OACI. At the level reached by the present or actual CDE INS, the gate 1116 sends a message MEM EACI. These two messages intersect at the EI representing the transition of the preceding level to the present of actual level. There they bring about the energization of the gate ∩ 1209 (FIG. 9) which flips the memory bistable 1201 of the EI and, through the gate ∪ 1210, sends a storage signal MEM CAA to the CAA.

In each CAA, two messages MEM CAA intersects, and energize the gate ∩ 1302 (FIG. 10) which flips the bistable 1301 which constitutes the memory of the CAA.

After the signal INS T2, the coordination center brings about the return to zero of the recording bistables B INS 1114 of the ELs (signal RAZ B INS). This has the effect of erasing the B INS corresponding to the first level energized.

The system is now ready to receive a fresh piece of information, and the process of recording continues in this way until the last point.

Thus, given a previous situation stored temporarily by the bistable B INS 1114 of a connection element in the course of the preceding recording time, and a present or actual situation posted in another connection element by the recording control signal (CDE INS) at the time INS T2, a recording circuit energized at the time INS T2 illustrated by FIG. 12 comprises:

in the element corresponding to the present or actual situation, the line EME EACI extending from the gate ∩ 1116 verified by the signals CDE INS and INS T2 and a line MEM CAS extending from the gate ∩ 1122 verified by the same signals;

in one CAS, an element on which the line MEM CAS Y intersects with the line MEM CAS X coming from the EL corresponding to the present ot actual situation in the connection center allotted to the parameter X (in this element, the two storage lines verify the gate ∩ 1101 and bring about the rocking of the memory B 1104;

in the connection element corresponding to the previous situation in accordance with Y, the line MEM OACI extending from the bistable B INS 1114;

in the recording center, the element at which intersect the preceding lines MEM EACI and MEM OACI verifying the gate ∩ 1209 which on the one hand operates the memory B 1201 and on the other hand sends via the gate ∪ 1210 a signal on the lines MEM CAA leaving the element considered; and in one CAA, an element at which one of the preceding lines MEM CAA Y intersects a line MEM CAA X extending from the recording center allotted to the parameter X, the gate ∩ 1302 verified by the two lines bringing about the operation of the memory B1301 of the element of CAA considered.

Note 1

As will be observed below, the gates, bistables and lines which have been used in recording do not play any part in extraction. It will accordingly be possible in the course of extraction to supply fresh information to the active memory, taken here by way of example, which information will immediately be taken into account for setting up the optimum itinerary, by reason of the fact of the repetition of the retrograde search at each step. When one does not wish to make use of such a possibility, one can construct an active memory in which certain parts at least of the recording circuits serve also for the extraction.

Note 2

The recording process which has just been described enables information resulting from acquired experiences to be stored in the elements of the various centers.

The process accordingly enables the representation for a system of the transformations, constituted by the passage from an initial complex situation to a final complex situation, by a chain of intermediate complex situations. For putting it into operation, the memory has for each parameter a connection center comprising as many temporary memory elements as there are possible values of the parameter, and the recording center has two series of inputs respectively OACI and EACI, connected to the connection center, the inputs EACI corresponding to the present or actual situation of the parameter and the inputs OACI corresponding to the immediately preceding situation stored in the connection center.

One can also conceive another method of recording consisting in flipping directly the memories of certain elements of CAS, CI and CAA, without being concerned with knowing if these storage operations can result from an actual experience. This amounts to asking the active memory to construct in the course of the extraction phase (if this is possible) an optimum trajectory by utilizing transition points (CAS), components of vectors (CI) and associations of these components (CAA) fixed arbitrarily by the operator.

This type of recording is more general in principle than the first, and lends itself to taking into account problems frequently met with in actual practice, in which the constraints joining the parameters to each other are not known totally but only partially from experiences giving knowledge of the correlation between certain parameters. Frequently, this type of constraint will be expressed by the existance of zones where the development of this system is prohibited, and they will be stored by effecting in the storage centers a recording by fields. The memory which has just been described lends itself particularly well to dealing with this type of problem and the putting into effect a system of extraction allowing the determination, by means of information supplied to the machine, of a total transformation causing the passage in the optimum manner from one complex situation to another, while respecting the data and in particular the stored constraints.

This type of recording will be called "non-coherent recording."

Extraction

Time $\beta$

The principle of the retrograde search by the operation of bistables B1 – B2 of the element of CAS has already been explained. There will now be described the manner in which the progression of this search is controlled by the elements for connection, recording and association of actions. FIG. 15 shown the signals supplied by the coordination center during the time $\beta$ The complex situation in which the system controlled by the active memory is found at a given moment is characterized by a situation or level in accordance with each parameter. In the connection center associated with each of the parameters, this level is represented by the flipping of the bistable Bo (1108) of the corresponding connection element.

To interrogate the machine, it is necessary to fix for it an origin and a target composed of an initial complex situation and a final complex situation. The origin is fixed by flipping, through the gate ∪ 1118 via a signal MAM $B_o$ (storage Bo), the $B_o$ of the ELs corresponding to the starting situation in each of the parameters. The flipping of the $B_o$ of a level represents the actual or present situation in which the system in accordance with the parameter concerned is placed.

In putting into operation the extraction process, the target remains the starting point of each retrograde investigation. On the other hand, after each $\gamma$ phase, the origin, which represents at each instant the state of the system controlled by the active memory, and which constitutes the arrival of the next retrograde investigation, is changed.

The final complex situation is recorded or posted by flipping in each CAS the B2 corresponding to this situation. The end of the first step of the retrograde investigation $\beta$ will be marked by the flipping of a certain number of other B2 in the elements of CAS corresponding to the possible predecessors of the levels of the final complex situation. The end of the second step of this investigation will be marked by the flipping of other B2 corresponding to possible predecessors of the levels marked at the end of the first step.

Thus, in the working out of a transformation by the active memory, the possible predecessors of a final situation at a station $n$, i.e., at the end of $n$ steps of retrograde investigation $\beta$, are dealt with by the B2s. The successors of the initial set of the initial situation which will be designated step-by-step in the course of each $\gamma$ phase are dealt with by the bistables Bo. The transfer function from B2 to B2 in the course of each step of retrograde investigation $\beta$, or from Bo to Bo in the course of each $\gamma$ phase, is assumed by the temporary memories B1.

The target is recorded or posted by rocking the B2 of the corresponding element of CAS. For this, use is made of the lines INT CAS (FIG. 8). By energizing directly the gate 1113 of the ELs corresponding to the complex situation selected at target, a signal is produced at the two lines INT CAS intersecting at the element of CAS from which the search is to start (FIG. 7). If there is applied a condition P (systematic energization of the gates ∪ 1010), the association gate ∩ 1006 of this element will be verified and will flip its B1. It suffices to apply simultaneously the condition T1 to flip immediately the bistable B2 desired, and the first search step can be carried out. It should be noted that if one wishes to post as target a point not stored in the CAS (this corresponds to a particular application of the machine) it will be necessary to give in addition the signal of projection TROJ in a manner to energize the gate ∪ 1005.

Now that the origin and the target are put in position, the search itself can commence.

The first search step $\beta$ T2 should rock the B1s of the elements of the CASs from which that marked by its B2 is possible in one step. The conditions to be fulfilled by an element of CAS to be in this condition are:

it must be within the zone of proximity of the element, the B2 of which is flipped (station of proximity ∪ 1008 verified);

the necessary actions must be memorized at its level in the C1s;

these two actions must be associated in the CA; and the memory (B1004) of this element of CAS must be flipped.

In addition, to ensure the coherence of the search in the various planes, a B1 should not be flipped unless in all the other CASs in which appears one of the parameters to which it is connected, at least one B1 of the same level in accordance with the parameter also possesses the four conditions for flipping.

The actions capable of being brought up again in the course of the first retrograde investigation step $\beta$ are those which terminate at the level of the element of CAS the B2 of which is flipped.

The element of CAS sends this information to the EL via the line RET B2, which comprises a series of gates ∪ (1019 or 1020) each energized by a B2. The ELs being at levels at which all the associated CASs have at least one rocked B2 (which is detected by a coherence gate ∩ 1101 — FIG. 8) send via their gates ∩ 1102 and ∩ 1103 an interrogation INT EACI. Every element of CI, whose memory is blocked, which is found on this line corresponds to a possible predecessor and should accordingly interrogate to CAA. For this, the interrogation INT OACI is given systematically at $\beta$ T2 by the ELs of all the levels by the gates ∪ 1110, ∩ 1119 and ∪ 1120, this latter called a self-maintenance gate being energized by the signal A, called the starting signal, the role of which will be seen below (FIG. 8).

The recording elements (FIG. 9), whose elementary activity gate ∩ 1203 is energized at one and the same time by INT OACI INT EACI and the memory bistable B1201 (through ∪ 1202), send through the gate ∪ 1204 an interrogation INT CAA to the CAAs in which the parameter appears. The elements of CAA (FIG. 10) whose memory B1301 is flipped and which are found at the intersection of two energized lines INT CAA, supply via the association gate ∩ 1304 authorization signals AUT CAAp to the levels of the two parameters which have interrogated it (through ∪ 1305 and ∪ 1306). The letter $p$ which follows AUT CAA gives a reminder that for the CI this authorization is only partial, as this will not be able to consider that it has AUT CAA until all the CAAs to which it is connected send back an authorization. This is detected by the coherence gate ∩ 1401 (FIG. 11b).

The Els which interrogate and which receive the AUT CAA have their authorization gate ∩ 1205 energized (FIG. 9), which brings about the transmission of these elements of three signals which travel respectively on the line, the column and the diagonal passing through these elements. AUT OACI (through ∪ 1206), SORT ACT (through ∪ 1207), and AUT EACI (through ∪ 1208). Only "AUT OACI" meets a verified gate at the time $\beta$T2: the gate ∩ 1111 of the EL (FIG. 8). It brings about through ∪ 1113 the transmission of INT CAS to the corresponding levels of the $CAS_2$ in which the parameter appears.

In the memorized elements of CAS (FIG. 7) which receives simultaneously the INT CAS of two parameters, and the proximity condition of which (gate ∪ 1008) is fulfilled, the association gate ∩ 1006 sends a control signal to the bistable B1 1007.

It is still not possible to authorize the definitive flipped of the bistable B1 by this control or order signal, since it is not known whether in each of the other $CAS_2$ associated with the same parameter there is at least one B1 of the same level receiving a control or order signal. To ensure this verification, use is made of a system called self-maintenance.

This system necessitates that the control or order and the RAZ of the bistable B1 act on it in such a manner that in the event of the simultaneous application of these two logically contradictory signals, the output of the bistable B1 gives the logical information "B1 flipped." For this, the signal RAZ B1 cts on the bistable B1 1007 (FIG. 7) through a gate ∩ 1023 verified by the inverter I1022 when there is no control of B1 by the association gate ∩ 1006. This amounts to saying that the output of the bistable B1 reproduces the control or order signal when the RAZ is applied.

Thus, if in the course of the process described above, the RAZ B1 is applied permanently, the outputs of the bistables $B_1$ which receive from their association gate ∩1006 the control or order signal, will give, via the gates ∪ 1016 and ∪ 1017 the signals RET $B_1$ X and RET $B_1$ Y. Each of these signals will constitute for the EL the indication that at its level one $B_1$ at least of the CAS considered receives its control or order signal. The EL (FIG. 8) receives a line of RET $B_1$ from each of the CAS to which its parameter is connected, and these RET B1 arrive at a coherence gate ∩ 1106, the output signal of which indicates that there is a RET B1 of all the CASs.

It is necessary to flip only the B1's which are located at levels at which at least one B1 in each CAB is controlled, these levels being characterized by a signal at the output of the coherence gate ∩ 1106 of the EL. For this it suffices to suppress the INT CAS supplied by the EL whose gate ∩ 1106 of which has not been verified.

But, on the other hand, the actions placed at the level of the B1 eliminated in this way cannot be raised again by the search signal. It is accordingly necessary to suppress the interrogations which they would send to CAAs, which interrogations are now detrimental, since they are capable of bringing about the transmission to the other parameters of AUT CAAp corresponding to an action associated with that which has been eliminated in the parameter considered.

Finally, it can happen that the centers of association of actions or of situations will deliver to the recording centers and connection centers authorizations which are not coherent when they are the object of several interrogations.

An example will enable this to be understood with reference to FIG. 19. In this FIG. there are shown two CAA of an active memory with three parameters A, B and C and five actions per parameter, these CAA associating the actions in accordance with the parameters AB and AC. The elements memorized are represented by crosses and it is assumed that these CAA are the object of interrogations for the actions −2, −1 and +2 in accordance with the parameter A, −2, −1 and +1 in accordance with the parameter B, and −2, 0, +2 in accordance with the parameter C.

It is confirmed that the CAA AB will supply an AUT CAAp for the actions −L and +2 in accordance with A, and −2 and +1 in accordance with B. In the same way, the CAA AC will supply AUT CAAp for the actions −2 and +2 in accordance and A and O and +2 in accordance with C. The recording center allotted to the parameter A will receive only the AUT CAA for the action +2 delivered by the coherence gate ∩ 1401.

But the CAA AB sends back to the recording center allotted to the parameter B the possibility of authorizing the actions −2 and +1. If it happens that the CAA BC not shown, also sends at AUT CAAp for the action +1 to the recording center allotted to the parameter B, this will receive the authorization +1. The state of the CAA AB shows that the action +1 at B is incompatible with the action +2 at A.

One accordingly confirms that it would be possible to send to the recording centers allotted to B non-co-herent authorizations which it would be advisable to suppress. To achieve this, it is necessary to suppress the interrogations CAA relative to the actions −2 −1 in accordance with the parameter A which have not given rise to authorization.

The three conditions mentioned above are fulfilled by eliminating the INT OACI of the ELs (FIG. 8) whose gate ∩ 1106 has not been validated. Thus, the Els located at this level will no longer interrogate the CAA, and will no longer send AUT OACI, which will bring about the suppression of the INT CAS.

The system which effects this suppression is composed of the gates ∩ 1119 and ∪ 1120, this latter being the self-maintenance gate. It has been seen above that at the time $\beta$T2, the INT OACI was systematic by being controlled through ∪ 1110 by the gate ∩ 1119, which is verified by the condition $\beta$T2 and through ∪ 1120, by the starting signal A. The output of the coherence gate ∩ 1106 is brought to the second input of the gate ∪ 1120.

Thus, when an INT OACI would have given rise, to the whole logical chain of search in the various centers, to all the returns B1 of its level, the suppression of the starting condition A will not suppress it, since the signal of the gate ∩ 1106 will be substituted, via the self maintenance gate ∪ 1120, for the starting signal to maintain the validation of ∩1119.

If on the other hand a INT OACI has not given rise to all the RET B1, it will disappear at the end of the starting, thus suppressing gradually the INT CAAs—AUT CAAs—AUT OACIs—INT CASs and RET B1 to which they give rise. The B1s whose control is found suppressed are brought back to zero, since the suppression of the control sets up again, by the inverter I 1022 (FIG. 7), the validation of ∩ 1023 which transmits to them the RAZ B1. After the short interval of time necessary for these commutations, the RAZ B1 is suppressed, only leaving rocker B1 which fulfils all the conditions. One can accordingly stop the time $\beta$T2.

FIG. 13 shows active connections in the course of the time $\beta$T2 when the conditions are obtained for marking a previous point; starting from the B2 1012 rocked in the CAS shown, through the coherence gate ∩ 1101 verified by the other B2s, the gate ∩ 1102 sends an INT EACI which, with INT OACI validates the gate of elementary act ∩ 1203 of the memorized Els, which gate brings about the transmission of the signal INT CAA to the CAAs associated with CI. This interrogation by the intersection of the INT CAA of the other parameter verifies the association gate ∩ 1304 of the element of CAA memorized and supplies an AUT CAAp, which with the other AUT CAAp verifies the coherence gate ∩ 1401 and gives the AUT CAA. This AUT CAA verifies the authorization gate ∩ 1205 of the element which has interrogated and sends the AUT OACI which through ∩ 1111 gives the INT CAS which, by the association gate ∩ 1006, maintains the rocking of B1 and the prohibition of its RAZ by virtue of the local authorizations (memory CAS and proximity). The RET B1 which result therefrom validate the coherence gate ∩ 1106 which through the self-maintenace gate ∪ 1120 maintains the INT OACI, this latter being at the origin of the logical chain which has just been described. The main element of the preceding circuits are found again in the general interconnection FIGS. 11, 11_b_, 11_c_.

After this first step $\beta$T2, the CASs are found in the following situation: in the B2s there is found recorded the target sought for, in the B1s the points from which this target is accessible in one step. To be able to repeat the same process, it is necessary to mark the points themselves in the B2s. For this, after having given the signal RAZ B2, the co-ordination center CC will give the signal $\beta$T1 which brings about by ∩ 1101 (FIG. 7) the flipping in B2 of the elements of CAS of which the B1 is flipped.

Thus, in the course of successive cycles $\beta$(T2–T1), one will have the collection of the points from which the target is accessible in 1,2, ...$n$ steps. The search goes on until it gives a collection of intermediate targets one of which is accessible in one step from the actual or present situation. It will be appreciated that this state will have been reached when, at a time $\beta$T2, one B1 which is flipped among other B1's; the flipped one will be, that which corresponds to the actual or present situation. This coincidence is detected by the gate ∩ 1018, called END $\beta$ (FIG. 7) in the single element of each CAS whose abscissa and ordinate are marked by a Bo (1108) flipped in the ELs. The output of the gate is connected to a gate ∪ 1021 which is connected in a line which serves all the elements of CAS and which is called "END $\beta$ CAS" of the CAS considered. When the lines END $\beta$ of all the CAS are simultaneously energized at the end of the time $\beta$T2 the coordination center energized by the gate ∩ 1330 arrests the search (FIG. 11*a*). The stopping of the search intervenes only at the end of the time $\beta$T2, after the end of the signal RAZ B1, in such a manner that the B1s which will be returned to zero by reason of non self-maintenance will not bring about an inopportune stopping of the search.

FIG. 15 is a diagram of the signals supplied by the co-ordination center for a step $\beta$, the name of the signals being given in ordinates and the length of the signals representing their duration. It can be seen that the step $\beta$ comprises five periods numbered in abscissa 1 to 5, the significance of which is as follows:

1. Starting
2. Breaking down of the non-self maintenance chains
3. Flipping of the B1s whose controls are self maintained and possibly end $\beta$
4. Erasure of the old intermediate targets
5. Flipping of the new intermediate targets TIME $\gamma$ One is now faced with the following situation: the present or actual situation is marked by the bistables Bo in the ELs. Still there are a collection of points whose projections in the various planes of CAS are marked by flipped B2s one of which points is accessible in one step from the present or actual situation. The cases in which none or several of these points is accessible will be examined separately.

The object of time $\gamma$ is to select the accessible point. The carrying out of the "step $\gamma$" consists in marking this point in such a way as to be able to make it as the actual or present position for the following search, and to supply to the exterior either the actions in accordance with each parameter which authorizes this passage, or the following value of each parameter.

The actions which authorize this step are those applied to the level of the actual or present situation. They are accordingly to be found in each CI on the line in OACI extending from EL, the Bo of which is rocked.

On the other hand, as these actions must terminate at a point plotted in all the planes of CAS by the flipped state of its B2s, they must be found on lines INT EACI relating to levels at which at least one B2 is flipped in each CAS. Finally, they should be associated in pairs in all the CAA.

The process is achieved in the following way.

In the EL of the level of the actual or present situation, the Bo controls the INT OACI by means of the gate ∩ 1109 (FIG. 8) verified by the condition $\gamma$. In the EL or the ELs found at levels where at least one B2 is flipped in each CAS, the outlet of the gate ∩ 1101 (FIG. 8) controls the signal INT EACI through the gate ∩ 1104, verified by $\gamma$ and the condition of starting (by ∪ 1120). As at the time of $\beta$ T2, the EI memories which are found energized at the intersection of the line INT OACI and of a line INT EACI send an interrogation to the CAAs which, if they include an interrogated memorized element send back an AUT CAAp. The element or elements of CI which are interrogated and which receive the AUT CAA send back the signals AUT OACI, SORT ACT and AUT EACI. For the moment, only the signal AUT EACI reaches a gate validated in $\gamma$, the gate ∩ 1112 (FIG. 8) which through ∪ 1113, gives the INT CAS. When, in a CAS there is an intersection of two INT CAS on a memorized element CAS whose B2 is rocked, the gate ∩ 1006 (FIG. 7) gives a control signal to the bistable B1.

It still remains to be checked that these control signals of the bistables B1 in the various CASs are coherent, i.e., that they produce themselves in each parameter. Use is again made of the self-maintenance system. By applying the RAZ B1 permanently, there appear the control signals of the B1s on the lines RET B1.

The only controls or orders of B1 which are valid are those which appear at the level of the ELs of which the coherence gate ∩ 1106 (FIG. 8) of the RET B1 gives a signal. The others should be eliminated. It is accordingly necessary to suppress the INT CAS sent from the ELs whose gates ∩ 1106 have not been validated. But on the other hand, the actions whose authorization one would thus cancel, cannot be utilized at the step $\gamma$. It is accordingly necessary to suppress the interrogations which they sent to the CAA, as these interrogations would risk causing the transmission to the other parameters of an AUT CAA corresponding to an action associated with that which is suppressed in the parameter considered.

To arrive at these two results, it suffices to suppress the INT EACI of the ELs whose gate ∩ 1106 has not been verified. Thus, the EI located on this line will no longer interrogate the CAA and will no longer send back an AUT EACI, which will bring about the suppression of the INT CAS.

The system which effects this suppression is constituted by the gates ∩ 1104 and ∪ 1120 (FIG. 8). It has been seen above that at the time $\gamma$ the INT EACI was controlled by the coherence gates ∩ 1101 of the RET B2 and ∩ 1104 verified by the signal $\gamma$ and the starting signal through ∪ 1120. When INT EACI would have give rise, through all the logical chain, to all the RET B1 of its level, the suppression of the starting condition A will not suppress it, since the signal of the gate ∩ 1106 will substitute itself through the gate ∪ 1120 for the starting condition to maintain the verification of ∩ 1104.

If, on the contrary, an INT EACI has not given rise to all the RET B1, it will disappear upon starting, thus suppressing gradually the INT CAAs—AUT CAAs—AUT EACIs—INT CASs and RET B1s to which it gave rise, The B1s whose control is found suppressed are returned to zero by the reestablishment of their RAZs which results therefrom. After the short interval of time necessary for these commutations, the RAZ B1 is suppressed; there then remains flipped only the B1 which fulfill all the conditions.

The C1 of each parameter supplies a signal on the line SORT ACT corresponding to the action carried out in accordance with the parameter. This signal is sent to the exterior by verification of the gates ∩ 1408 (FIGS. 11 and 11*a*).

FIG. 14 represents the active connections in the course of the time $\gamma$ in the case where a single chain remains self-maintaining. The rocked bistable B2 verifies through RET B2p the gate ∩ 1101, which itself verifies ∩ 1104 whose output brings about INT EACI.

On the other hand, the bistable $B_o$ 1108 which represents the starting level verifies the gate ∩ 1109, which controls INT OACI.

The intersection of INT OACI with INT EACI on the gate ∩ 1203 of a memorized EI brings about INT CAA. As with $\beta$T2, the return of all the AUT CAAps brings about by gate ∩ 1401 the verification of ∩ 1205 of the EI which has interrogated, the SORT ACT, and the AUT EACI, which through ∩ 1112 gives INT CAS, which through ∩ 1006, maintains the rocking of B1 and the suppressions of RAZ B1. The output of B1 gives RET B1p, which verifies ∩ 1106, the output signal of which, through $\alpha$ 1120, maintains the verification of ∩ 1104, after the suppression of the starting A.

When the step $\gamma$ has been carried out, there remain to be marked its terminating point as fresh actual or present situation. This is the object of time $\delta$.

At first a signal RAZ $B_o$ erases the $B_o$ which represented the present or actual situation. To rock those which are found at the level of the terminating point of the step which has just been carried out, it sufficies to provide the signal AUT1 at the gate ∩ 1107 (FIG. 8). In the ELs of each parameter located at the level where a B1 is flipped in each CAS, the gate ∩ 1107, energized by the signal of the coherence from gate ∪ 1106, flips the bistable $B_0$ through ∪ 1118. A RAZ B1 achieves this sequence which will be called time δ. The memory is then ready to carry out a fresh retrograde exploration β at the end of which a fresh step γ may be carried out. FIG. 16 illustrates the signals supplied by the co-ordination center for a normal step γ, i.e., at the moment of the signal END β only one complex situation is accessible; these signals define times 1, 2, 3, 4, the significance of which is indicated below :

1. Starting
2. Breaking down of the non self-maintaining chains
3. Checking time of unity of the actions
4. Supplying actions to the exterior End of the Extraction As well as its function of energizing the B2s, the posting system of the final situations, shown diagrammatically by SAFI in FIG. 11*a*, has the function of setting up a connection between the $B_0$ of the level of each final situation and an input of an AND gate FIN EXT placed in the co-ordination center CC, the output of which gate interrupts the functioning of the latter; in fact, when its output is energized, this signifies that the actual present situation coincides with the final situation and accordingly that the extraction is terminated.

Choice from among several equivalent transformations

In the explanation of time γ which has been given above, it was taken that at the moment when the signal END β appeared only one complex situation, marked by its B2s, was accessible. This is the normal and most frequent case.

It is however also possible that at the moment of an END β the system is in a state such that none of the situations marked by the B2s corresponds to an accessible complex situation, or on the other hand several complex situations may fulfil this.

The first case can possible appear only if the density of information in each plane is very great; the projections in the planes of the wave fronts which cover again the various paths possible are thus found to pass simultaneously to the actual present situation and bring about a faulty signal END β. The attempt at step γ which results therefrom comes to nothing; no RET B1 is produced or at least does not survive starting. The absence of SORT ACT which results from this is detected by the co-ordination center as is explained below, which deduces from it that the END β was defective and consequently it takes up again the time β where it had been stopped up to the next signal FIN β.

The case in which several points marked by their B2s are accessible from the actual present situation is much more interesting. It occurs each time the information stored in the machine define several equivalent transformations for connecting an initial situation to a final situation in a minimum number of steps.

If signals of the phase γ are given at least two chains of elements will remain self-maintaining after the end of the starting. The CIs of one or more parameters will supply more than one signal SORT ACT and in one or more planes several B1 will be marked as situations resulting from the step γ, which is inadmissible. It is accordingly necessary to provide the machine with a system by which in the event of several solutions being possible, one will be chosen arbitrarily.

2. Operation of the process for carrying out the selection.

A simple process which would consist in selecting arbitrarily an action from among those which appear each parameter is not applicable; apart from very special cases, all combinations of actions appearing in accordance with the various parameters do not define a possible complex action. On the other hand, it is not a question of reviewing successively all the combinations of possible action in accordance with the various parameters since their number increases very rapidly as a function of the number of parameters and of possible actions in accordance with each parameter (e.g., 25 for two parameters 5 actions, $15.10^3$ for 6 parameters with 5 actions, $10^{14}$ for 20 parameters with 5 actions); moreover, this successive review would be contrary to the principle of searching in parallel used in the system. The principle of choice adopted is the following : the parameters and the actions in each parameter are classed in an arbitrary order called, for convenience, hierarchy for the parameters and priority for the actions. When in one or more parameters more than one signal SORT ACT exists after starting, the co-ordination center is notified of this by a system of gates which will be described below. It then installs a priority among the actions of the first parameter in the hierarchy in accordance with which several actions are issued. The principle of locating this priority is the following : the first action in the order of classification which receives an authorization AUT CAA inhibits the following actions. This inhibition is effected by suppression of the INT CAA, which has the effect of suppressing not only the other inputs AUT CAA which were attributed to the parameter, but also of suppressing the AUT CAA which were returned to the other parameters, and which were not associated in the CAAs with the action which has been selected as a function of the priority.

After the setting up of the priority in accordance with the first parameter which gave several actions, three cases may occur : there is no longer more than a single SORT ACT per parameter and the problem is resolved. This case is found if there are multiple actions only in accordance with the single parameter, or if the choice in accordance with the first parameter has raised the ambiguity in accordance with all the others by the operation of the suppressions AUT CAA; no output action exists. All the self-maintaining chains have fallen back at the entry of the priority on the first parameter giving several actions; (this can only be produced in the case of non-coherent recording). The interaction priority is changed in accordance with the parameter and one starts again the same manner as in the following case: there are one or more other parameters giving several SORT ACT.

The same process is repeated; priority is set up in accordance with a second parameter which is now the first giving a multiple action in the inter parameter hierarchy. At this moment a new problem may be posed: the actions selected in this second parameter may not be compatible with that which has been selected in the first. If it is compatible there are SORT ACTs in accordance with all the parameters, and one can pass to the setting up of the inter action priority in accordance with a third parameter if applicable.

If it is not compatible, all the self-maintaining chains fall down and there is no longer any SORT ACT.

The coordination center will then modify, for instance by circular permutation, the interaction priority in the last parameter, then it will make a fresh attempt giving once again the starting signal. During this new starting time, and the time necessary for the falling down of the non-self-maintaining chains, it will provisionally inhibit the circuits if interaction priority, in such a manner that AUT CAA which would not survive the starting cannot inhibit, by the operation of the interaction priority the INT CAA which themselves would give rise to self-maintained AUT CAA.

If the re-establishment of the priority causes all the self-maintained chains to fall once more, it is because the priority following the second parameter is still not suitable. The co-ordination center will modify it again and will make a fresh attempt.

If on the contrary, the SORT ACT continues to exist (which will be the situation produced after a number of attempts at the most equal to the number of actions possible in the parameter) one can pass by choice to the following parameter, if necessary.

This process will come to an end when after the re-establishment of the priorities a self-maintained chain, and one only will continue to exist, defining a specific complex action. It is only then that the co-ordination center will suppress the RAZ B1, thus authorizing the marking of the terminating point of the action selected and will verify the gates ∩ 1408 authorizing the outlet of actions to the exterior (FIG. 11*b*).

The maximum number of tests necessary for determining an action is in the most unfavorable case equal for each parameter to the number of possible actions. This number of tests is always relatively reduced to a value considerably lower than the number of combinations of possible actions: e.g., 10 for 2 parameters with 5 actions, 30 for 6 parameters with 5 actions, 100 for 20 parameters with 5 actions.

The process of choice in case of ambiguity is summarized by in the table of FIG. 2*a* as a function of the three possibilities which may arise at the moment of the step γ.

b. Description of the circuits representing the choice

Interactions priority

FIG. 22 shows the logical diagram of this system which in each variable sets up a priority among the actions.

The connections with three CAA for FIVE actions has been illustrated, but these number are not at all restrictive.

The coherence gate ∩ 1401 has the role of not supplying the AUT CAA to the CI unless all the CAA to which the CI is connected send back an authorization AUT $CAA_p$.

The gates ∩ 1402 and ∪ 1403 constitute a supplementary self-maintenance system: after the starting, there will continue to exist only the INT CAA which have given rise to all the AUT $CAA_p$.

It is important to note that on the logical plan this self-maintenance system is redundant in view of that previously described. Its role is to accelerate the breaking down of the non self-maintained chains: if, after starting, one of the AUT $CA_p$ of an action disappears, by suppression of a INT CAA in another variable, the corresponding INT CAA is immediately suppressed withouts its happening that the chain "AUT CAA—AUT OACI (or EACI)—INT CAS—RET $B_1$—INT OACI (or EACI)—INT CAA" breaks down so that there is a considerable gain in speed.

The chain of interaction priority is constituted by the sequence of the gates ∩ 1404, called classifying gates and gate ∪ 1405 connection in a looped line.

The classifying gates ∩ 1404 receive their verification from a control or order center 2201 composed essentially of a counter and a decoder; in the normal event (time β and step γ without need for priority) none of the gates ∩ 1404 is verified: the invertors I 1406 then verify all the gates ∩ 1402, called priority action selection gates, connected to the interrogation lines. When the system 2201 receives the order to put in place the priority MEP, it verifies all the gates ∩ 1404 except one.

When an action receives all the AUT $CAA_p$, its gate ∩ 1401 gives a signal which appears at the output of its gate ∪ 1405. This signal propages itself through the verified gates ∩ 1404 and the gates ∪ 1405 of the following actions until it strikes the only gate ∩ 1404 of the chain which is not verified. This signal has the effect of cutting out, by the invertors I 1406, the verification of the gates ∩ 1402 of the actions located downstream of that which receives all its AUT $CAA_p$.

The action for which the classifying gate ∩ 1404 is not verified is called "at the head of priority."

Then the counterdecoder 2201 receives an impulse at its input "MOD H," it puts another action at the head of priority. At the end of a number of impulses equal to the number of actions, all the actions have been found at the head of priority. The use of a looped circuit carrying the gates ∩ 1404 ∪ 1405 constitutes a simple but non-restrictive way of achieving the classification sought for, the modification of which is then ensured by circular permutation.

Inter parameter hierarchy

It is desirable to describe first and foremost the system which permits the co-ordination center CC to detect whether the step γ gives 0, or 1, or more than one complex action (see FIG. 21 and FIG. 11*a*).

Associated with each parameter, a gate of multiple actions (PAM) gives this information which it issues in the form of 0, 1 of > 1 actions.

There is more than one complex action as soon as a parameter gives more than one action. The signal > 1 ACT complex is accordingly supplied by the gate ∪ 2402 which receives at its inputs the signals of multiple actions of the PAM sent from the outputs SAM of these latter.

There is no complex action when action is not issued on any parameter. It has been seen that the self-maintenance system prevents certain parameters giving actions and not others; one could accordingly take as the signal O ACT complex, the output O ACT of any PAM whatsoever. By taking a gate ∪ 2401 supplied by the outputs O ACT of all the PAM, the co-ordinaton center will be warned of the absence of complex action as soon as all the actions of a variable have fallen down again.

Finally, when there is neither an O ACT nor > 1 ACT complex, the gate ∪ 2403 does not give a signal, and the invertor I 2404 gives the indication that there has appeared a complex action, and one only.

It has been seen that in the case of the output of multiple actions the interaction priority is set up for the first variable which presents several actions, the variables being classed in an arbitrary order in accordance with a hierarchy. FIG. 23 shows the system which ensures the succession of the choice in the different variables, and FIG. 11*a* represents a portion of this allotted to a parameter.

The succession of the gates ∩ 2305 called classifying gates and ∪ 2306 constitutes the interparameter or intervariable chain of hierarchy. The classifying gates 2305 are always verified, except for one. The variable whose gate ∩ 2305 is not verified is called "at the head of hierarchy."

The system associated with each variable is composed essentially of:

i. a bistable of hierarchy, designated by BH 2309 the rocking of which represents the fact that the interaction hierarchy of this variable is used;

ii. a set of gates called "gates of multiple actions" PAM 2301 which supplies to the co-ordination center the indication that each variable gives 0, 1 or more than one output action SORT ACT. This set, shown in FIG. 20 for a parameter with 5 actions, has 6 inputs, at which arrive the output actions of the CI of the parameter and two outlets which correspond to the information O ACT and more than one complex action (>1 ACT). If the CI does not send any action, there is no signal at the output of the gate ∪ 1901, which through the invertor I 1902 brings about the transmission of the corresponding information. If the CI sends two actions or more, one or several of the gates 1903 to 1910 which correspond to all the pairs of possible actions send a signal to the gate ∪ 1913 whose output supplies the information "more than one complex action" (>1 ACT); and iii. a bistable called "bistable of multiple actions" BAM 2304 FIG. 11*a*.

This bistable flips when several actions in accordance with the parameter continue to exist by self-maintenance. It is returned to zero when there has been obtained a single self-maintained action, the selection of this action being the result of the installation of a priority in accordance with the parameter itself, or in accordance with another.

The gate PAM 2301 controls the flipping of the bistable BAM 2304 by the gate ∩ 2303, provided the co-ordination center CC does not suppress the verification of this gate by giving the signal INH CDE BAM to the invertor I 2302.

The output signal of the bistable BAM 2304 constitutes a verification of the gate ∩ 2308, called authorization of hierarchy of its own parameter, and on the other hand, it affects the inter variable hierarchy chain through the gates ∪ 2306 and ∩ 2305 of the following variables, up to the classifying gate ∩ 2305, not verified, of the variable at the head of hierarchy. This signal, through the invertors I 2307 suppresses the verification of the gates ∩ 2308 of the variables located downstream of which the BAM has energized the hierarchy chain.

When the co-ordination center sends the signal "AUT TDE BH," this signal has effect only on a single gate of authorization of hierarchy 2308: the gate of the first variable in the order of hierarchy of which the BAM 2304 is rocked.

No other AND gate of authorization of hierarchy can be verified unless its memory BAM is not flipped; or it may have its BAM flipped, but it is located downstream of the AND gate considered and up stream of the head of hierarchy, its AND classifying gate being then verified, and conducting the signal inserted by the BAM up stream of the network considered.

The principle of operation is identical to that of the interaction priority. It is this system which makes it possible to install the interaction priority only in the first variable in accordance with which appear several actions.

When an interaction priority has been found in accordance with the first variable giving a self-maintained action, the co-ordination center sends the signal RAZ BAM. The BAMS of the variables in accordance with which only a single action issues, (and all the variable already in the hierarchy are in this case) are returned to zero. If in accordance with other variables multiple actions issue, their BARM is controlled by their PAM, and it remains rocked, since the play of the invertor I 2C14 and of the gate ∩ 2313 prevents them from being influenced by the action of the signal RAZ BAM.

By transmitting again the signal AUT CDE BH, one will rock the BH of the first variable in accordance with which multiple actions continue to exist.

When the BH of a variable is flipped, it controls, through the gate ∩ 2311 which supplies a signal MEP to the counter-decoder 2201, the setting up of the interaction priority provided the counter-decoder center does not supply the signal co-ordination H which suppresses by the invertor I 2310 the verification of the gate 2311.

It has been seen above that the setting up of the priority in accordance with a variable may bring about the breaking down again of all the self-maintained chains. In this case, it is necessary to modify the priority in accordance with this single variable, and start again. It is the gate ∩ 2312 which makes it possible to modify the order of interaction priority only in the variable which is the last to have been subjected to the priority.

In fact, it has been seen that AUT CDE BH has the effect of flipping the BH corresponding to the first BAM rocked in the order of the inter variables hierarchy. On the other hand, as soon as one has found a priority which permits a self-maintained chain, the RAZ is undertaken of the BAM, only the BAMs of the variables in accordance with which there are still several actions escaping from the RAZ, which variables, by definition, can be located only downstream or lower in the chain of the last variable subjected to the interaction priority.

The variable in accordance with which the setting up of the priority has caused the falling down of all the non self-maintained chains has its bistable BH flipped. On the other hand, its bistable BAM is also flipped, since the RAZ–BAM action is not taken until after there has been found a priority preserving a self-maintained action.

Since its BAM is still flipped, no BH has yet been able to be flipped downstream, and since its BH has been able to be flipped, no rocked BAM remains upstream. It is accordingly the single variable having its BAM and its BH flipped.

When the co-ordination center gives the signal "AUT MOD H," it is the only one whose gate ∩ 2312 will give a signal causing the interaction priority supplied by the counter-decoder 2201 to change.

c. Development of a time γ with choice of a transformation

FIG. 17, to which reference should be made up to the end of the present explanation on the development of the time γ with intervention of hierarchy circuits, represents the succession of signals supplied by the co-ordination center to pilot the search of a single action. These signals, like all those which are supplied by the co-ordination center CC are indicated in FIG. 11*a*. The circuits energized under the control of the signals of FIG. 17 are re-assembled synoptically in FIG. 11 and are mostly quite clearly visible in FIG. 11*a*.

The time (1) at which begins the time γ is the first starting. (2) is the falling back time of all the non self-maintained chains. (3) is the time during which the co-ordination center examines the signals which still exist by self-maintenance.

Three cases may be present: Zero complex action: no variable gives action (by reason of the self-maintenance, it is impossible for actions to issue in accordance with certain variables and not in accordance with the others); 1 complex action: all the variables give one action and one only; multiple actions (>1 ACT): one or more variables give more than one action.

Case NO. ACT at (3) of FIG. 17

No chain of signals has survived the starting. None of the points reached by the retrograde search is accessible from the present or actual situation. The signal END which has given rise to this attempt of step γ was due to a recombination of the projections of the wave fronts.

The co-ordination center stops the time and takes up again the time β up to the next signal END β.

Case 1 ACT at (3) of FIG. 17

This is the normal case: one point, and one only reached by the wave front os accessible from the actual or present situation. A single B1 is controlled or ordered in each CAS. The co-ordination center raises the RAZ B1 in such a manner as to mark the arrival point of the step, and gives authorization AUT SORT ACT which permits the CIs to supply to the exterior the actions constituting the step (control of a visual display, control of a system to be carried out ... and so on).

Case 1 ACT at (3) of FIG. 17.

Several points reached by the wave fronts are accessible in one step from the present or actual situation.

At the time (3) the BAMs of the variables giving several actions are flipped by the corresponding PAM gates. The signal "INH CDE BAM" supplied during the time (1) and (2) has played the part of preventing the flipping of the BAMs of the variables in accordance with which several actions have issued at the moment of the starting, but only one of which has continued to exist by self-maintenance.

The co-ordination centre then gives the time (4) and (5) of FIG. 17. At the time (4), the signal "AUT CDE BH" brings about the flipping of the bistable BH of the first variable whose BAM is flipped. In accordance with this variable, only the first action in the order of the interaction priority is checked, the others are blocked or inhibited by suppression of their interrogations CAA. The results of this is, by the operation of the suppressions AUT CAA, the falling down of chains of signals which are no longer self-maintained by reason of the fact of the suppression of one of their links. The time (5) is a dead time which allows these commutations.

At the time (6) the co-ordination centre may again find itself faced with the three possibilities 0, 1 or >1 A action. These three possibilities will be examined in a different order for convenience of explanation.

1 ACT at (6) of FIGURE 17

The setting up of the priority in accordance with this single variable is sufficient to select a single complex action. One can then carry out the step γ which the co-ordination center controls as previously by the time (13).

>1 ACT at (6)

The priority which has been described as set up in accordance with the variable is suitable, but there remain downstream, or lower down in the chain, one or more variables giving several actions. The co-ordination center gives the time (12) in the course of which the signal RAZ BAM returns to zero or confirms at zero all the BAM (FIG. 11*a*) except those of the variables or variables PAMs of which still give a control signal of the BAM. One then returns to the time (4) where the signal "AUT CDE BH" flips the BH of this variable, or of the first of these variables. After the time (5) one arrives at a new time (6) which may have the same three possibilities.

0 ACT at (6)

The falling back of all the self-maintained chains indicates that the state of the priority in the variable which has just been subjected to the priority is not suitable. It is necessary to modify the priority then re-start, but taking certain precautions. This is the role of the time (7) to (11).

At (7) the signal "AUT MOD H" allows the AND gate 2312 (FIG. 11*a*) of the single variable of which the BAM and the BH are simultaneously flips to give a signal "MOD H" to the counter decoder 2201. This signal changes the action at the head of the priority.

At (8) all the chains restart. At (9) all the chains not self-maintained fall back. The role of the signal "INH H" of the times (8) and (9) is to suppress by the invertor I 2310 the verification of all the AND gates 2311 which order the counter-decoders 2201, by the signal "put in place MEP," to put in position the interaction priority. This has the aim of preventing an action which will be eliminated by the sole operation of the self-maintenance from preventing, by operation of the priority, a valid action. At the time (10) the interaction priority is set up again in all the variables the BH of which is flipped, and all the chains corresponding to suppressed "INT CAA" fall back. A time (11) is arrived at, at which time the co-ordination centre may again be faced with the same three possibilities: 0, 1 or >1 A action, to which it replies as at (6): 1 ACT: pass to the time (13) to carry out the step γ: >1 ACT: there still remains one or more variables giving several actions, which it is then necessary to submit to the priority in their turn: pass at (12), then at (4); 0 ACT: the amended or modified priority is still not suitable. Upon returning to (7) to modify it again, a fresh attempt is made.

As has been seen, the maximum number of re-startings per parameter is that of the actions possible in this parameter. The maximum number of trials will be equal to the sum of the number of actions of the parameters and not to their number of combinations.

The co-ordination center is a system of gates, of bistables and other logical elements which, as a function of the signals which it receives (lines END β, signals of the PAM and so on), supplies sequences of signals adapted to each of the times. This system is constituted with well known means which are standard in logical circuits.

d. Gate of zero complex action (PACN): (see FIG. 11a)

A gate called a gate of zero complex action PACN is intended to prevent the blocking of the memory in certain particular cases of multiple complex actions. If the various complex actions possible in one step γ are such that in accordance with all the parameters the action 0 continues to exist by self-maintenance, the putting in position of the interaction priority would terminate (if the CAAs authorize it) in the choice of this action 0 in accordance with all the parameters, whereby there would be a resultant situation of the step identical to the actual or present situation. This same zero step will be repeated indefinitely.

The lines SORT ACT of action 0 in accordance with all the parameters converge on this gate PACN (see FIG. 11a) which is a simple AND gate whose output energizes the gate ∪ 2401 and inhibits the output of the gate ∪ 2402, thus creating for the coordination centre CC a simulation of the absence of an output of action, which then brings about a modification of the interaction priority. The same cycle will be repeated until a complex action has been found which comprises a non-zero action in accordance with at least one parameter.

e. Classifying of possible interactions

It has been seen that the classifying of actions for a possible choice is purely arbitrary, the only important thing is that after a number of trials equal to the number of actions, all the actions should have been found at head of priority.

When the problem to be solved is a purely theoretical one, the order of classification can be any order.

If the active memory is used for piloting or controlling a material system, a certain type of classification may be found to be of greater interest than another as the function of the characteristics of this material system.

Two types of classifying are explained below, though not restrictively:

Action 0 at the head

The actions are classed in order of increasing amplitude: for instance 0, +1, −1, +2, −2. In the case where several steps are possible, the memory selects the step the component of which in accordance with the parameter will be of minimum amplitude. This in effect means deciding between two solutions in accordance with the law of least effort. For instance, this can be interesting in the control of a chemical process: if the parameter representing the temperature is thus put in a hierarchy, the solution selected will be that having the minimum of variations of temperature resulting in a minimum energy outlay. To put this process in operation, at the end of each step γ the return to 0 at head is ordered by the counter-decoder 2201.

Priority as a function of the preceding step

At each step, the action placed at the head of priority is that which has been ordered at the preceding step which has or has not necessitated a choice. Then come the actions the amplitude of which differs by 1 from that of the action at head, then by 2 and so on.

To give an example: this classification will be of interest for the control of a mechanical system having great inertia: the solution selected will be than having the smallest variations of speed resulting in a minimum energy outlay.

To realize this priority, the action which has just issued at the end of each step γ is brought to the head of priority. This may be done either by the counter-decoder 2201 the bistables of which are connected to the lines SORT ACT BXT (FIG. 11b) by an operation of an OR gate forming a coder or by replacing the counter decoder 2201 by a set of five bistables each allotted to one of the five actions. The output of each of these bistables determines the action at the head, when it is energized. The input of each bistable is connected to the line SORT ACT EXT corresponding in such a way that it will be flipped at the end of the step γ when the action has effectively issued. These five bistables form part of a shift register for changing the priority under the action of the signal MOD H.

Auxiliary functions and various uses of the active memory

The basic function of the machine which has been described is to enable the determination to be made of a transformation connecting an initial complex situation to a final complex situation in a minimum number of steps and in the case where several such transformations exist, to select one of them. It is possible to enlarge the field of possibilities of this machine by the utilisations of auxiliary functions some of which will now be described, though in no restrictive sense.

Generalization

It has been seen that the elements of the recording centers (FIG. 9) each included a gate ∪ 1202 located at the output of the memory B1201 and comprising an input capable of being energised by a generalization line GEN common to the entire recording center. The energization of the input GEN simulates the storage of the element. Nevertheless, all the elements of the recording centers do not by that become active. In fact, the only ones capable of supplying the authorizations OCACI EACI are those which are concerned with an action stored elsewhere in the center or centers of association of actions. The energization of the line GEN thus brings about the generalized trial at all the levels of the actions learnt at a determined level.

Putting certain associations out of service

FIG. 7 showing the constitution of an element of CAS. As seen, at the output of the memory 1004 of this element there is an OR gate 1005 receiving at one of its inputs a line of projection common to the entire CAS. The same is true for the element of CAA shown in FIG. 10. The energisation of a projection line of CAS or of CAA has the effect of simulating the storage of all the elements of the center considered. All the elements of association interrogated simultaneously in accordance with two parameters will accordingly send back authorizations, which amounts to suppressing the constraints recorded in the center considered.

In a general way, one can suppress any constraint connected to at least one authorization line in accordance with a parameter, by feeding a signal to this line when the corresponding interrogation line is energized, which means in effect that the said authorization is simulated. It is possible in particular to simulate such authorizations at all the levels of a parameter in one or more CAS or CAA where this parameter intervenes, without suppressing corresponding constraints for the other parameters in this same center.

Putting a parameter out of service

It is possible to deal with certain problems by totally removing a parameter. This is carried out for instance by effecting simultaneously, by the passing of signals to the corresponding lines: the simulation of the end $\beta$ for this parameter, the simulation of the end of extraction for this parameter, the simulation of the output of action 0 in accordance with this parameter on the gate of zero complex action PACN (FIG. 11*a*), and the energization of the projection lines PROJ of all the centers of association where this parameter appears (FIG. 7 and 10).

ABSTRACTION

With the machine it is possible to effect the removal of at least one parameter in the definition either of the final complex situation or of the initial complex situation, for instance, or of the two situations without having to effect removal of the same parameters from both.

The removal of a parameter in the final complex situation is effected by posting as a final situation in accordance with this parameter all the levels of this parameter. The removal of this parameter in the initial complex situation is effected by memorizing all the $B_o$ of the connecting elements allotted to this parameter.

CYCLES

When the output of the gate of end of extraction END EXT (FIG. 11*a*) is blocked, the determination of the transformation does not stop when the actual or present complex situation coincides with the final situation. The machine continues to search among the possible transformations for the transformation which enables the connection to be made in the minimum of steps, of the actual or present situation to the final situation, and thus determines if it exists, a looped transformation starting from the final situation to return there; the machine accordingly functions in cycles.

RE-LOOPING

When one of the parameters of several of them consist of values, such as angles, the variation of which is cyclic, it is possible to take this property of the parameter into account by virtue of a special arrangement of the recording centers; this arrangement is moreover capable of being given other applications; In FIG. 24 there are shown a recording center and a connection center analogous to the CI Y and CL Y of FIG. 3 for one parameter with 12 levels and 5 actions for each level. The discontinuity between the levels 1 and 12 is suppressed, taking that the level 1 is the end of the action +1 at the level 12, that the level 2 is the end of the action +2 at the level 12 and so on. This is effected by connecting suitably the lines EACI starting from the levels considered. Accordingly for instance the line EACI starting from the connection element of level 1 is connected on the one hand to the recording elements relating to actions 0 at 1,−1 at 2, and −2 at 3 and on the other hand +1 at 12 and + 2 at 11.

For the various topological structures one can or might imagine other types of re-looping.

DETERMINATION OF EQUIVALENT SOLUTIONS

There is at the output of the bistables of hierarchy BH an OR gate which is not shown, the output of which is capable on an external order being received of controlling or ordering the blocking of time $\gamma$. This blocking permits, when there are several equivalent paths started, of the modifications of the hierarchy on the activity which is issuing from the machine and the determination of various equivalent solutions.

Other possible methods of realization

It is possible to imagine variations, in accordance with the nature of the problem which is being dealt with, using the active memory previously described, thus increasing these possibilities.

Some of these possibilities will be examined by way of example.

Recording centre with any actions whatsoever

The connections between EL and EI which have been described above corresponding to a systematic structure in which the EIs of each level represent actions terminating at adjacent levels, the possible actions being the same at all the levels. This systematic arrangement of the EIs of each level is translated by the oblique arrangement of the lines INT and AUT EACI (See FIG. 11).

It is quite possible to imagine a CI the lines EACI of which would permit an EI of any level to represent an action effecting arrival at any other level.

One can in this manner construct any network whatsoever. It suffices to set up a two-way arbitrary relation between the nodes of the network and the levels of an active memory to be able to determine the links which the EI of each of the levels of this memory should represent.

For instance, FIG. 25 shows a network of vectors. With each of the nodes of this network, a level of the active memory is associated in the manner shown in FIG. 26. Each of the links of the network is represented by a EI of the active memory: for instance: the action +1 or the level 1 is the image of the vector passing from the node 1 to the node 2, the action −4 of the level of 5 that of the vector passing from the node 5 to the node 1 and so on.

Consequently, if one considers from a general view point the machine for the extraction of transformations which has been described in application to an active memory, the machine enables the simultaneous searching in several networks of paths of optimum components in connection with the constraints of interdependence among these networks, these paths in each network connecting a starting point node and a target point node.

The set of the starting points characterises an initial complex situation and the set of the target points characterises a final complex situation. Each step of a transformation connecting the initial complex situation to the final complex situation comprises the passage from one node to an adjacent node in one at least of the networks, the set of the nodes reached at the end of a step constituting an intermediate situation. In each network, the optimum component path is defined as that which enables this transformation to be operated in the minimum number of steps.

If in one network at least, there are several equivalent optimum component paths, the machine will select one of them when at the end of a retrograde investigation $\beta$ it will have detected several elementary activities in this network. This determination may be effected by setting up, as one does for the parameters, a hierarchical classification among the networks, and by establishing in each of these networks a priority among the elementary activities detected. This priority will apply to the elements of activities capable of transmitting whether these elements are constituted by the end node of the act detected or by the link permitting access thereto; in the latter case the interacts priority is an interlinks priority.

Thus, everything that has been described for an active memory putting in operation situations and actions in accordance with each parameter is valid for an extraction machine putting in operation the nodes and the links in a network. The connecting elements are then allotted to nodes instead of the situations, and as such, are called node-elements; the elements of the recording center allotted to links instead of to tied actions are called link-elements, the connections EACI and OACI between these elements remaining identical. Thus, the elements and the types of lines EACI and OACI represents the network of FIG. 25 broken down in accordance with FIG. 26, are illustrated in FIG. 27. It is important to note the possibility of introducing in the recording centre link- element, not shown, corresponding for each node to the zero-link (in the same way that the active memory comprises EIs allotted to the zero action at each level). These link-elements enable the optimum component path to remain at the same node for several steps.

The centers of association of situations CAS become in an analogous manner centre of association of nodes and represent the interdependence constraints existing between the nodes of the networks. Certain interdependence constraints between the networks may also concern the links. If they concern these links as a function of the equivalents of the vectors which they carry, i.e., if they are related to what one will call the free links by analogy with the free vectors, the centers of association of free links take the place of the CAAs with the same function. It should be noted that in the case illustrated by FIGS. 25, 26 and 27, one considers the equivalents of the vectors which carry the links not in the geometrical figure of the network itself but after having affected a different level at each node of the network, i.e., after having effected the breakdown thereof in accordance with FIG. 26. A free link in this example is accordingly defined by the difference between the levels of an end node and a node of origin and by its direction. The output of the information relating to the activity accomplished in the course of a step of the transformation is carried out on the lines SORT ACT allotted to each network, this information being able to concern either the end node of the accomplished activity or the link enabling access to be made thereto. If this information relates to free links, the lines SORT ACT are connected in an identical manner to those of the active memory shown for instance in FIG. 11.

The gate ∪ 1008, called gate of proximity, in each element of centre of association of nodes (FIG. 7), is connected to the output of the temporary memories $B_2$ of at least some of the elements of association of nodes accessible in one step in their respective networks from nodes associated by the element considered. Finally, in the hierarchy circuits the output of several elementary activities in $\gamma$ in a network is detected by a gate of multiple acts PAM; one can, as with the active memory previously described, set up an interacts priority by acting on the free links; one intervenes on the interrogations relating to these free links to select a priority free link in the network, having its bistable BAM flipped, encountered first in the inter network hierarchy.

Concerning finally the construction of the networks, one can use an active memory the lines INT and AUT EACI of which are connected together in a fixed manner, but are provided for instance on a programming matrix; one can thus realize at will the image of any network of vectors. This really means that the EIs are made common.

Connection center with weighted levels

A weighted level of a parameter will be taken as a level having, for the theoretical point of the state of the system in accordance with this parameter, the obligation to halt for a certain number of steps in accordance with this parameter, the number of steps being the weight of the level. In a network, reference will be made to weighted nodes without changing the significance of the above statement. Of course, the wave front $\beta$ will have to make an equal number of steps to clear this level.

The principle of this weighting is the utilization in an EL of the weighted level of two shift registers (one for $\beta$, one for $\gamma$) having the purpose of preventing the corresponding message from being re-issued from the EL less than a certain number of steps after having reached it.

This constraint is obtained at $\beta$ by forcing the message to halt on the spot by suppressing the INT EACI (at $\gamma$ of the INT OACIs) relative to EIs other than that of the action 0; to this latter one sends the generalization signal. One also sends the projection signal to the elements of the CAAs corresponding to the action 0 in accordance with this parameter.

If the EI 0 is not stored, a signal is transmitted from the level at the end of a time equal to its weight. If it is stored one may remain there for a period greater than its weight.

The operation of the weighting system necessitates a dissassociation of the interrogations and authorizations furnished by the EI of the action 0, from those of the other EIs.

In the text dealing with the system of weighting, the following abbreviations will be used:

INT OACI ≠ 0: interrogation origin of action, to the exclusion of that of the EIO INT EACI ≠ 0: interrogation end of action, to the exclusion of that of the EIO AUT OACI ≠ 0: authorization origin of action to the exclusion of that of the EIO AUT EACI ≠ 0: authorization end of action, to the exclusion of that of the EIO INT OACIO: interrogation origin of action of the EIO INT EACIO: interrogation end of action of the EIO AUT ACID authorization of action of EIO (this authorization is valid as origin and end)

FIG. 28 shows the modifications undergone by an EL to represent a weighted level. The logical elements which existed already in the EL are designated by the same role references as in FIG. 8. The logical elements whose role is not modified by the fact that the EL represent a weighted level have not been reproduced (the indications in the Figure correspond to a weight of 4).

OPERATION AT TIME $\beta$

The reaching of a level by a search wavefront $\beta$ is translated at time $\beta$ T2 by a signal AUT OACI ≠ 0. This AUT OACI ≠ 0 causes as previously, through ∪ 2619, ∩ 1111 and ∪ 1113 an INT CAS. Moreover, through the gate ∩ 2608, the first element of a shift register changes state. ∩ 2608 is not verified until the end $\beta$ T2, after disappearance of the RAZ B1 in such a manner that an AUT OACI ≠ 0 which would drop back again after the starting dies not permit any message to enter the register.

The clock signal of the register 2604 is constituted by the signal $\beta$ T1. At the following time $\beta$ T2 it is the element No. 2 of the shift register which will be flipped. Through the gates, ∪ 2605, ∩ 2606 and ∪ 2607, it sends a generalization message to the EI 0, and the corresponding projections CAAs.

On the other hand, the element 5 of the register not being flipped, the gate ∩ 2603 is not verified and this level at this time $\beta$ T2 will send only the interrogation INT EACIO, and will not accordingly be able to rebound its message to other levels. The sole signal which can come back as a result of this INT EACIO is an AUT ACID which through ∪ 2619, ∩ 1111 and ∪ 1113 causes the transmission of the INT CAS. Moreover, if the EIO is stored, the gate ∩ 2610 is verified and the AUT ACID causes at the end of $\beta$ T2 a new flipping of the element 1 of the register 2604.

The following two periods $\beta$ T2 can give only the same result (unless other centers of the machine refuse the AUT or RET necessary): the elements 3, then 4 of the register act like the element 2.

At the time $\beta$ T2 after, the element 5 of the register 2604 is rocked.

The gate ∩ 2603 being verified, the returned B2 controls through ∩ 1101, ∩ 1102 and ∪ 2601 and ∪ 2602 the INT EACIO and EACI ≠ 0, the reunion of which is equivalent to the INT ACID of the initial system.

One has accordingly held the message $\beta$ at this level for a certain number of steps equal to its weight, while permitting the progress of the message in accordance with the other parameters by virtue of the operation of the generalisation at the EIO and the corresponding projections CAAs.

FUNCTIONING AT $\gamma$

This is symmetrical to that at $\beta$, slightly simplified by the fact of the unique nature of the message $\gamma$.

The arrival of a message $\gamma$ at a level is represented by a AUT EACI≠0. This AUT brings about normally through ∪ 2620, ∩ 1112 and ∪ 1113, the INT CAS. Moreover, from the moment when the target of the step $\gamma$ is fixed (after possible intervention of the hierarchy), it flips the first element of the shift register 2617 by the gate ∩ 2618 verified by AUT SORT ACT.

of the register 2617 are rocked and through the gate ∪ 2615 and the invertor I 2616 stop the verification of the gate ∩ 2614. Thus the $B_0$ at γ through ∩ 1109 will bring about only the energization of the INT OACIO. Moreover, 2615 brings about through ∩ 2611 and ∪ 2607 the sending of the generalization to the EIO and the corresponding projections of CAAs.

At the following γ step, the element 4 of the register 2617 is brought to 0 and the $B_0$ again brings about the INT OACIO and OACI ≠ O, the reunion of which is equivalent to INT OACI of the initial system, and one can then re-start from the level.

When the message γ has been located for a certain number of steps at a weighted level, it is necessary for the end signal β to be produced only when the wavefront β has been at this level for a complementary number of steps.

For this reason, the EL of the weighted level verifies the signal given by the end lines β of the CASs with which its parameter is associated when the signal β has carried out at the weighted level a number of steps complementary to that effected by the signal γ.

This system, omitted from FIG. 27 for clarity is shown in FIG. 29. It should not function unless the weighted level is effectively occupied by the theoretical point, and has been so occupied for a number of steps less than the weight; whence the invertor I 2702 which gives systematically through ∪ 2701, an AUT END β when none of the elements 2, 3 and 4 of the system γ is rocked.

When the theoretical point has been located at the level for a number of steps less than the weight, one of the elements, 2, 3 or 4 is flipped. The gate ∪ 2615 cuts by I 2702 the systematic AUT END β. For the AUT END to reappear, it is necessary for the message β to reach the element of the register β located facing the flipped element of the register γ. One of the gates ∩ 2703, 2704 or 2705 will then give the AUT END β through ∪ 2701.

In practice this end authorisation β supplied by this circuit is sent to the co-ordination center for which it will constitute a supplementary condition of stopping of the time β.

Finally, in the same way as has been described for the weighted levels or nodes, one can take into account in the recording center weighted actions, or weighted links, by using shift registers, in the elements of the recording center, for delaying the accomplishment of an action (or the freeing of a link) by a certain number of steps Connecting elements with multiple $B_0$ bistables It is possible by means of the machine to control the development of several systems. For this it suffices to arrange in the connection element as many bistables $B_0$ 1008 (FIG. 8) as there are systems to be controlled, each set of $B_0$ being allotted to a system of which it represents the actual or present situation.

Each of these $B_0$ sends to CAS a message INF $B_0$ supplying an end gate β ∩ 1018 (FIG. 7) allotted to the corresponding system. Each set of end gates supplies a line END β of the CAS, which line is also allotted to the corresponding system. Finally, the coordination center includes one general end gate β ∩ 1330 (FIG. 11*a*) per system.

The retrograde search is effected as before, with the difference that for each signal END β given by the operation of gates of a system, the search is suspended to control the step γ of this system. It is then continued until the next signal FIN β which will enable the step γ of another system to be controlled and so on until all the systems have carried out their γ; in each connection element the circuits allotted to each $B_0$ are verified by the co-ordination center each in turn by lines VAL, numbered from I, II to N, if N is the number of systems controlled (FIGS. 30 and 31). The search time is not increased at all, since it is always equal to that which would be necessary if only the most delayed system were taken into account.

It is also possible to control several systems, even if the target point is not the same for all of them. It suffices to recommence the search from each target point, each of these searches enabling control to be effected of the advancement of the systems having this target point. Of course there results from this an increase in a number of search steps, but this is not an inconvenience since the rapidity of the search principle is such that one can take advantage of the time expended by each of the systems for effecting its step γ for following the searches relative to the other systems.

FIG. 30 shows the supplementary gates and bistables which should include the connecting elements for the control of N systems (designated by I, II and so on) and FIG. 31 shows the supplementary gates of the element of CAS.

Absence of the condition of proximity

When in solving certain types of problems there is no need for the condition of proximity, represented in the CASs through the OR gate 1008 (FIG. 7) and by the connection of its output to one of the inputs of the AND gates of association one can suitably conduct the extraction process by simulating the systematic energization of the output of this gate by a signal $\bar{P}$ at the gate ∪ 1010 of the EASs (see FIG. 7). One can also arrive at this by placing the pairs of bistables $B_1$ and $B_2$ in the elements of CAS, but in the connection elements. There results from this a decrease in the number of pairs $B_1 - B_2$ and a simplification of the machine, the constitution of which nevertheless remain identical in principle: there is a line RET $B_1$ and a line RET $B_2$ in the interior of each connection element; a single coherence gate through EL receives the outputs of all the gates of association ∩ 1206 place at the same level in all the TASs where this parameter intervenes. The gates END β are placed in the ELs. A pair $B_1$ and $B_2$ being common to all the elements of the same level in the CASs, it may happen that certain $B_2$ are flipped in the course of the search β which do not correspond to situations associated in the CAS and satisfying the condition of proximity; in certain cases, this phenomenon is not to be feared, for it may be desired and utilised for the purposes of research.

Elements of CAS with specific functions

A system of information processing, more or less complex, may be allotted to each element of CAS. This system is intended to function at the moment when the element of CAS to which it is allotted is effectively energised. The result of the processing of information just carried out by a specific auxiliary member from a point of CAS may possibly, but not necessarily, intervene in the development of the scanning of the active memory, for instance, by intervening on the progress of the steps β and γ.

Elements with several memories

In the active memory which has been described, each element comprises a memory bistable the rocking of which indicates that the association or the action which it represents is authorized.

When the processing of a problem has been concluded it is necessary to erase all these memories, then to perform the whole sequence of recording of the data of the following programme before one is able to process this problem. This represents a dead time during which the machine cannot be used. Moreover, the rapidity of the search in extraction would make it possible to control in real time several systems simultaneously, i.e., to send to each of them orders of action of a step as soon as the preceding step has been carried out. Unfortunately, this implies the necessity for rerecording the constraints of each system at each step.

To overcome this disadvantage, an active memory is provided each element of which has several memories, in which one can record the constraints of the various systems to be controlled and the research is carried out by verifying the set of the memories corresponding to the system which the following order requires. FIG. 32 shows the diagram of the set which replaces the memory of each element.

The gate ∩ 2001 is the storage gate which existed previously in the element ( ∩ 1001 the element of association of situations EAS, ∩ 1209 in the recording element EI, 1302 in the element of association of actions EAA).

By giving the verifications of recording VI, 1 2.... one will flip, by the gates ∩ 2010, 2011 ... the memory bistables 2020, 2021 .... In extraction it will suffice to verify one of the gates ∩ 2030, 2031 .... by giving the verifications of extraction VE 1, 2 .... in order that the constraints taken into consideration should be those of a determined system. The gate ∪ 2003 is the output gate of the memory which already exists in the elements and which receives the projection signal ( ∪ 1005 of EAS, ∪ 1303 of EAA) or of generalization ( ∪ 1202 of EI).

As has been seen at the end of the section on recording, the recording and extraction circuits are totally independent. It will accordingly be possible to record the constraints corresponding to a problem in a set of memories (by certain verification of recording VI) while the machine will be operating in extraction by exploiting another set of memories (by another verification of extraction VA).

Taking successions of actions into account

Up to the present an active memory has been described comprising at one and the same time centers of association of situation and of centers of association of actions. In accordance with the nature of the uses to which the machine is put, one may have need only for one of these categories of centers of association. One may also have other categories enabling the representation of other types of constraints existing among these parameters or among the networks.

FIG. 33 shows diagrammatically a memory having two parameters the outputs of the recording centre of which towards the CAA are connected not directly to a CAA but to the inputs of a second active memory comprising as many levels per parameter as there are possible actions in the first active memory. The center of association of situations CAS' of the second active memory plays the role of a CAA for the first.

The recording centres CI' and the centre of association of actions CAA' of the second active memory make it possible to memorise constraints concerning the succession of actions in accordance with each of the parameters. This may be of interest in the control of a moving object for instance to prevent according to one parameter the rough passage of an action +2 to an action −2 in accomplishing two successive steps. More precisely, the CI' make it possible to store for each action one or more possible modifications of this action in the course of the next step; the CAA' establishes supplementary constraints among the modifications authorized in accordance with the various parameters.

There should not be seen in the necessarily restricted description given above any limitation of the carrying out of the informative processes defined above or of the construction of the machines which apply the principle of the invention either in their memory portion, properly speaking, or in their portion intended for the extraction of coherent information, nor finally in the auxiliary functions which one can allocate to them or the diverse and various uses to which they may be put.

I claim:

1. An active memory for use in data processing apparatus which includes matrices having logic elements at the intersections of the matrix;

at least two series of inputs to the elements;

temporary storage elements adapted to be associated with a system of extraction, and a coordinating center (CC) controlling the extraction system;

the temporary storage elements memorizing information relative to a system defined by a plurality of parameters, each susceptible of taking a finite number of values and undergoing, starting from each one of these values, a finite number of variations, said memory comprising I. a plurality of basic, functionally non-subdividable subassemblies including a. as many connection centers (FIG. 3: CL; CLX, CLY....) as there are parameters to be memorized, each connection center (CL) comprising as many connection elements (FIG. 8; EL) as there are possible values for the parameter to be considered;

b. as many bi-dimensional recording center matrices (FIG. 3: CI; CIX, CIY....) as there are parameters, each recording center comprising recording elements (FIG. 9, EI) included in the recording center matrices, each recording element having two inputs connected to a connecting center (CL) and including first bi-stable elements (1114);

c. at least one value-associative matrix formed of a center of association (FIG. 3: CAS–XY) comprising second bi-stable elements (FIG. 7: 1004) having at least two inputs (FIG. 7: MEM CAS X 1002, MEM CAS Y 1003) each corresponding to a value of a parameter; and II. control and interconnection means to interconnect said subassemblies into a network to provide for the overall operation of said network, including a. a plurality of recording lines (FIG. 8: CDE INS 1121) each corresponding to a respective possible value of each parameter, and external means selectively controlling energization of said recording lines;

b. a plurality of first AND gates (1122), one each connected to each recording line (CDE INS 1121);

means interconnecting the coordination center (CC) and said first AND gates (1122) and applying a validation signal (INS T 2) to a second input of said first AND gates (1122), the output from said first AND gates (1122) being connected over associative memory output lines (FIG. 7: MEM CAS X; 1002; MEM CAS Y 1003), each one of said lines (MEM CAS X 1002; MEM CAS Y 1003) corresponding, each, to a particular value of a parameter, said associative memory output lines including, each, second AND gates (1001) and said second bistable memories (1004);

c. a plurality of third AND gates (1117), one each being connected to a recording line (1121);

means interconnecting said coordination center (CC) and said third AND gates (1117) to apply a validation signal (INS T 1) to energize said third AND gates (1117), the output from said third AND gates (117) being connected to an input of the first bi-stable recording element (B INS 1114) of the connecting element (FIG. 8: EL), a plurality of fourth AND gates (1115) and means interconnecting said fourth AND gates (1115) and the coordination center (CC) and applying a validation signal (INS T 2) thereto, the output from said first bi-stable recording element (B INS 1114) being connected through said fourth AND gates (1115) to control and energize an output line representative of storage of the origin of action and corresponding to a particular value of the parameter (signal MEM OACI, FIGS. 8 and 9, p.43);

d. recording AND gates (1116) and means interconnecting said recording AND gates (1116) and said coordination center (CC) and applying a validation signal (INS T 2) thereto, a recording AND gates (1116) being connected to each recording line (FIG. 8: 1121) the output from said recording AND gates (1116) storing the end of the action of a recording center (FIGS. 8 and 9: signal MEM EACI);and e. bidimensional recording center matrices (FIG. 3: CI CIX, CIY) being arranged in rectangular arrays of third bi-stable elements (Fig. 9: EI 1201), fifth AND gates (1209) connected to control the third bistable elements (1201) in a row in the matrix corresponding to a like value of a parameter and the third bi-stable elements (1201) in successive columns corresponding to change in value, in increasing direction, the fifth AND gates (1209) being connected to the memory lines (MEM OACI) corresponding to a line of the matrix and further to a diagonal memorization line (MEM EACI), each of the diagonal lines interconnecting predetermined recording elements (EI) of the matrix and so determined that for each element of the matrix, the change represented by the column of the matrix in which the element is located is applied to the value of the line of the matrix in which the element is located to define a resulting value, each diagonal memory line (MEM EACI) being common to all the recording elements having the same resultant value.

2. Apparatus according to claim 1, further comprising a supplementary sub-assembly comprising at least an associative matrix for change in value (FIG. 3: CAA, CAA X Y) having at least two inputs corresponding, respectively, to variations in values of the different parameters; and a plurality of sixth OR gates (1210) each having an input connected to an output from the fifth AND gates (1209) of the recording elements (EI), the other input of said sixth OR gates (1210) being connected to all the outputs of the fifth AND gates (1209) of the recording elements of the same column;

the outputs from said plurality of sixth OR gates (1210), each, being connected to at least one change-in-value memorization line (FIG. 10: MEM CAA, MEM CAA X, MEM CAA Y) of the association centers (CAA), said change-in-value memorization lines (MEM CAA X and MEM CAA Y) each corresponding to a specific variation of the value of a parameter; and a group of fourth bi-stable memory elements (1301) and a plurality of sixth AND gates (1302) interconnecting said fourth bistable memory elements (1301) with the change-in-value memory lines (FIG. 10: MEM CAA..., CAA X, MEM CAA Y).

3. An active memory for use in data processing apparatus which includes matrices having logic elements at the intersections of the matrix;

at least two series of inputs to the elements;

temporary storage elements adapted to be associated with a system of extraction, and a coordinating center controlling the extraction system;

the temporary storage elements memorizing information relative to a system defined by a plurality of parameters, each susceptible of taking a finite number of values and undergoing, starting from each one of these values, a finite number of variations, said memory comprising I. a plurality of basic, functionally non-subdividable subassemblies including a. as many connection centers (FIG. 3: CL;CLX, CLY.... page 41) as there are parameters to be memorized, each connection center comprising as many connection elements (FIG. 8: EL) as there are possible values for the parameter to be considered;

b. as many bi-dimensional recording center matrices (FIG. 3, CI, CIX, CIY.....) as there are parameters, each recording center comprising recording elements (FIG. 9, EI) included in the recording center matrices, each recording element having two inputs connected to a connecting center (CL) and including bi-stable elements (1114);

c. at least one value associative matrix formed of a center of association (FIG. 3: CAS; CAS–XY) comprising bistable elements (FIG. 7: 1004) having at least two inputs (FIG. 7: MEM CAS X, 1002, MEM CAS Y, 1003) each corresponding to a value of a parameter.

II. coordination center means (FIG. 11: CC) providing control and timing signals;

and

III. control and interconnection means to interconnect said subassemblies into a network, including a. a plurality of recording lines (FIG. 8: CDE INS, 1121, FIG. 7: MEM CAS X; 1002; MEM CAS Y, 1003; Page 52), each corresponding to a respective possible value of each parameter, and external means selectively controlling energization of said recording lines;

b. a plurality of first AND gates (1001) and bistable memories (1121), one each connected (1122; INS T 2) to said recording lines;

c. a plurality of means (1117; INS T 1), one each being connected to one of said recording lines, and interconnecting said recording lines with the input to the bistable recording elements, (B INS 1114) of the connecting element (EL), the output from said bistable recording element (B INS 1114) controlling storage of the origin of action in a recording center corresponding to a particular value of the parameter (signal MEM OACI, FIGS. 8 and 9, p.43);

d. a recording AND gate (1116) connected to each recording line, the output from said recording AND gate (1116) storing the end of the action of a recording center (signal MEM EACI, FIGS. 8 and 9, p. 44) and e. bi-dimensional recording center matrices (FIG. 3: CI CIX, CIY) being arranged in rectangular arrays of bistable elements (FIG. 9: EI 1201) having AND gates (1209) connected to control the bistable elements (1201), the gates in a row in the matrix corresponding to a like value of a parameter and successive columns corresponding to change in value, in increasing direction, the AND gates (1209) being connected to the memory lines (MEM OACI corresponding to a line of the matrix and further to a diagonal memorization line (MEM EACI), each of the diagonal lines interconnecting predetermined recording elements (EI) of the matrix and so determined that for each element of the matrix, the change represented by the column of the matrix in which the element is located is applied to the value of the line of the matrix in which the element is located to define a resulting value, each diagonal memory line (MEM EACI) being common to all the recording elements having the same resultant value.

4. Apparatus according to claim 3 including a plurality of AND gates (1112), one each each connected to each recording line (CDE INS 1121);

and means interconnecting the coordination center (CC) and said AND gates (1122) and applying a validation signal (INS T 2) to a second input of said AND gates (1122), the output from said AND gates (1122) being connected over output lines (FIG. 7: MEM CAS X; 1002 — MEM CAS Y 1003), each one of said lines (MEM CAS X 1002 and MEM CAS Y 1003) corresponding, each, to a particular value of a parameter, said outputs including, each AND gates (1001) and bistable memories (1004).

5. Apparatus according to claim 3 including a plurality of second AND gates (1117), one each being connected to a recording line (1121);

means interconnecting said coordination center (CC) and said second AND gates (1117) to apply a validation signal (INS T 1) to the second input of said AND gates (1117), the output from said AND gates (1117) being connected to the inputs of the bistable recording element.

6. Apparatus according to claim 3, further comprising a supplementary sub-assembly comprising at least an associative matrix for change in value (FIG. 3: CAA, CAA X Y) having at least two inputs corresponding, respectively, to variations in values of the different parameters.

7. Apparatus according to claim 6 further comprising a plurality of third OR gates (1210) each having an input connected to an output from the AND gates (1209) of the recording elements (EI), the other input of said third OR gates (1210) being connected to all the outputs of the OR gates (1209) of the recording elements of the same column;

the outputs from said plurality of third AND gates (1210), each, being connected to the memorization lines of the association center of the change in value (FIG. 10: MEM CAA, MEM CAA X, MEM CAA Y)

said association centers each corresponding to a specific variation of the value of a parameter.

8. Apparatus according to claim 7, including a group of further memory elements (1301) interconnected with the memory lines (FIG. 10: MEM CAA..., CAAX, MEM CAAY).

* * * * *